(12) United States Patent
Lillo

(10) Patent No.: US 11,926,201 B1
(45) Date of Patent: Mar. 12, 2024

(54) SCHOOL BUS EMERGENCY EGRESS SYSTEM

(71) Applicant: Michael A. Lillo, Willard, OH (US)

(72) Inventor: Michael A. Lillo, Willard, OH (US)

( * ) Notice: Subject to any disclaimer, the term of this patent is extended or adjusted under 35 U.S.C. 154(b) by 0 days.

(21) Appl. No.: 17/933,537

(22) Filed: Sep. 20, 2022

Related U.S. Application Data

(63) Continuation-in-part of application No. 17/387,024, filed on Jul. 28, 2021, now Pat. No. 11,560,046, which is a continuation of application No. 16/831,192, filed on Mar. 26, 2020, now Pat. No. 11,097,603, which is a continuation-in-part of application No. 15/981,126, filed on May 16, 2018, now Pat. No. 10,639,972.

(60) Provisional application No. 63/249,282, filed on Sep. 28, 2021, provisional application No. 62/635,847, filed on Feb. 27, 2018.

(51) Int. Cl.
| | | |
|---|---|---|
| *B60J 5/10* | (2006.01) | |
| *A61G 3/06* | (2006.01) | |
| *B60G 17/052* | (2006.01) | |
| *B60P 1/43* | (2006.01) | |
| *G07C 5/08* | (2006.01) | |

(52) U.S. Cl.
CPC .............. *B60J 5/108* (2013.01); *A61G 3/061* (2013.01); *B60G 17/0525* (2013.01); *G07C 5/0825* (2013.01); *G07C 5/0833* (2013.01); *B60G 2202/152* (2013.01); *B60G 2500/30* (2013.01); *B60P 1/431* (2013.01)

(58) Field of Classification Search
CPC ...... B60J 5/108; A61G 3/061; B60G 17/0525; B60G 2202/152; B60G 2500/30; G07C 5/0825; G07C 5/0833; B60P 1/431
See application file for complete search history.

(56) References Cited

U.S. PATENT DOCUMENTS

| | | | | |
|---|---|---|---|---|
| 3,874,527 | A * | 4/1975 | Royce | B60P 1/4407 296/61 |
| 4,155,468 | A * | 5/1979 | Royce | A61G 3/061 14/71.3 |
| 5,259,081 | A * | 11/1993 | Henderson | A61G 3/0808 296/61 |
| 9,776,482 | B2 * | 10/2017 | Eloff | B60J 5/0472 |
| 10,017,092 | B1 * | 7/2018 | Chastain, Jr. | B60P 1/433 |
| 2014/0138488 | A1 * | 5/2014 | Berthoud | E05D 13/123 49/386 |
| 2017/0216113 | A1 * | 8/2017 | Kiser | B60P 1/433 |
| 2017/0340493 | A1 * | 11/2017 | Sidhu | B60P 1/435 |
| 2020/0129350 | A1 * | 4/2020 | Collett | B60P 1/433 |

(Continued)

*Primary Examiner* — Paul N Dickson
*Assistant Examiner* — Shams Dhanani
(74) *Attorney, Agent, or Firm* — Ralph E. Jocke; WALKER & JOCKE

(57) ABSTRACT

An emergency egress system for a multi-passenger vehicle such as a school bus (372) includes an emergency exit opening (380) that is normally closed by an emergency exit door (382). Opening the emergency exit door of the bus causes the door to open by rotating about at least one horizontal hinge (384). As the door moves outwardly and then downward a ramp (394) moves outwardly from a retracted position toward an extended position. Opening the emergency exit door also causes the suspension of the bus to be automatically lowered to place the emergency exit opening (16) closer to the ground (166).

22 Claims, 44 Drawing Sheets

(56) References Cited

U.S. PATENT DOCUMENTS

| | | | | |
|---|---|---|---|---|
| 2022/0409452 A1* | 12/2022 | Kotagi | .................... | A61G 3/061 |
| 2023/0092127 A1* | 3/2023 | Cho | ........................ | B60P 1/431 14/71.1 |
| 2023/0166798 A1* | 6/2023 | Foran | .................... | B32B 27/365 296/181.1 |

\* cited by examiner

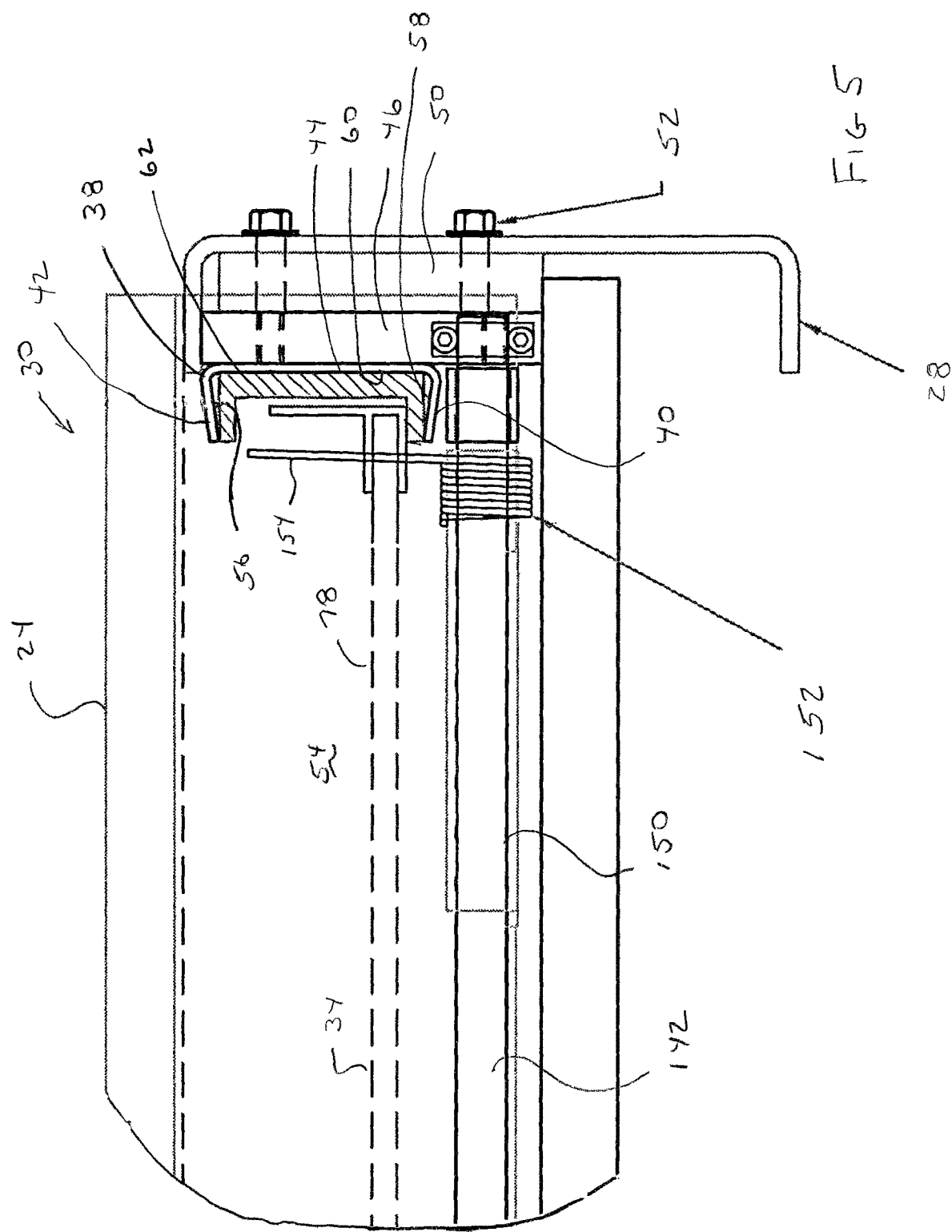

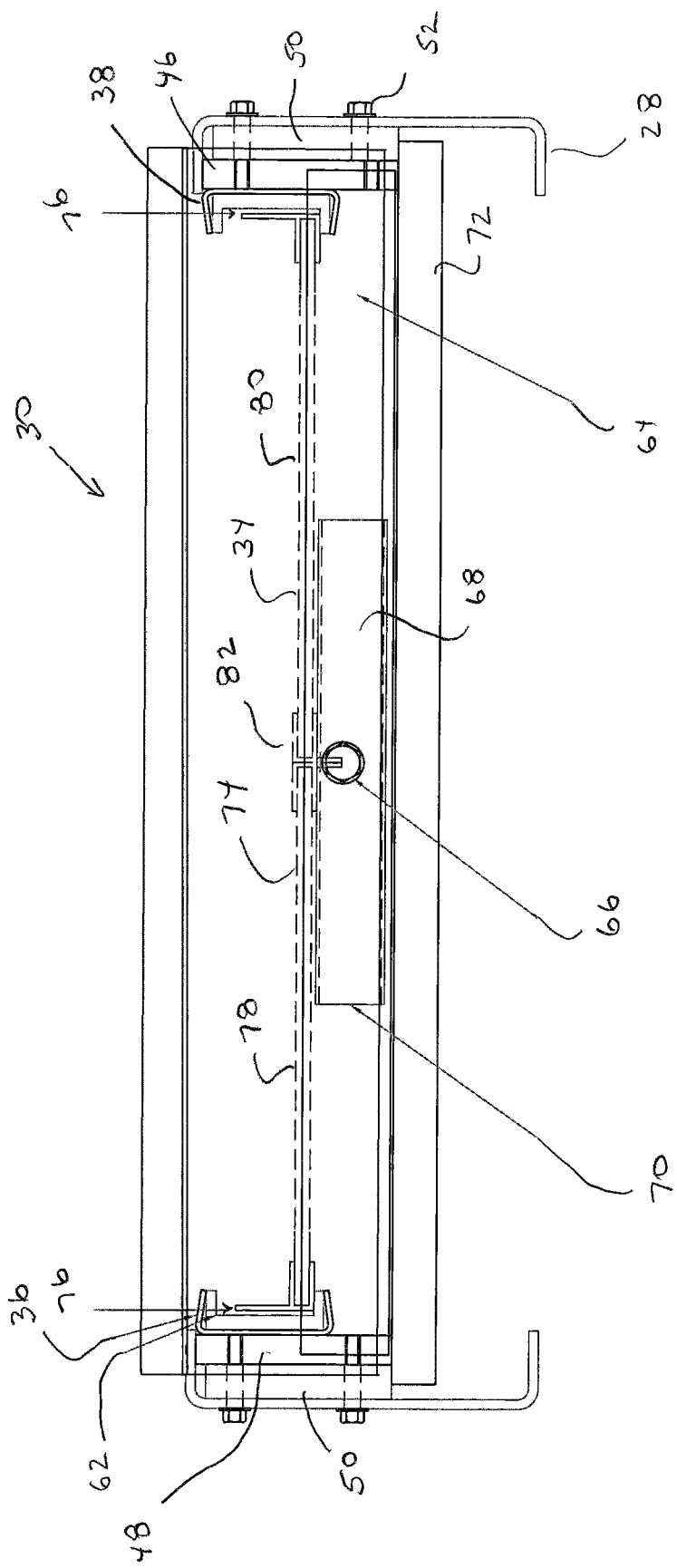

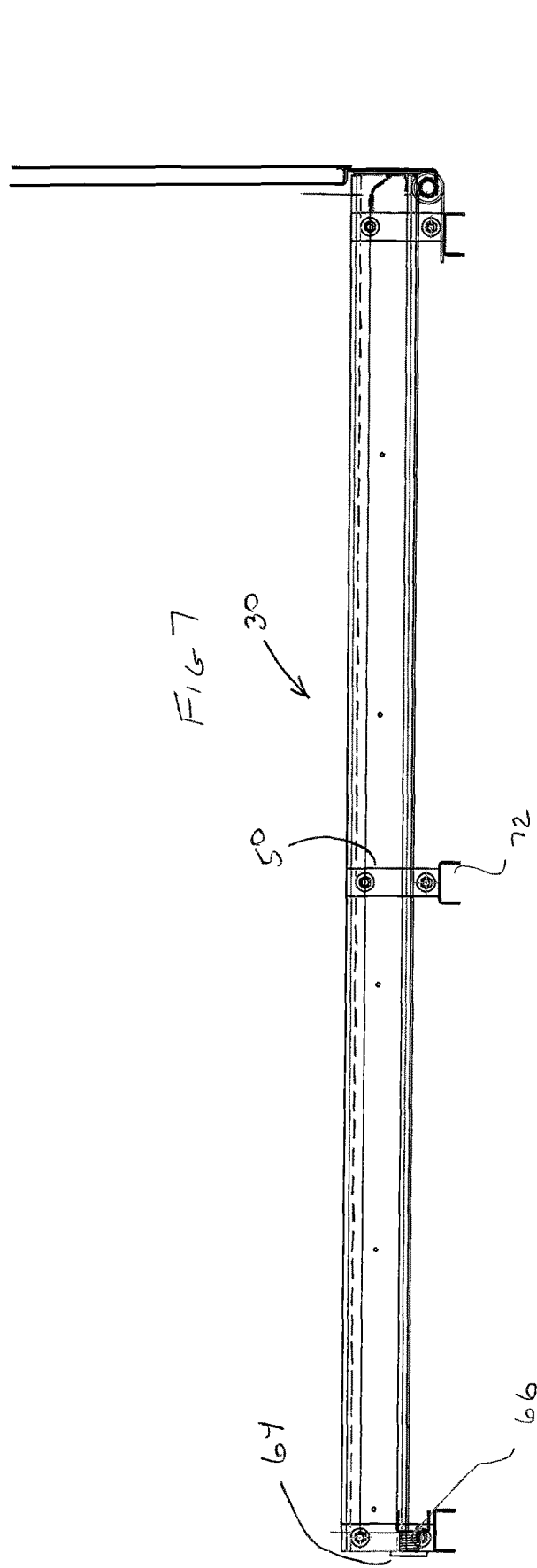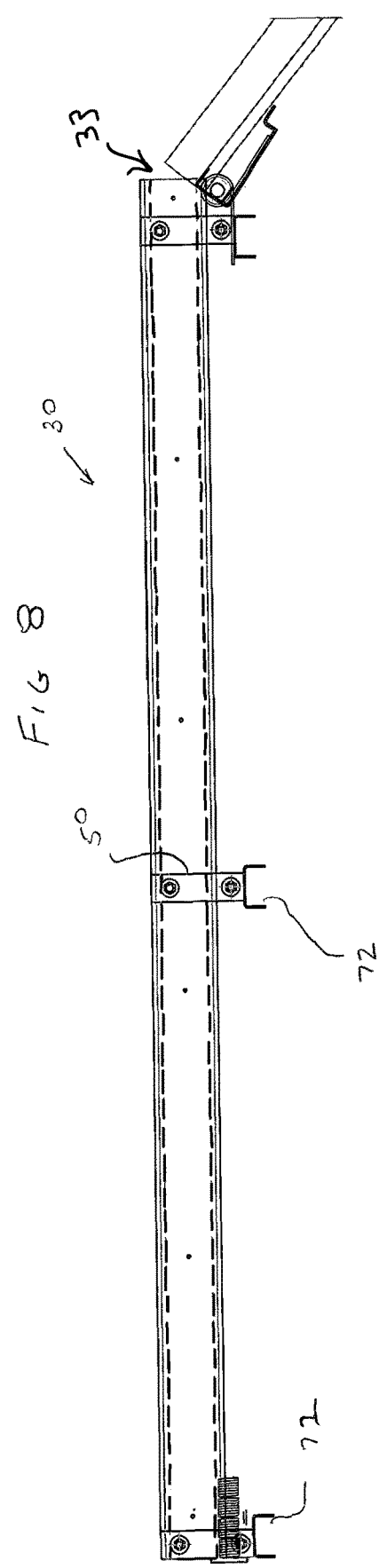

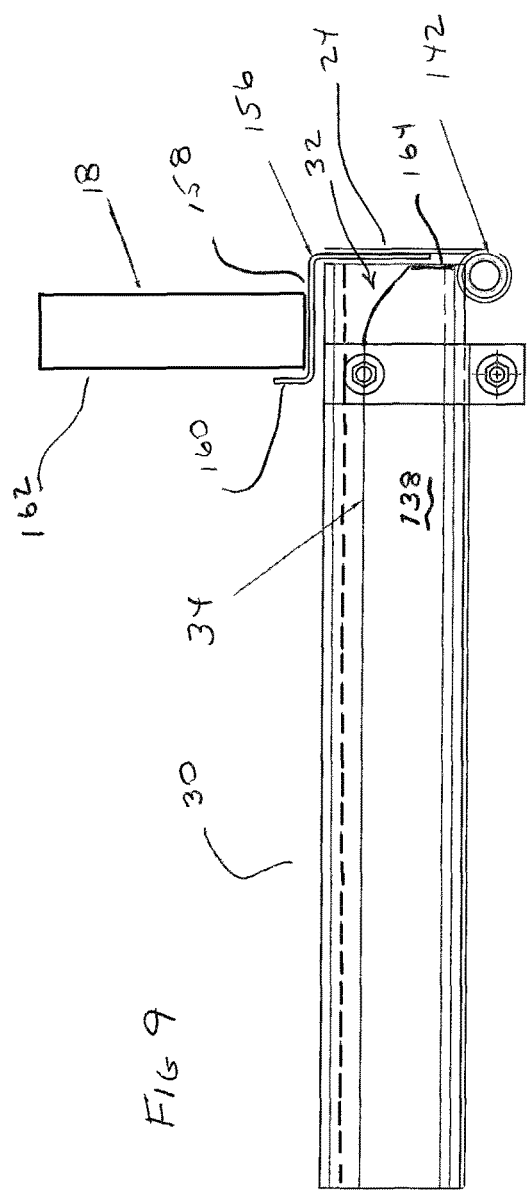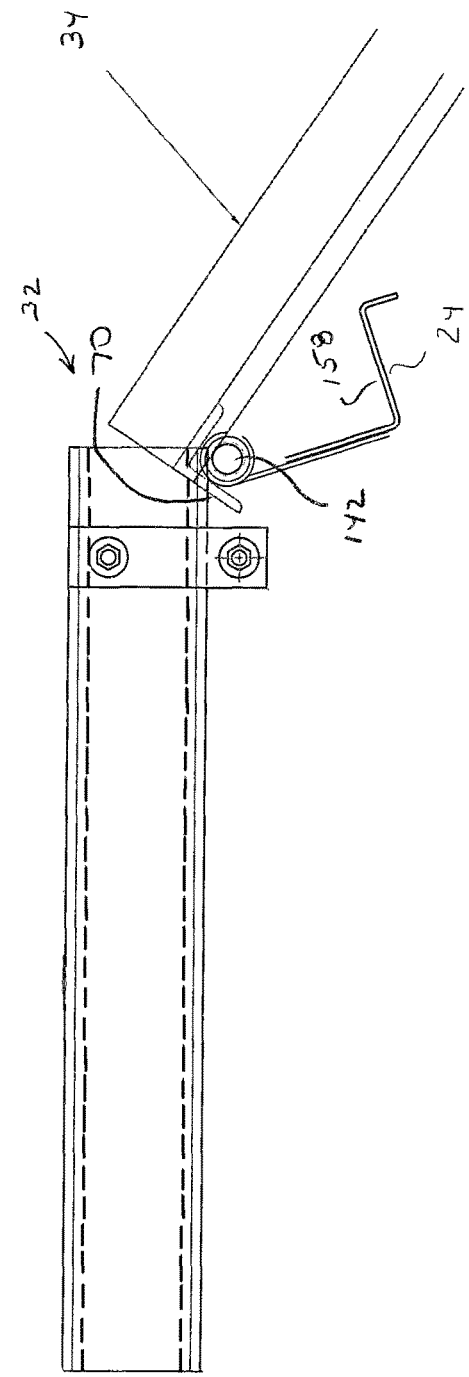

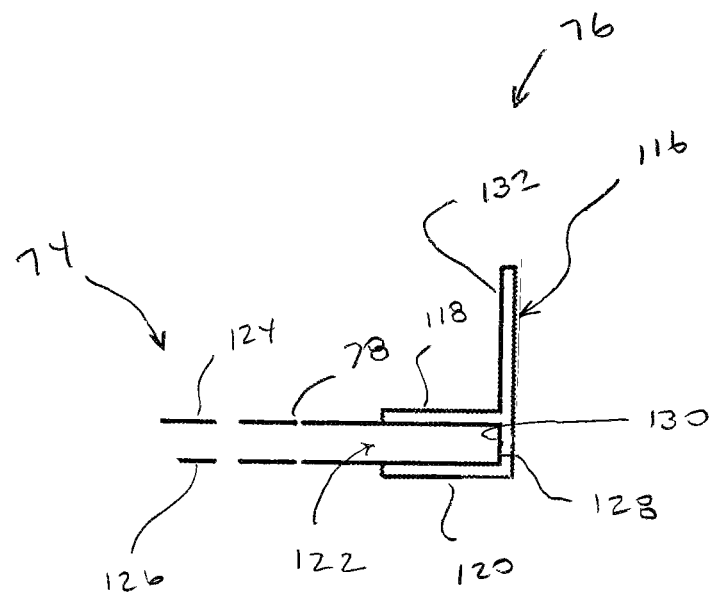
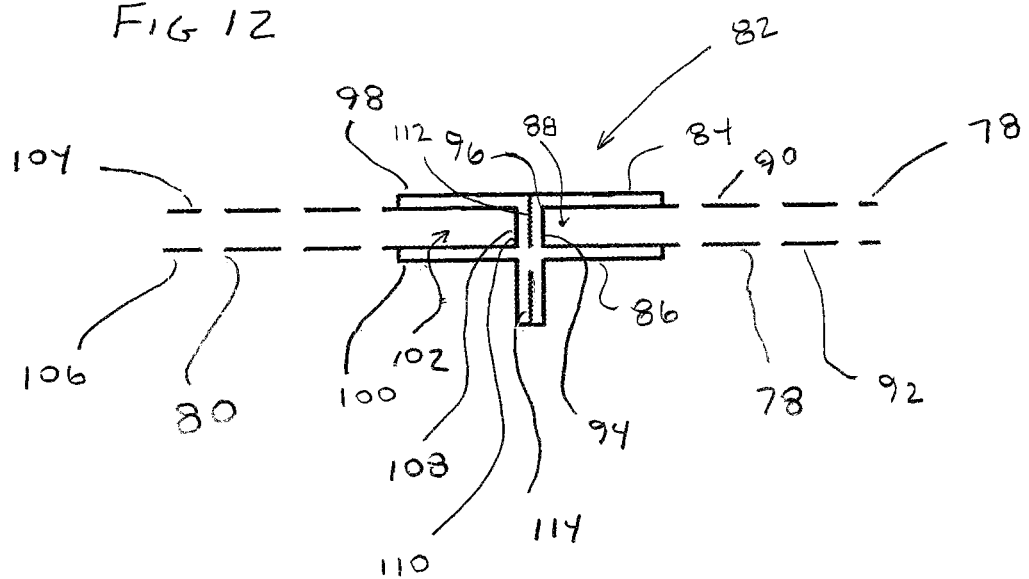

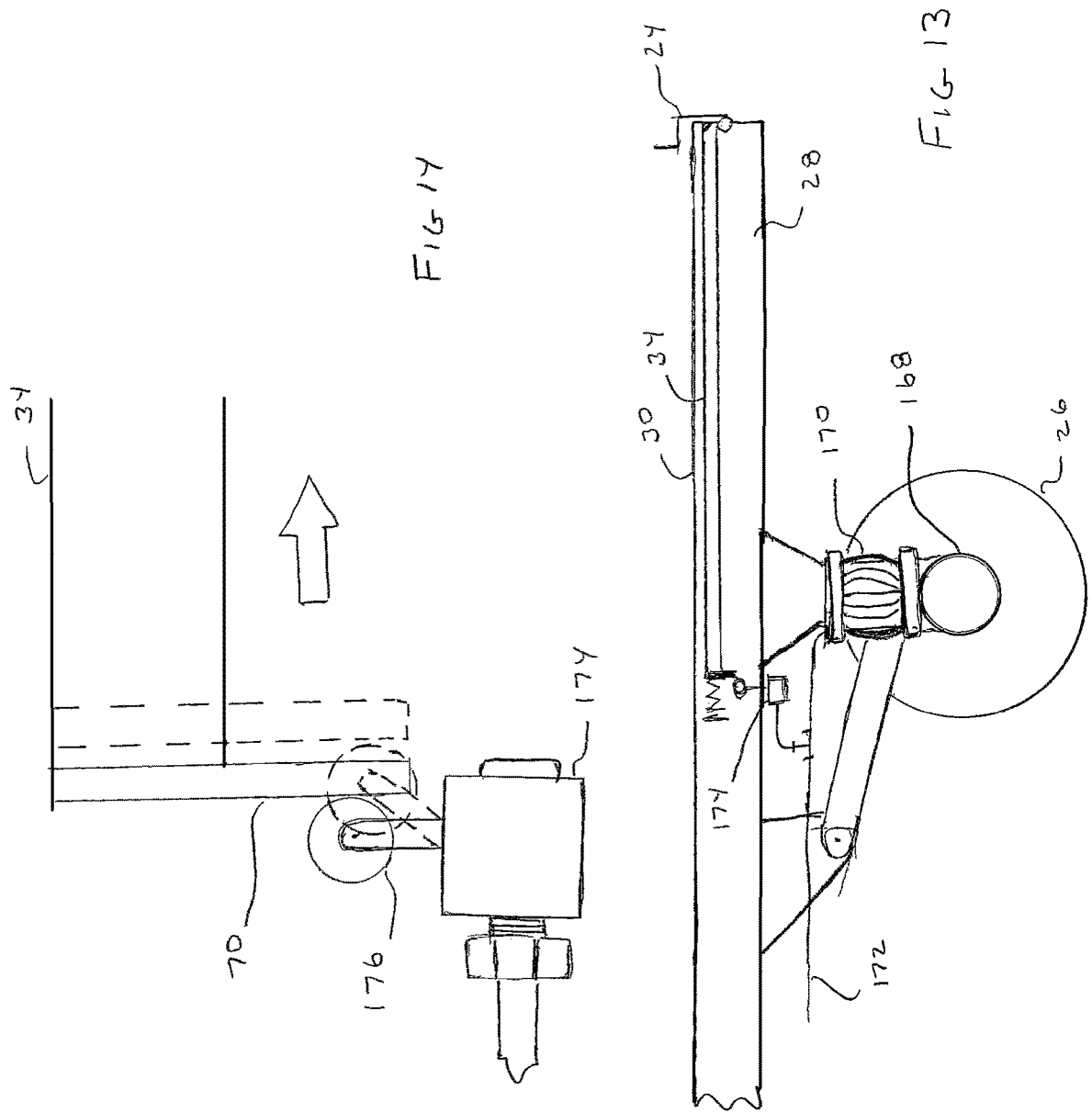

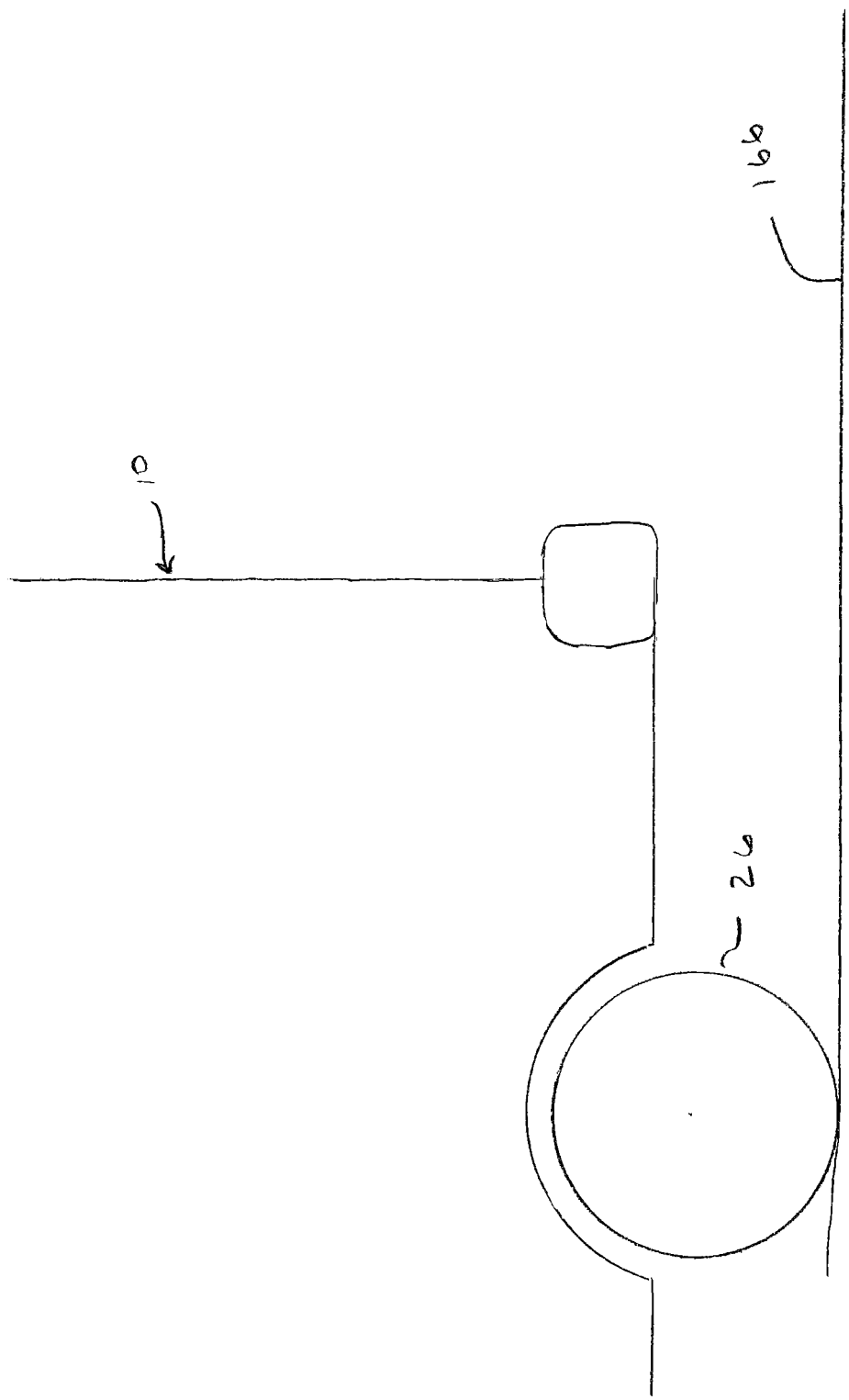

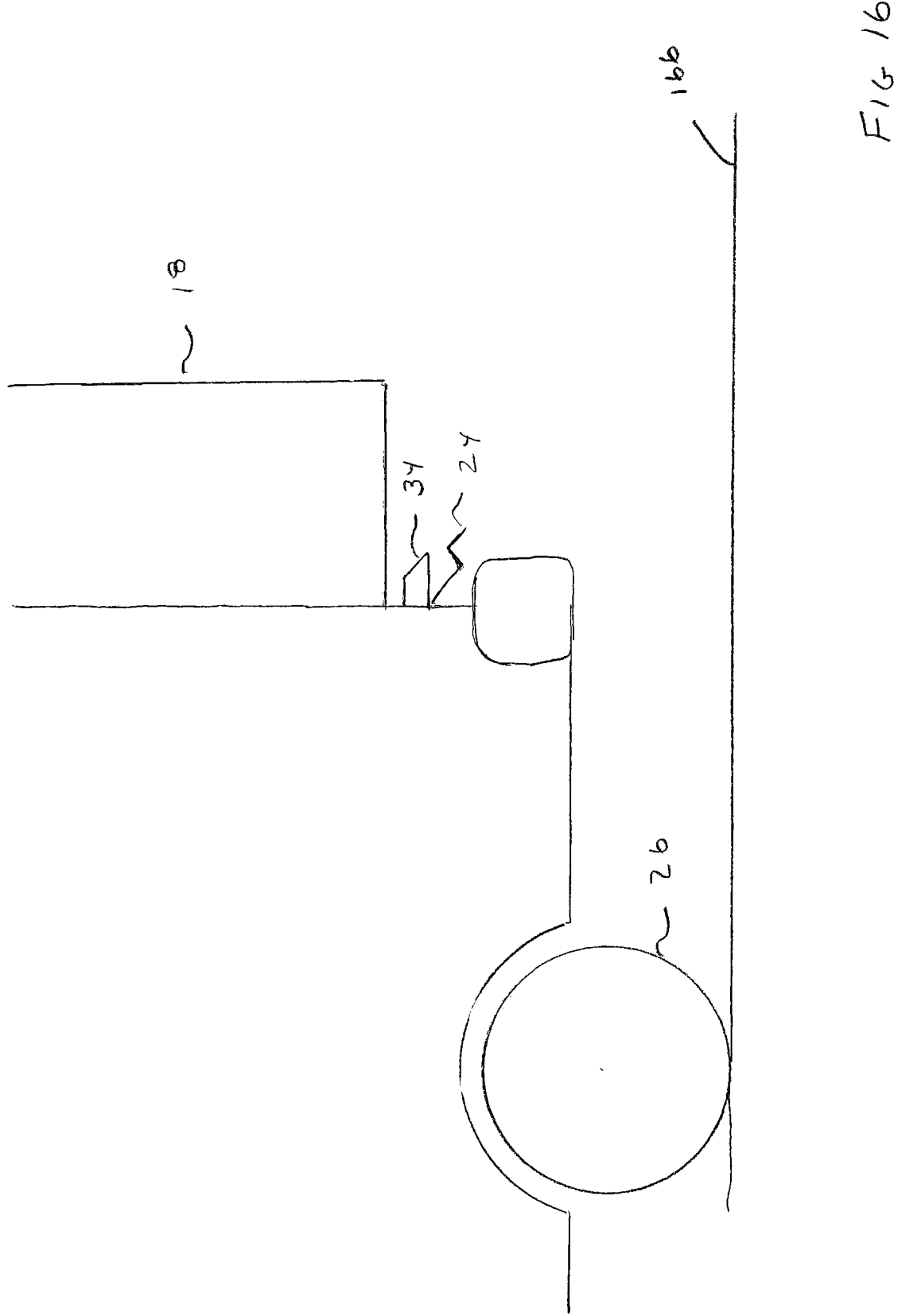

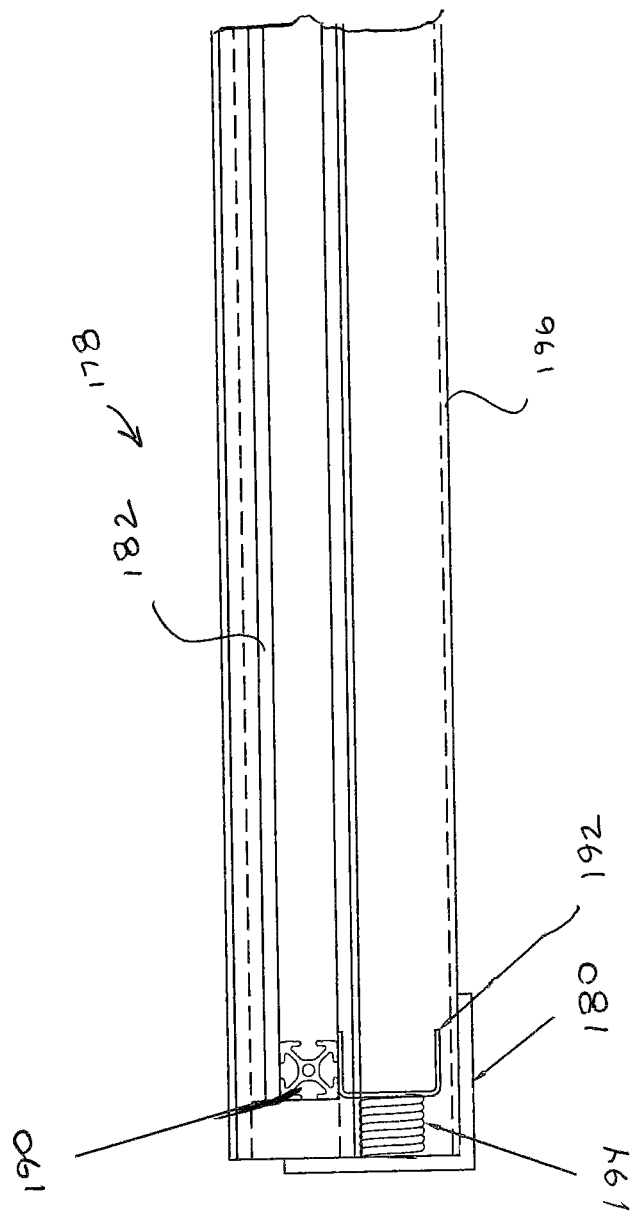

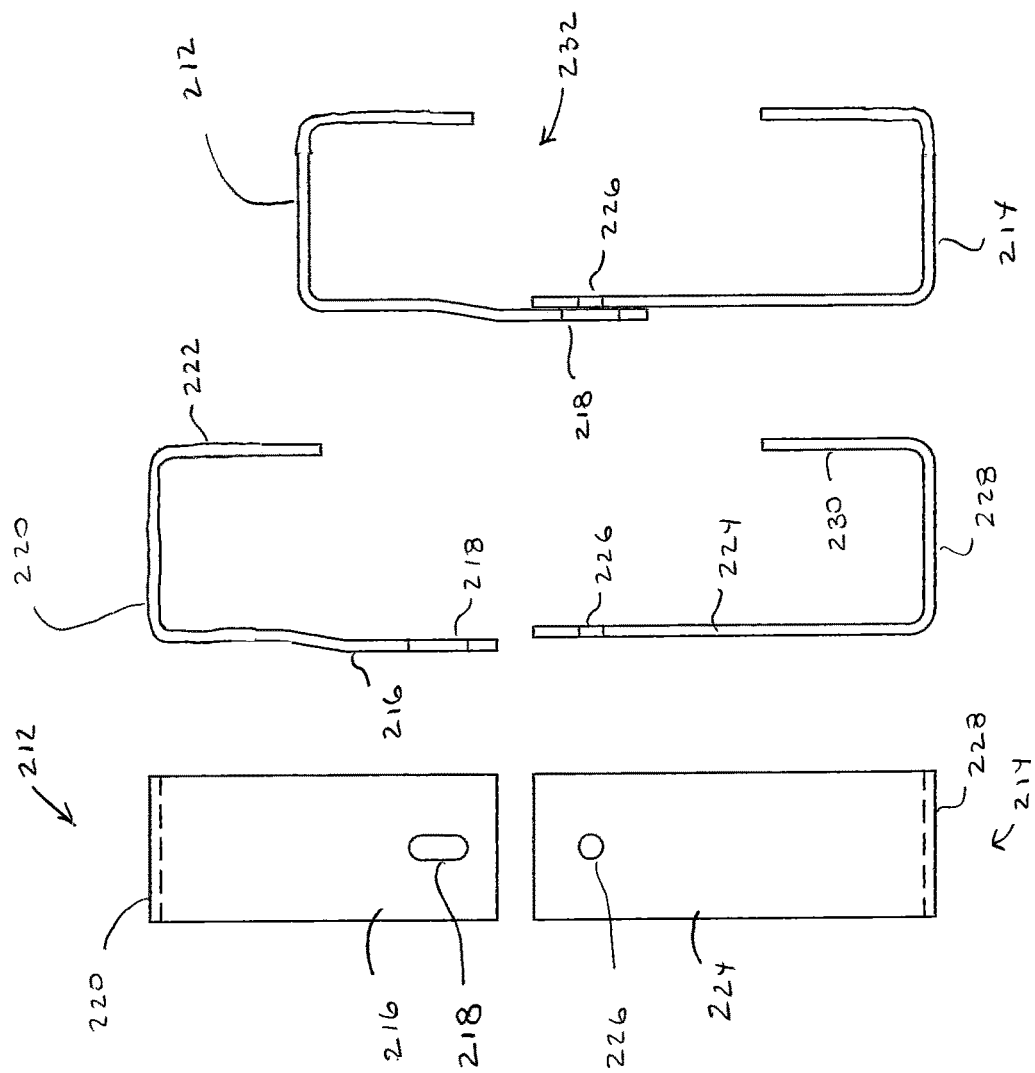

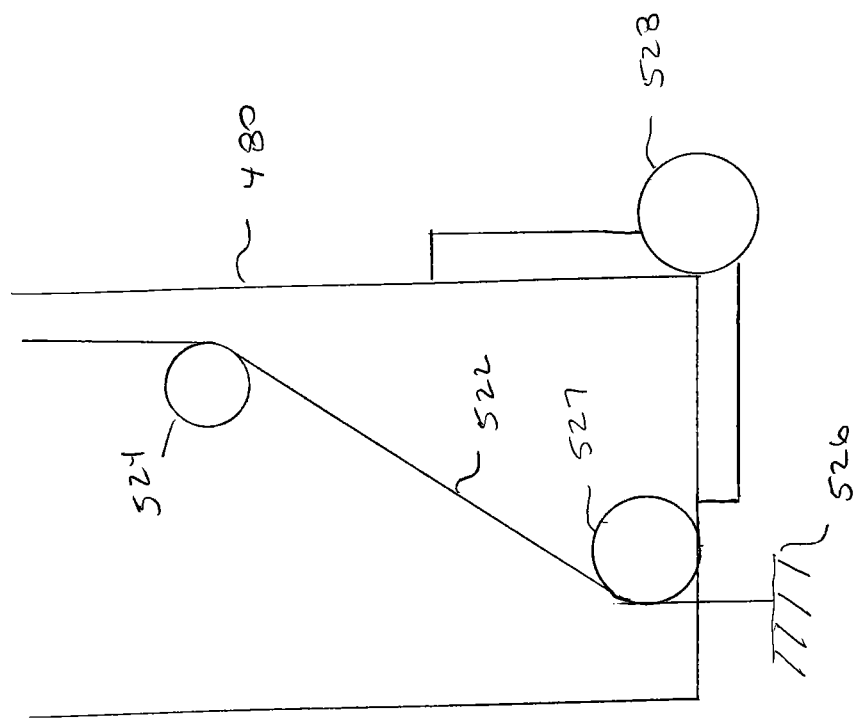

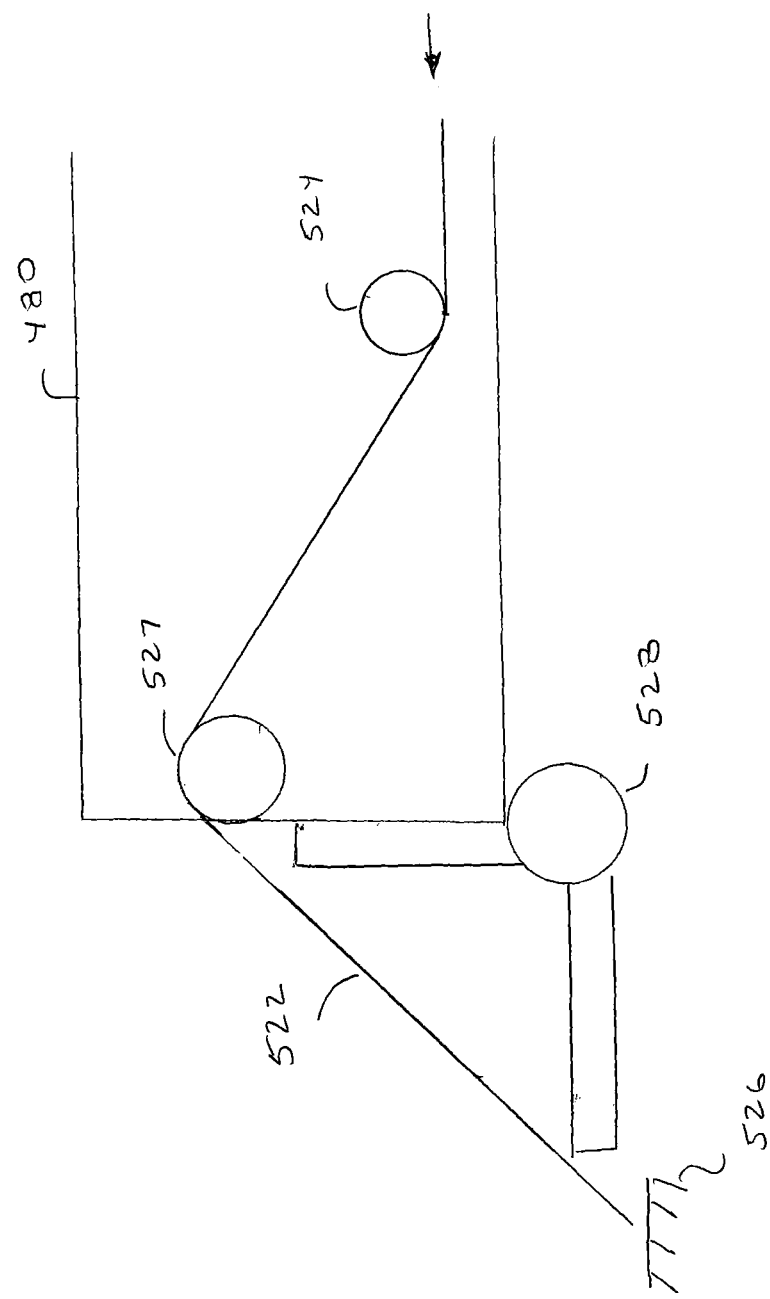

SCHOOL BUS EMERGENCY EGRESS SYSTEM

TECHNICAL FIELD

Exemplary arrangements relate to a system for providing emergency egress from a multi-passenger vehicle. Exemplary arrangements are particularly directed to an emergency egress system that can be used with a bus, such as a school bus.

BACKGROUND ART

Multi-passenger vehicles typically include one or more exits that are to be used by persons to leave the interior area of the vehicle only in emergencies. Such emergency exits remain closed by emergency exit doors at all other times during vehicle operations.

In the case of some multi-passenger vehicles such as school buses, when an emergency exit door is opened, the emergency exit opening may be a significant distance above the ground. To jump from such a distance to the ground may present a challenge for some small children or for disabled individuals.

Emergency egress systems from school buses and other multi-passenger vehicles may benefit from improvements.

SUMMARY

Exemplary arrangements relate to an apparatus that provides improved emergency egress for persons from an interior area of the school bus or other multi-passenger vehicle. Exemplary arrangements provide for an extendable ramp which becomes automatically accessible adjacent to an emergency exit opening when the emergency exit door is movable from a closed position to an open position. The exemplary ramp is extendable from a retracted position to an extended position in which the ramp extends from adjacent to the bottom of the emergency exit opening to the ground. Persons in the vehicle may leave the interior area through the emergency exit opening and travel down the ramp from the vehicle to the ground.

Further exemplary arrangements provide for the suspension of the school bus or other vehicle to be lowered automatically responsive to opening of the exit door. As a result the ramp in the extended position is at a lesser acute angle than it would be with the vehicle in the normal condition. The smaller angle of the ramp may make it easier for persons leaving the vehicle to travel down the ramp to the ground.

Exemplary arrangements provide numerous other beneficial features and capabilities as hereinafter discussed.

BRIEF DESCRIPTION OF DRAWINGS

FIG. 5 is an enlarged partial rear view of the emergency egress system shown in FIG. 4.

FIG. 6 is a front view of the emergency egress system shown with the housing door in the housing closed position.

FIG. 7 is a side view of the housing and ramp of the emergency egress system, with the ramp in a retracted position, the emergency exit door in a closed position, and the housing door in a housing closed position.

FIG. 8 is a side view similar to FIG. 7, but with the housing door in a housing open position and with the ramp in the extended position.

FIG. 9 is an enlarged view of the rear portion of the housing, housing door, ramp and emergency exit door in the positions shown in FIG. 7.

FIG. 10 is an enlarged view of the housing, housing door and ramp in the extended position as shown in FIG. 8, and with the stop attached to the ramp in engagement with the member that prevents the ramp from moving outward beyond the extended position.

FIG. 11 is a vertical cross-sectional view of an end piece of the ramp.

FIG. 12 is a vertical cross-sectional view of a base portion of the ramp.

FIG. 13 is a schematic view of the exemplary ramp in a retracted position and the suspension components of the exemplary bus.

FIG. 14 is a schematic view of an air valve including a movable air release arm that moves responsive to ramp movement from the retracted position toward the extended position.

FIG. 15 is a side view of the exemplary bus shown in a condition prior to opening the emergency exit door.

FIG. 16 is a view similar to FIG. 15 showing the emergency exit door open, the housing door having moved from the housing closed position to the housing open position, and the ramp having moved from the retracted position toward the extended position.

FIG. 24 is a horizontal cross-sectional side view of the front portion of the alternative ramp and housing.

FIG. 25 shows a back view of a top piece and bottom piece of an exemplary alternative frame attachment bracket.

FIG. 26 shows a side view of the top piece and bottom piece of the frame attachment bracket shown in FIG. 25.

FIG. 27 is a side view that shows the top piece and bottom piece of the frame attachment bracket in engaged relation.

FIGS. 49 and 50 are schematic views showing a cable arrangement that operates to automatically change the condition of the latch responsive to opening of the emergency exit door.

DETAILED DESCRIPTION

Figure 1:
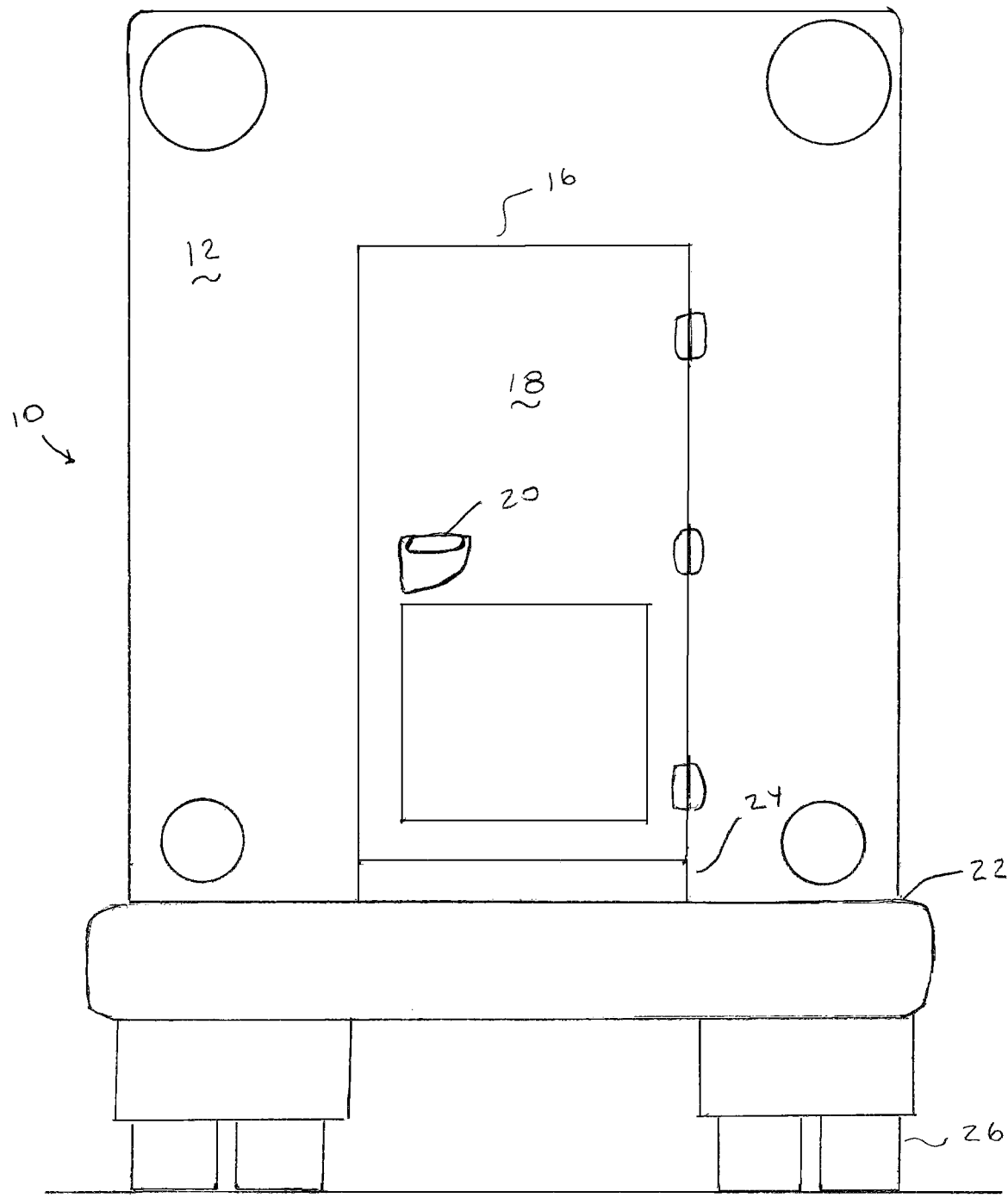
FIG. 1 is a rear view of an exemplary multi-passenger vehicle such as a school bus.

Referring now to the drawings and particularly to FIG. 1 there shown therein an exemplary multi-passenger vehicle 10 which incorporates the emergency egress system of an exemplary arrangement. The exemplary vehicle 10 shown is a school bus, however it should be understood that systems of the type described herein may be used in conjunction with other types of multi-passenger vehicles.

Figure 17:
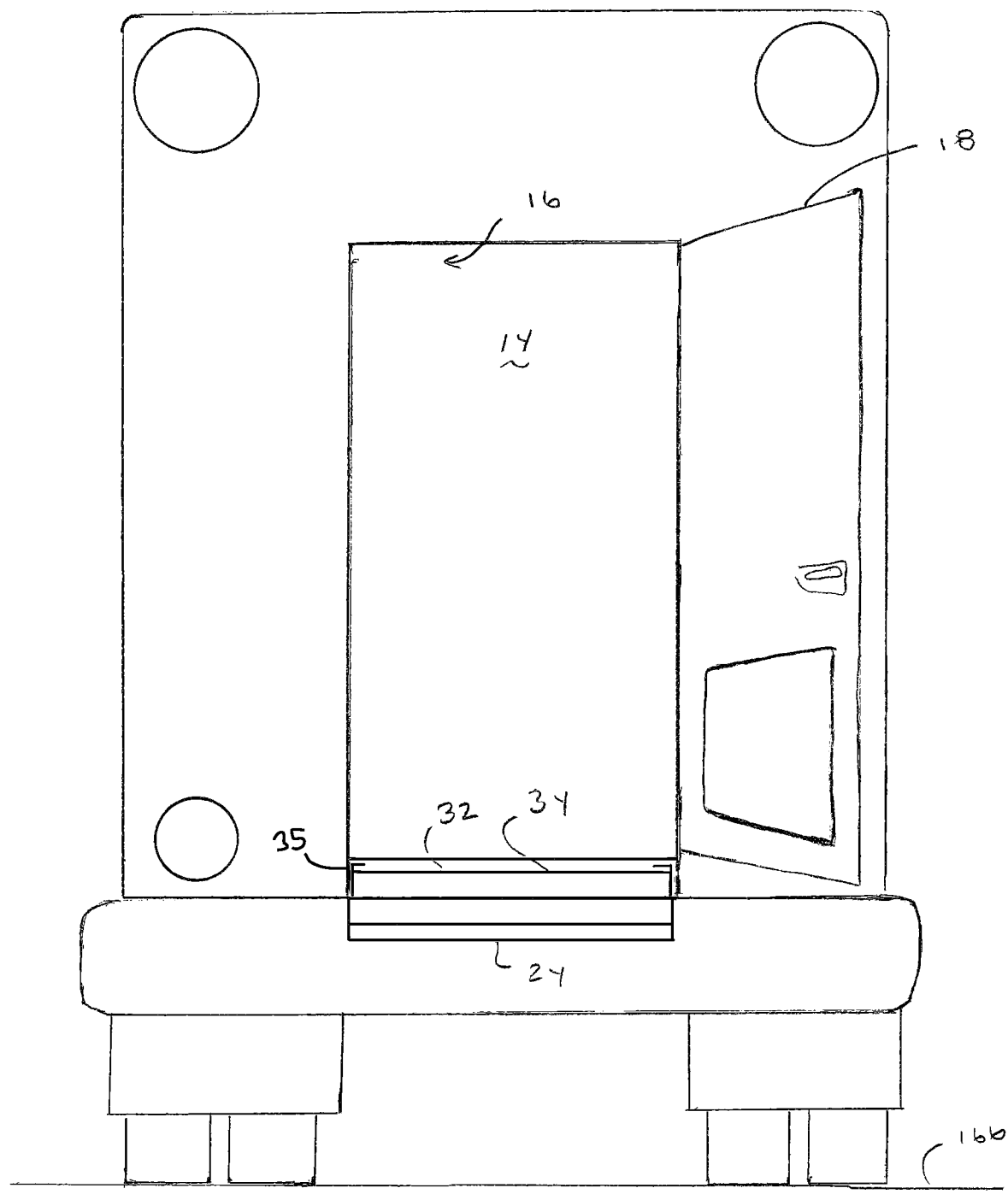
FIG. 17 is a rear view of the exemplary bus in the condition shown in FIG. 16.

In the exemplary arrangement the bus 10 includes a body 12 which bounds an interior area 14 (see FIG. 17) in which persons are housed during transport. The body includes an emergency exit opening 16. The emergency exit opening is normally closed during operation by an emergency exit door 18. The exemplary emergency exit door 18 includes interior and exterior handles 20 that can be manually engaged and moved such that the emergency exit door can be changed from a latched closed condition in which the door is latched and held in a closed position as shown in FIG. 1, and an openable condition in which the door is movable between the closed position and an open position as shown in FIG. 17. Of course it should be understood that the emergency exit door configuration is exemplary and in other arrangements other configurations may be used.

The exemplary bus includes a rear bumper 22. An exemplary housing door 24 later described in detail, extends above the rear bumper, and in the closed position shown in FIG. 1 the housing door 24 is in operative engagement with the emergency exit door 18. The bus 10 is movably supported by tires 26. The exemplary body 12 of the bus 10 is supported through a suspension system that is later discussed.

Figure 2:
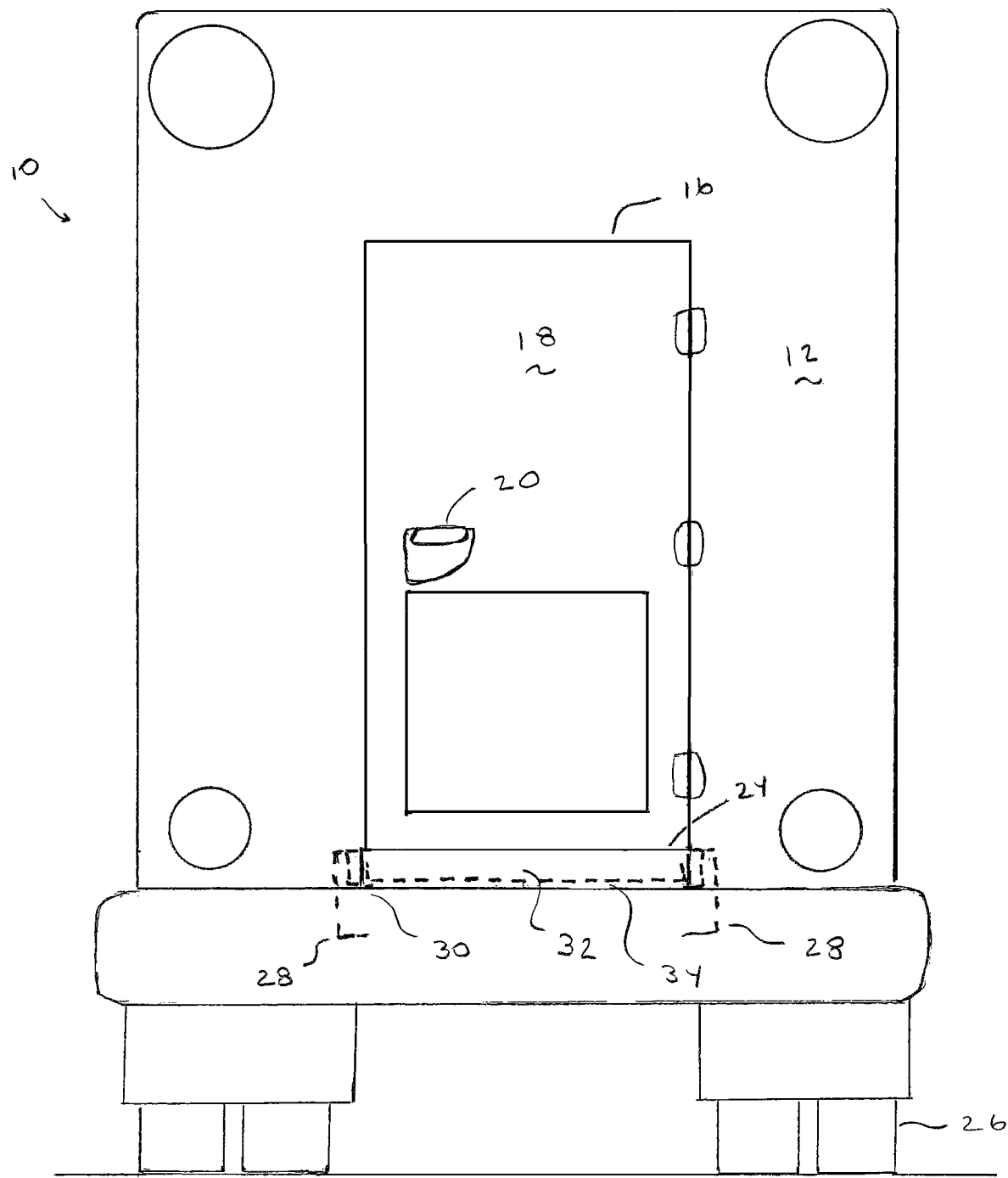
FIG. 2 is a view similar to FIG. 1, but with the vehicle frame rails and components of the exemplary emergency egress system shown in phantom.

As represented in FIG. 2 the exemplary bus body 12 is supported by a vehicle frame which includes a pair of longitudinally extending, horizontally disposed frame rails 28. A housing 30 of the exemplary emergency egress system is mounted in operatively fixed connection horizontally between the frame rails 28. The exemplary housing 30 bounds an opening 32 and houses a movable ramp 34 as later discussed in detail. In the exemplary arrangement the housing opening is positioned at a housing open end 33 and is in horizontal transverse alignment and is positioned vertically below the emergency exit opening 16. By being in transverse alignment with the emergency exit opening, the ramp 34 when in the extended position is vertically aligned with at least a substantial portion of the emergency exit opening so that persons leaving the interior area 14 through the emergency exit opening 16 can step outward onto the ramp 34 when the ramp is in the extended position.

The exemplary housing 30 includes a pair of horizontally disposed elongated side rails 36, 38. Each of the side rails is generally C-shaped in horizontal cross-section. The side rails 36, 38 of the housing 30 are mounted horizontally between and in fixed operatively supported connection with the frame rails 28 of the bus. Each exemplary side rail includes a horizontally inward extending lower lip 40 and a horizontally inward extending upper lip 42. A vertically extending web portion 44 extends in vertical cross section between the respective upper and lower lips of each of the exemplary side rails.

In the exemplary arrangement a pair of elongated support bars 46, 48 are in fixed operative connection with side rails 38 and 36 respectively. Each respective support bar is in fixed attached connection with a respective side rail through welding or other suitable attachment methods. A plurality of spacers 50 extend horizontally between an inner surface of each frame rail 28 and a horizontally outboard surface of respective support bar. In the exemplary arrangement fasteners 52 extend through holes in the spacers 50 and engage threaded openings in the adjacent support bar. This arrangement holds the housing 30 in fixed operatively supported connection between the frame rails 28 of the bus. Of course it should be understood that this mounting is exemplary and in other arrangements other mounting arrangements may be used.

In the exemplary arrangement in vertical cross section the upper lips 42, lower lips 40 and web portions 44 of the respective side rails define a channel cavity generally indicated 54. The channel cavity is generally rectangular in vertical cross-section and bounds an area in which the exemplary ramp 34 is constrained to move. The channel cavity of the exemplary arrangement is configured to require the ramp 34 to move generally horizontally and parallel to the frame rails 28 of the bus. This exemplary arrangement assures that the ramp 34 moves in the proper orientation from a retracted position in which the entire length of the ramp or at least a majority of the entire length of the ramp is positioned horizontally between the side rails, to an extended position in which the ramp extends outwardly from the open end of the housing and through the ramp opening in the body of the bus to the ground.

In the exemplary arrangement each of the upper lips 42, lower lips 40 and web portions 44 of each respective side rail include respective inner faces 56, 58 and 60. In the exemplary arrangement a low friction material overlies each of the inner faces 56, 58 and 60 to facilitate movement of the ramp 34 within the channel cavity 54. In the exemplary arrangement a high density low friction plastic insert 62 that is generally U-shaped in vertical cross-section is positioned in engagement with the inner faces of the respective side rail. In the exemplary arrangement the ramp 34 is in movably supported in operative connection with the lower lips 40 of the side rails 36, 38 through the low friction plastic insert 62. This facilitates movement of the ramp and reduces the force required to achieve movement of the ramp from the retracted position to the extended position. Of course it should be understood that this arrangement for reducing the force required to achieve ramp movement is exemplary and in other arrangements other approaches may be used. For example, in other arrangements rather than having a pair of disposed continuous channels, the channels may be comprised of discrete channel segments that are longitudinally disposed from one another along the length of housing area in which a ramp is housed. Alternatively in other arrangements, other channel configurations such as an L-shaped channel side rails or segments or I-shaped channel side rails or segments may be utilized.

As shown in FIG. 6 the exemplary housing 30 is bounded at the front end by a front member 64. The front member 64 extends horizontally between the side rails 36 and 38 and the support bars 46 and 48. In the exemplary arrangement the front member extends vertically downward below the bottom face of the ramp 34. The exemplary front member further engagingly supports at least one ramp deployment spring 66, which in the exemplary arrangement comprises at least one compression spring the function of which is later discussed. The at least one ramp deployment spring 66 is positioned to operatively engage a back surface 68 of a ramp stop 70 which is in fixed operative connection with the ramp 34. In other exemplary arrangements a deployment spring may not be used.

Further in the exemplary arrangement, a plurality of horizontally extending struts 72 are in operative connection with the housing 30. In the exemplary arrangement each strut 72 is in fixed operative connection with a horizontally disposed pair of spacers 50. The struts 72 serve to maintain the dimensional integrity of the housing 30, provide enhanced rigidity for the housing assembly and facilitate the positioning and mounting of the housing assembly between the frame rails 28 of the bus. Of course it should be understood that this reinforcement approach utilizing the struts 72 is exemplary and that other approaches may be used in other arrangements. In one exemplary arrangement the ramp 34 is comprised of a generally flat longitudinally and horizontally extending base portion 74 and vertically extending side end portions 76. The vertically extending end portions are disposed at each horizontal side of the base portion of the ramp 34. The vertically extending end portions 76 are disposed horizontally inward of the web portions 44 of the side rails and inwardly of the vertically extending faces of the low friction plastic inserts 62. In the exemplary arrangement the vertically extending portions are positioned vertically above the horizontally inwardly extending lower lips 40 of the side rails and in movable connection above the inward extending face of each plastic insert that vertically overlies each inward extending lower lip.

In this exemplary arrangement the ramp 34 is comprised of a pair of adjacent horizontally extending elongated generally flat plates 78, 80. The flat plates 78, 80 are connected through a longitudinally elongated connector piece 82. The flat plates 78, 80 in fixed connection with the connector piece form the base portion 74 of the ramp. As shown in horizontal cross section in FIG. 12, the exemplary connector piece 82 includes a top flange 84 and a bottom flange 86. A recess 88 extends between the top and bottom flanges 84, 86. A top face 90 of flat plate 78 is in abutting engagement with the top flange 84 within the recess 88. A bottom face 92 of flat plate 78 is in abutting engagement with the bottom flange 86 within the recess 88. An inside face 94 of the flat plate 78 that extends between the top face 90 and the bottom face 92, is positioned in abutting engagement with an inside surface 96 that bounds recess 88.

The exemplary connector piece 82 further includes a top flange 98 and a bottom flange 100, which bound a recess 102. A top face 104 of flat plate 80 extends in the recess 102 and in abutting engagement with top flange 98. A bottom face 106 extends in the recess 102 and in abutting engagement with the bottom flange 100. An inside face 108 extends between the top face 104 and 106, and engages an inside surface 110 which bounds the recess.

In the exemplary arrangement the flat plates 78, 80 and the connector piece 82 are held in fixed engagement by welding or other fastening methods. This enables the ramp to be comprised of smaller horizontal plate sections to facilitate the construction thereof. It also provides the benefit that ramps of varied horizontal widths may be more readily constructed to suit the particular configuration of the vehicle on which the system is to be installed. The structure may also be comprised of different materials to provide desirable properties such as low weight, higher surface traction or corrosion resistance for example. Of course it should be understood that in other exemplary arrangements ramps comprising a single flat plate or more than two connected flat plates or other structures may be utilized. In some exemplary arrangements the top faces of the plates may be contoured or coated with a high friction material to avoid slipping by persons who travel on the ramp.

Further in the exemplary arrangement the connector piece 82 includes a pair of longitudinally extending projections 112, 114 at the forward end thereof. Projections 112 and 114 of the exemplary arrangement are utilized for purposes of positioning the at least one spring 66 which operates to move the ramp from the retracted position toward the extended position. In the exemplary arrangement projection 114 extends within an inside diameter of a helical coil spring 66. Projection 114 serves to engage and position the spring so that it is properly extending horizontally and along the direction of the base portion 74 of the ramp when the spring is compressed. The projection 112 extends outside the helical coil spring and in the exemplary arrangement further helps to hold the spring in the proper horizontal position while the spring is compressed. Of course this arrangement for helping to hold the one or more ramp deployment springs in proper position is exemplary, and in other arrangements other approaches may be used.

In this exemplary arrangement the vertically extending end portions 76 of the ramp 34 each include end pieces 116 one of which is shown in vertical cross section in FIG. 11. It should be understood that while FIG. 11 shows an end piece that is positioned on the right side of the base portion 74 of the ramp when viewed from the rear of the vehicle, the end portion on the left side of the ramp will be the mirror image thereof.

The exemplary end piece 116 includes an upper flange 118 and a bottom flange 120 which bound a recess 122. The flat plate 74 extends in the recess 122. A horizontally extending top face 124 of the plate extends in abutting engagement with the upper flange 118. A horizontally extending bottom face 126 extends in abutting engagement with the bottom flange 120. A vertically extending lateral face 128 extends between the top face and the bottom face. The lateral face 128 extends in abutting engagement with an inside face 130 that internally bounds the recess.

The exemplary end piece 116 further includes a side flange 132 that extends vertically upward and perpendicular to the top face 124. The exemplary end piece 116 is held in fixed attached connection with the flat plate 78 through welding or other fastening methods. In the exemplary arrangement, the side flange 132 when the ramp is in the operative position, is disposed horizontally inward a small distance from the vertically extending inner face of the low friction plastic insert 62 to enable horizontal movement of the ramp. The bottom flange 120 is formed to be generally smooth so that it is generally freely movable in operatively supported slidable relation with the adjacent inward extending lower lip 40 of the adjacent side rail and the corresponding horizontally inward extending surface of the plastic insert 62 that overlies the lower lip 40. Of course it should be understood that in other exemplary arrangements the bottom flange 120 may be coated with a low friction plastic or other material to facilitate movement of the ramp within the housing. In still other exemplary arrangements other structures and configurations may be utilized including rollers, bearings or other structures suitable for reducing resistance to movement of the ramp relative to the adjacent housing structures.

In other exemplary arrangements the ramp may be comprised of a single unitary structure. For example in some arrangements the ramp may be comprised of a generally planar piece of material with lateral side walls that extend vertically but are not as vertically elongated as in the previous arrangement, which side walls serve the functions of the end pieces previously described. In some exemplary arrangements such ramps may be comprised of metals such as aluminum or steel, or suitable metal alloys. In other exemplary arrangements the ramp may be comprised of a molded plastic material or reinforced plastic material or assemblies of components comprised of such materials. In further alternative arrangements ramps may be comprised of one or more components comprised of high-strength carbon fiber. In some arrangements ramps comprised of molded material may include integral surface features such as ribs, recesses, contours or surface roughness to provide enhanced frictional engagement to prevent slippage by persons who travel down the ramp. In other exemplary arrangements surface treatments may be applied to the ramps to achieve enhanced friction properties. Of course it should be understood that these approaches are exemplary in other arrangements other approaches to be used.

Figure 3:
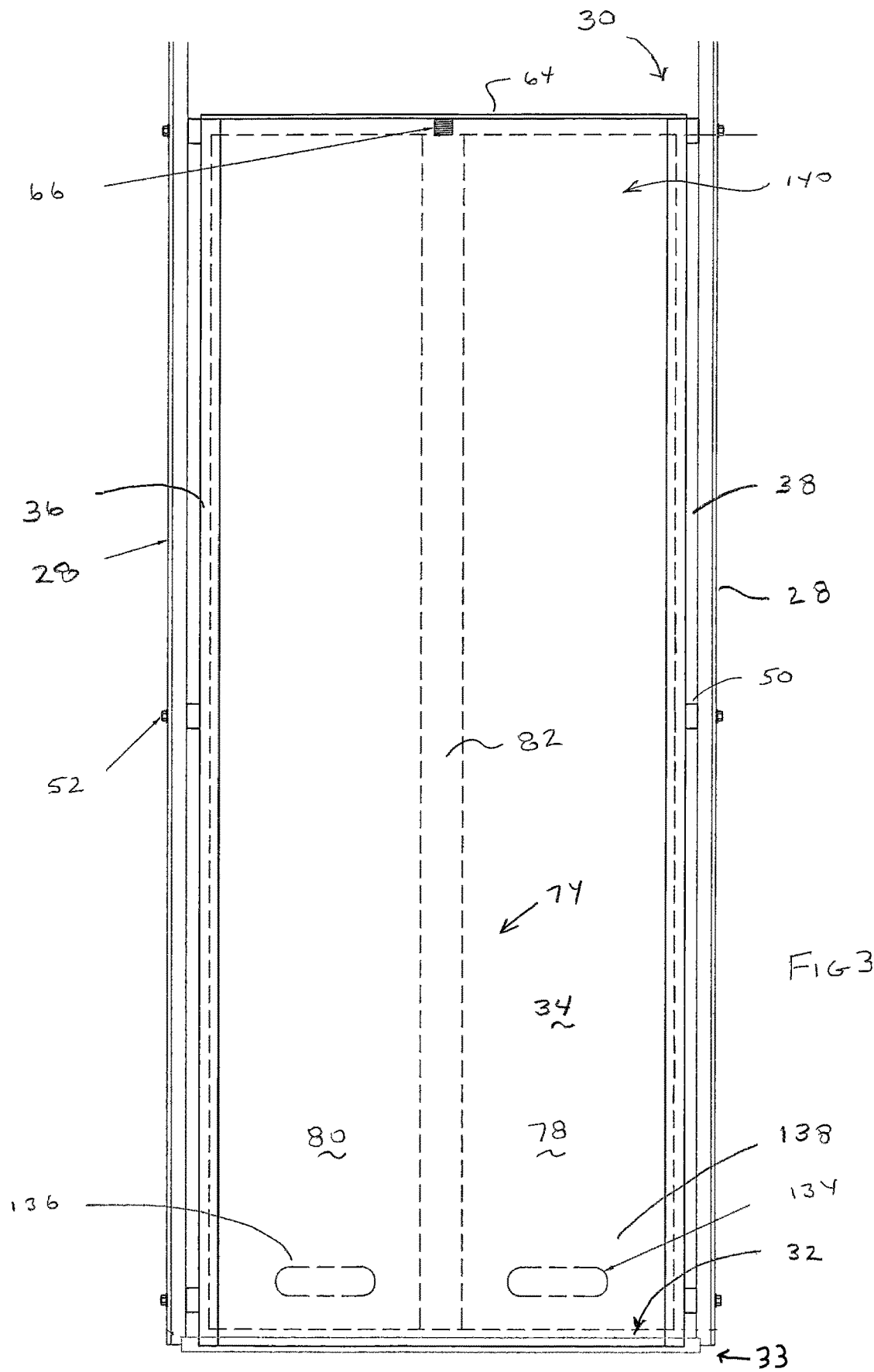
FIG. 3 is a top view of the housing of the exemplary emergency egress system positioned between the frame rails of the bus, and with the ramp of the exemplary system shown in phantom.

As shown in FIG. 3, the exemplary ramp 34 includes manually engageable handles 134, 136. In the exemplary arrangement the manually engageable handles are comprised of openings through the flat plates 78, 80 which comprise the base portion 74 of the exemplary ramp 34. In the exemplary arrangement that handles extend through the base portion of the ramp 34 in a ramp outer end 138. The ramp outer end 138 includes the portion of the ramp closest to the ramp housing opening 32 and the ramp opening in the body of the bus when the ramp is in the retracted position as shown in FIG. 3, for example. In exemplary arrangements the ramp handles are accessible through the ramp opening when the ramp is in the retracted position and/or is moved outward somewhat by a spring or other mechanism. The ramp outer end is disposed from a ramp inner end 140. The exemplary ramp inner end is opposed of the ramp outer end, and is operatively connected with the ramp stop 70. Of course it should be understood that the configuration of the manually engageable handles 134, 136 that may be utilized to move the ramp between the retracted position and the extended position are exemplary. In other arrangements other types of handles may be used.

Figure 4:
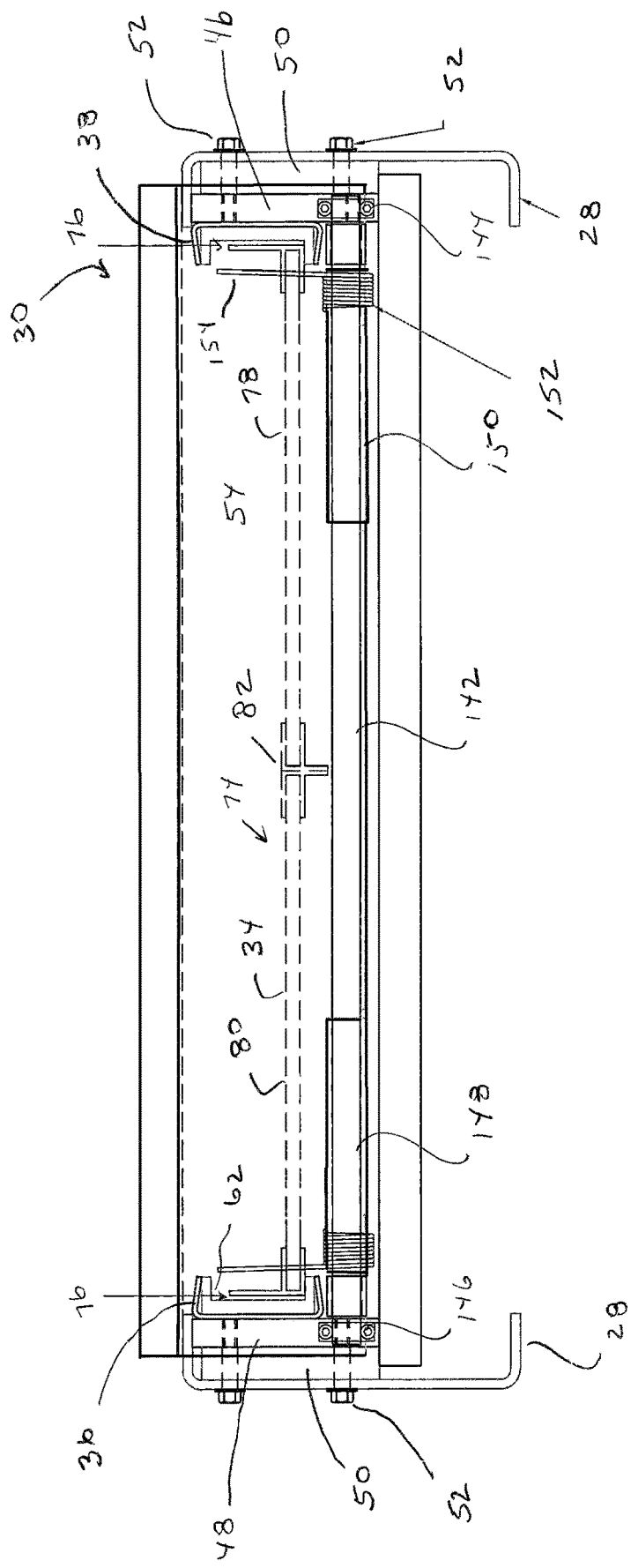
FIG. 4 is a rear view of the frame rails of the bus and the housing of the emergency egress system, with a housing door thereof in a housing closed position.

In the exemplary arrangement the housing door 24 is rotationally movably mounted relative to the housing 30. As shown in FIG. 4, a member which comprises a shaft 142 extends horizontally across the housing in a position that is disposed below the housing opening 32. The shaft 142 is mounted in operatively supported connection with the support bars 46 and 48 through brackets 144 and 146 respectively. The housing door 24 is rotatably movably mounted in operatively supported connection with the shaft through a pair of transversely disposed sleeves 148, 150 each of which extends about the shaft. The sleeves enable the housing door 24 to move in supported connection with the shaft between the housing closed position as shown in FIG. 9, in which the housing door closes the ramp opening in the body of the bus and housing opening 32, and the housing open position in which at least a portion of the housing door 24 is disposed away from the housing and ramp openings as shown in FIG. 10.

In the exemplary arrangement a pair of horizontally disposed torsion springs 152 are operative to bias housing door 24 which serves as a ramp access door, toward the housing open position. In the exemplary arrangement each of the torsion springs 152 extend in surrounding relation of a respective sleeve 148, 150 and each include a spring arm 154 which operatively engages the door to bias the door towards the housing open position. Of course it should be understood that this arrangement is exemplary and in other arrangements other approaches may be used.

The exemplary housing door 24 is configured to be in operative connection with the emergency exit door 18. The housing door 24 includes in cross section an extension 156 that in the closed position of the ramp access door extends upward from the shaft 142 as shown in FIG. 9 for example. The exemplary extension includes a horizontally extending portion 158. In the housing closed position of the housing door 24, the horizontally extending portion 158 extends in the emergency exit opening 16 and underneath the emergency exit door 18. The exemplary housing door extension 156 further includes a vertically extending portion 160. The vertically extending portion 160 is configured to engage a surface of the door such as an inside face 162 of the emergency exit door 18 when the emergency exit door in the closed position.

As represented in FIG. 9 in the exemplary arrangement when the emergency exit door is in the closed position, the vertically extending portion 160 of the extension of the housing door 24 is engaged with the inside face 162 of the door, which is operative to hold the housing door 24 in the housing closed position. In this condition an inner surface of the housing door 24 operatively engages the leading face 164 of the ramp outer end 138. In this position the housing door holds the exemplary ramp 34 in the retracted position within the housing against the biasing force of the at least one spring 66.

Figure 18:
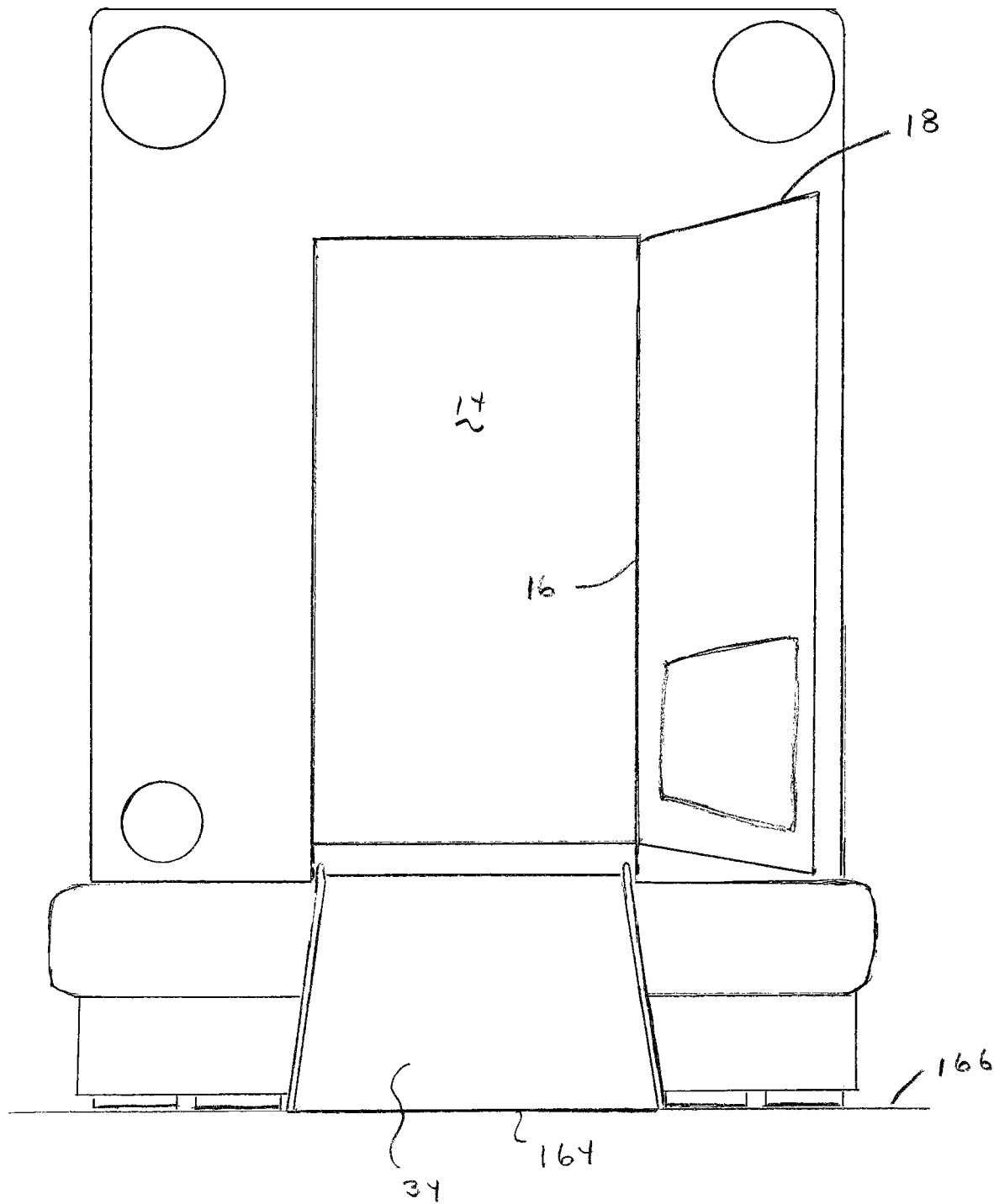
FIG. 18 is a rear view of the exemplary bus similar to FIG. 17, but with the suspension lowered responsive to opening of the emergency exit door, and with the ramp in the extended position to the ground.

In an exemplary arrangement when the emergency exit door 18 is in the openable condition and is moved to the open position, the inside surface 162 of the door no longer holds the vertically extending portion 160 in the emergency exit opening. As a result the housing door 24 moves from the housing closed position shown in FIG. 9 to the housing open position as shown in FIGS. 8, 10, 16 and 17. The ramp access door in the door open position opens the ramp opening 35 in the body of the bus and exposes the ramp through the open end 33 of the housing. In the exemplary arrangement when the housing door 24 initially moves to the housing open position, the at least one spring 66 is operative to move the ramp 34 from the retracted position within the housing 30, toward the extended position in which the ramp extends from the housing to the ground 166. In the exemplary arrangement the spring 66 is operative to move the ramp 34 a relatively small distance outward from the opening 32 and the ramp opening, toward the extended position as shown in FIG. 16. In this exemplary arrangement the ramp 34 extends outward from the opening 32 a sufficient distance so that the ramp can be manually engaged either by the handles 134, 136 and/or by the leading face 164 of the ramp to enable the ramp to be pulled outwardly to the ramp extended position in which the leading face of the ramp 164 reaches the ground 166 as shown in FIG. 18.

In the configuration of the exemplary arrangement, the at least one spring 66 which biases the ramp 34 outward an initial relatively small distance, enables the ramp to be more manually accessible so it can be moved further outwardly toward the extended position. This arrangement enables persons who wish to immediately jump from the interior area 14 of the bus to the ground 166 without taking the time to extend the ramp 34, may do so. However it should be understood that in other exemplary arrangements, further springs, motors or other devices may be in operative connection with the ramp to cause the ramp to move to the extended position so that the ramp extends to the ground automatically a very short time after the emergency exit door opens. In still other exemplary arrangements suitable circuitry or other mechanisms may be provided so that the ramp can be automatically moved from the retracted position or from an initial small amount outwardly from the retracted position, to the fully extended position, responsive to one or more user inputs, such as pressing a button that is accessible adjacent to the emergency exit opening 16. Of course these approaches are exemplary and in other arrangements different or alternative approaches to deploying and extending the ramp or other egress structure may be used.

In other exemplary arrangements other structures may be utilized for purposes of enabling the housing door to move from a housing closed position closing the ramp opening and/or the opening of the housing, to the housing open position in which at least a portion of the housing door is disposed from the housing opening so as to enable the ramp to be externally accessible so that the ramp may extend therefrom. For example in some arrangements a latch may be operatively engaged with the housing door such that when the emergency exit door is changed to an openable condition, the latch releases the housing door to be movable to the housing open position. In some exemplary arrangements the latch or other structure which operates to hold the housing door in a housing closed position may be operatively engaged with a latch or other structure that holds the emergency exit door in the closed position, such that when the latch which holds the emergency exit door is released so that the door is in an openable condition, the housing door moves or becomes movable so as to open the housing opening.

In other alternative arrangements the housing door may be in operative supporting connection with the back end of the ramp. In such arrangements when the ramp is retracted within the housing the housing door operates to close the housing opening and/or the ramp opening. In such arrangements the ramp may be operatively engaged with a latch or other suitable structure that holds the ramp retracted within the housing. In some alternative arrangements the opening of the emergency exit door may be operative to cause the ramp to move toward the extended position responsive to a spring or other similar biasing member. In other exemplary arrangements, the ramp may be held by a latch, catch or other holding structure when the emergency exit door is in the latched and closed condition. Actuation of the structure which operates to hold the emergency exit door closed so that the door becomes in the openable condition, causes the latch, catch or other structure holding the ramp in the retracted position to be released such that the ramp moves from the retracted position toward the extended position. In different arrangements the latch or other structure that holds the ramp and/or the housing door may be operatively connected to the emergency exit door, latching structure for the emergency exit door, or other structure through mechanical connections, electrical connections or a combination thereof. Numerous different arrangements may be provided to enable the opening of the housing structure responsive to the emergency exit door being in the openable condition and/or opening, so as to enable the exemplary egress system to be deployed.

In the exemplary arrangement once the ramp is in the position shown in FIG. 16, the ramp 34 may be moved outwardly toward the extended position until the downward extending stop 70 engages the shaft 142 as represented in FIG. 10 and FIG. 8. In the exemplary arrangement the stop 70 engages the shaft 142 in the area between the sleeves 148, 150. As a result the shaft 142 serves as a member that engages the stop 70 and prevents further movement outward from the opening 32 toward the extended position once the ramp 34 is in the extended position as shown in FIG. 18. In the exemplary arrangement the ramp 34 is enabled to be rotatably movable with the stop 70 abuttingly engaged with the shaft 142 so as to enable the ramp 34 to extend an acute angle from the housing 30 to the ground 166. Further the exemplary configuration of the width of the stop 70 widely distributes any impact forces or loading forces applied to the ramp 34 as a result of the rapid deployment of the ramp and the weight of persons moving down the ramp to the ground so that the structural integrity of the components of the emergency egress system are maintained.

In addition the exemplary system enables the ramp to be returned from the extended position to the retracted position, and the housing door 24 and the emergency exit door 18 each returned to its respective closed position after the emergency is over. This enables the exemplary system to return the bus to its normal operating condition without significant delay, and the system to be reliably deployed again in the event of another emergency.

In an exemplary arrangement the suspension of the bus is interconnected with the emergency egress system. The exemplary arrangement provides automatically placing the emergency exit opening 16 closer to the ground 166 responsive at least in part to the opening of the emergency exit door 18. In an exemplary arrangement as schematically represented in FIG. 13, the bus includes an axle 168 which is supported above ground by the tires 26. The suspension of the bus includes at least one pneumatic spring 170. The pneumatic spring extends vertically between the axle and the frame rails and is supplied with air pressure through an air line 172 which maintains the pneumatic spring 170 properly pressurized and expanded to maintain the normal vehicle suspension height.

In the exemplary arrangement the air line 172 is fluidly connected to an air valve 174. The exemplary air valve 174 is changeable between open and closed conditions responsive to the position of an air release arm 176. In exemplary arrangements the release arm may comprise a movable lever, movable button, movable plunger, movable slide or other movable member, or a combination thereof. In the exemplary arrangement the air release arm is in operative connection with the ramp 34. The exemplary air release arm as shown schematically in FIG. 14, is in operative connection with the ramp through the ramp stop 70. The ramp stop is operative to maintain the air release arm 176 in a first position when the ramp 34 is in the retracted position in the housing. In the exemplary arrangement when the air release arm is in the first position as shown in solid lines in FIG. 14, the air valve 174 is in the closed condition.

When the ramp 34 is moved responsive to the at least one spring 66 or otherwise toward the extended position as represented by the arrow in FIG. 14, the stop 70 moves to the position shown in phantom. This causes the air release arm 176 to move to a second position shown in phantom. The movement of the air release arm causes the air valve to change from the closed condition to the open condition. When the air valve is in the open condition, air in the pneumatic springs 170 is exhausted to atmosphere through the air valve at a rapid rate. This causes lowering of the suspension so that the emergency exit opening becomes lower and closer to the ground 166. As a result, when the ramp is moved to the extended position, the ramp extends at a smaller acute angle relative to the ground than would be the case if the bus suspension were not lowered. Further even if the ramp is not moved to the fully extended position, the movement of the emergency exit opening closer to the ground makes it easier for persons to exit from the interior area of the bus through the emergency exit opening 16. Of course it should be understood that these approaches are exemplary, and that in other arrangements other approaches may be used.

For example, in other exemplary arrangements the air valve may be actuated mechanically through operative connection with other components of the bus or the emergency egress system. For example in some arrangements changing a condition of a latch associated with the emergency exit door to an openable condition may be operative to cause the air valve to release the air in the suspension of the bus. Alternatively opening of the emergency exit door may cause movement of a lever or similar structure that is operative to cause the valve to change conditions. Alternatively in other arrangements an electrically actuated valve may be utilized. The electrically actuated valve may be operative responsive to receiving an electrical signal from a switch or one or more switches or circuit elements (or the loss of a signal from a switch or other circuit elements) to cause the air pressure to be released. Alternatively or in addition, the electrical circuitry may also be operative to cause a release of air pressure from the suspension responsive to circuitry such as an accelerometer which is operative to automatically determine that the bus or other vehicle has been involved in a collision or other impact, so as to cause the release of air pressure and facilitate egress from the emergency exit. Of course these approaches are exemplary of numerous different approaches that may be used.

FIGS. 15 through 19 demonstrate the operation of the previously described exemplary emergency egress system in connection with the exemplary school bus or other multi-passenger vehicle. FIG. 15 is a side view corresponding to FIG. 1 which shows the bus 10 in a normal operating position prior to the opening of the emergency exit door 18.

In an emergency one of the emergency exit door handles 20, either on the interior or the exterior of the emergency exit door, is moved to unlatch a latch or other engaging structure in operative connection with the door so it is in the openable condition and is no longer held in the closed position. When the emergency exit door 18 is moved from the closed position to the open position as shown in FIGS. 16 and 17, the housing door 24 which serves as a ramp access door moves responsive to the force of the torsion springs from the housing closed position to the housing open position. In the open position the ramp is movable out of the open end of the housing and through the ramp opening in the body of the bus. The exemplary ramp 34 moves from the retracted position toward the extended position a sufficient distance to enable the ramp to be more readily manually engaged.

Figure 19:
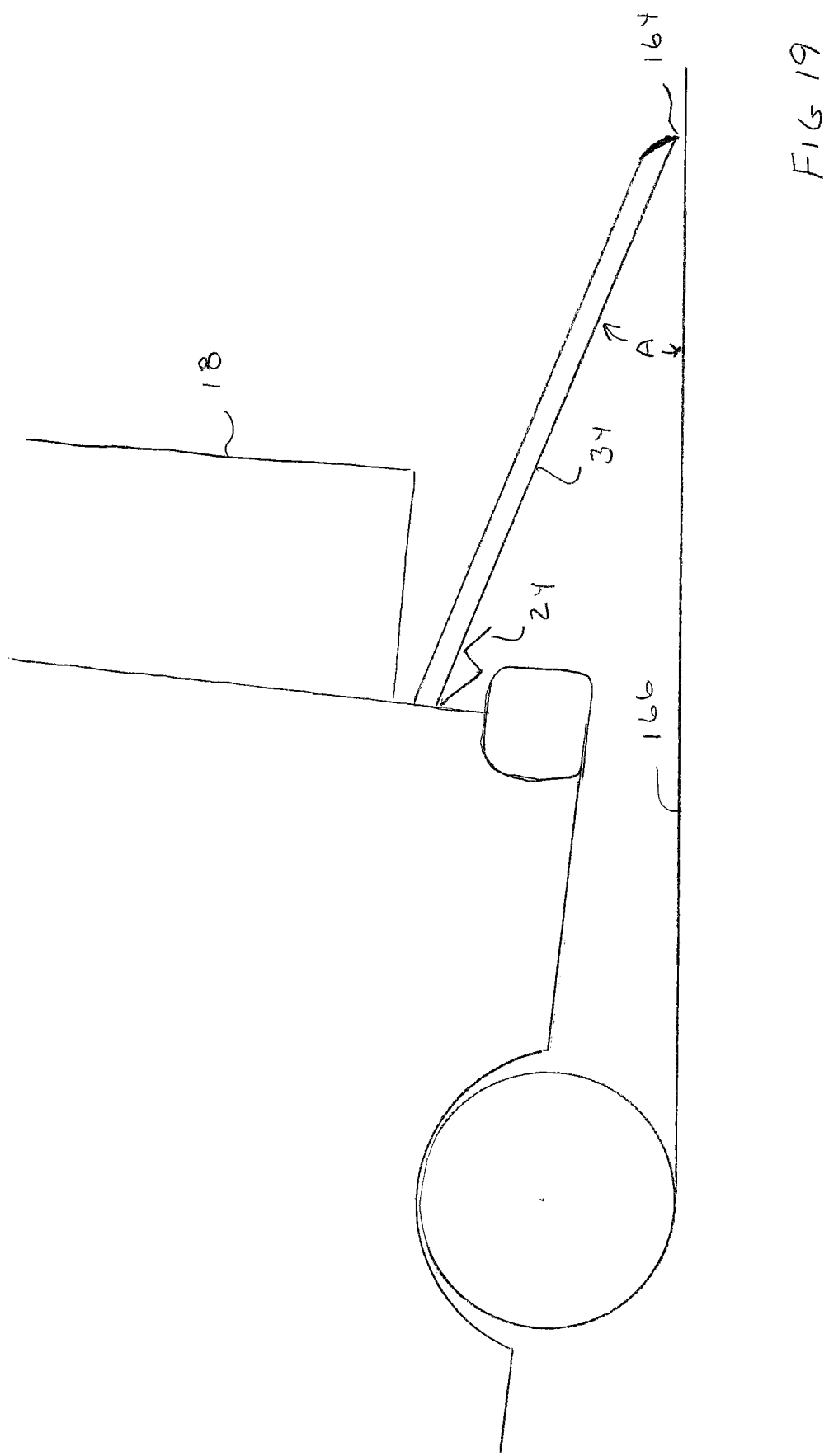
FIG. 19 is a side view of the exemplary bus corresponding to the condition of the emergency egress system as shown in FIG. 18.
Figure 20:
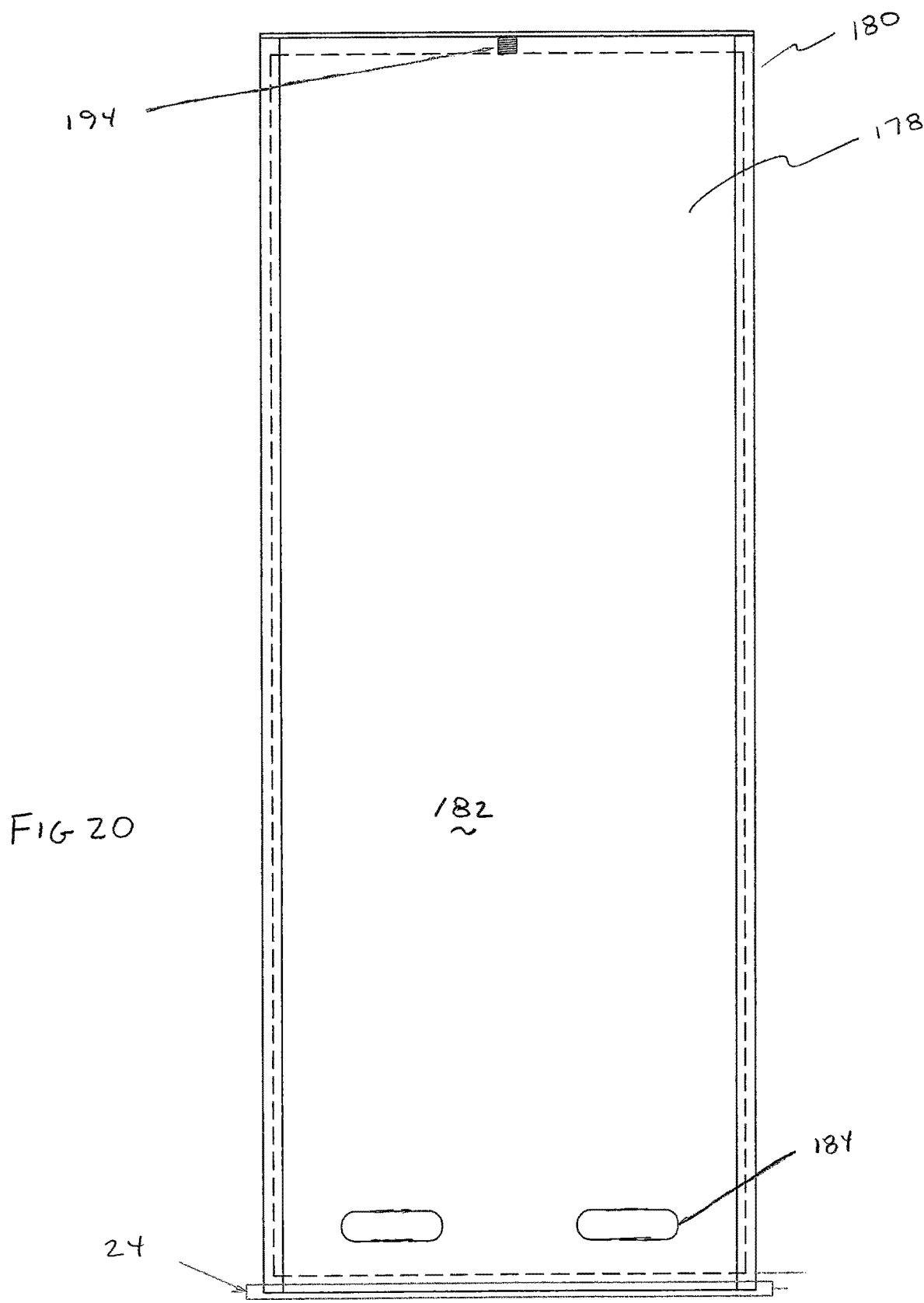
FIG. 20 is a top view of an alternative housing and alternative ramp of an exemplary arrangement.

In the exemplary arrangement a very short time after the emergency exit door 18 has been opened, the air is exhausted from the pneumatic springs lowering the suspension of the bus. This causes the emergency exit opening 16 to move closer to the ground 166 as shown in FIGS. 18 and 19. In this condition the ramp can be moved to the extended position in which the leading end 164 of the ramp 34 is in contact with the ground. The lowering of the bus suspension causes the ramp 34 to extend at a smaller acute angle (A) relative to the ground 166 than the ramp would extend if the suspension were not lowered. This makes it easier for persons to travel from the interior area 14 of the bus downward on the ramp 34 to reach the ground 166. In some exemplary arrangements this may facilitate the ability of persons who may have difficulty walking or who may be in wheelchairs the more easily leave the bus interior area 14 through the exit opening 16 so as to reach the ground in the event of an emergency. Numerous additional features may also be provided in alternative arrangements to provide for more rapid and secure egress under emergency conditions from the vehicle for persons of different sizes or with different physical conditions and capabilities.

FIGS. 20-24 show an alternative exemplary arrangement of a ramp 178. The exemplary ramp 178 is movably mounted in a housing 180. Housing 180 may be generally similar to housing 30 previously described. For purposes hereof the components of the alternative housing 180 will be described using the same reference numbers as those used in connection with the housing 30 except in cases where the structures differ.

The alternative ramp 178 includes a base portion 182. The base portion 182 is comprised of a unitary piece of suitable material such as aluminum. In some exemplary arrangements the base portion 182 may include a non skid upper surface to facilitate walking thereon. The base portion 182 includes handles 184 that extend therethrough similar to the previously described arrangement. The exemplary ramp 178 further includes a pair of vertically extending end portions 186, 188. In the exemplary arrangement the end portions comprise longitudinally elongated reinforcing struts that are in attached connection with the base portion 182. In the exemplary arrangement the end portions extend in and are movable within the cross-sectional recesses bounded by the side rails 36, 38 and the respective plastic inserts therein. In the exemplary arrangement the reinforcing struts which bound the end portions have a uniform cross-sectional profile which provides additional resistance to bending and deformation due to loading of the ramp.

Figure 21:
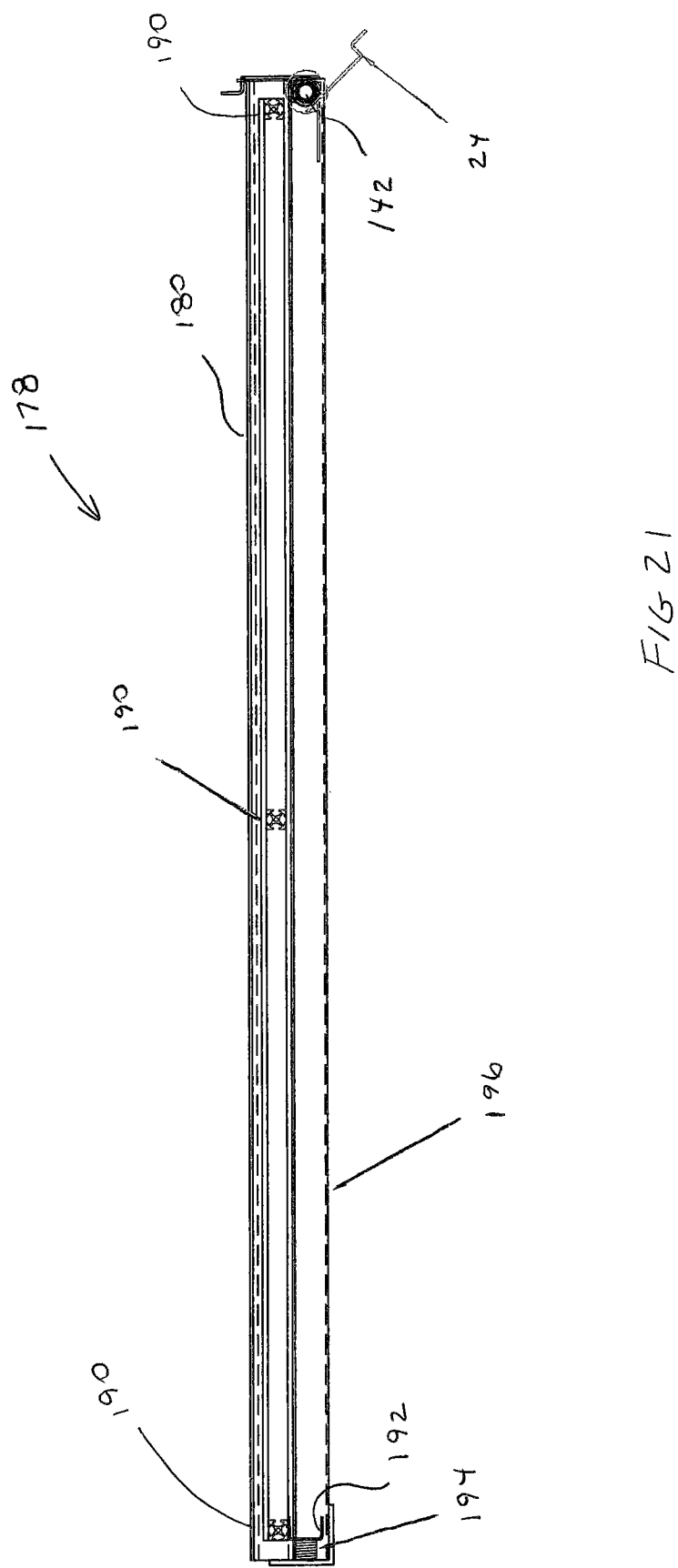
FIG. 21 is a side view of the alternative ramp and housing of FIG. 20.
Figure 22:
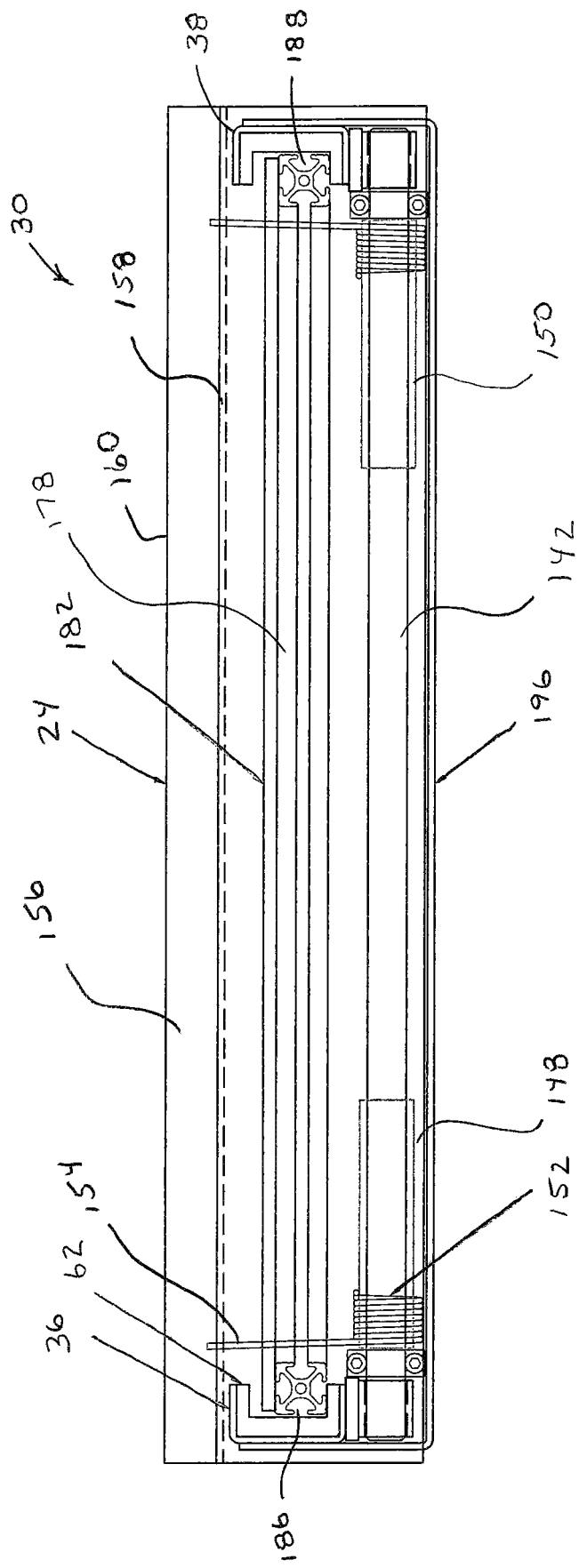
FIG. 22 is a rear view of the alternative ramp and housing.
Figure 23:
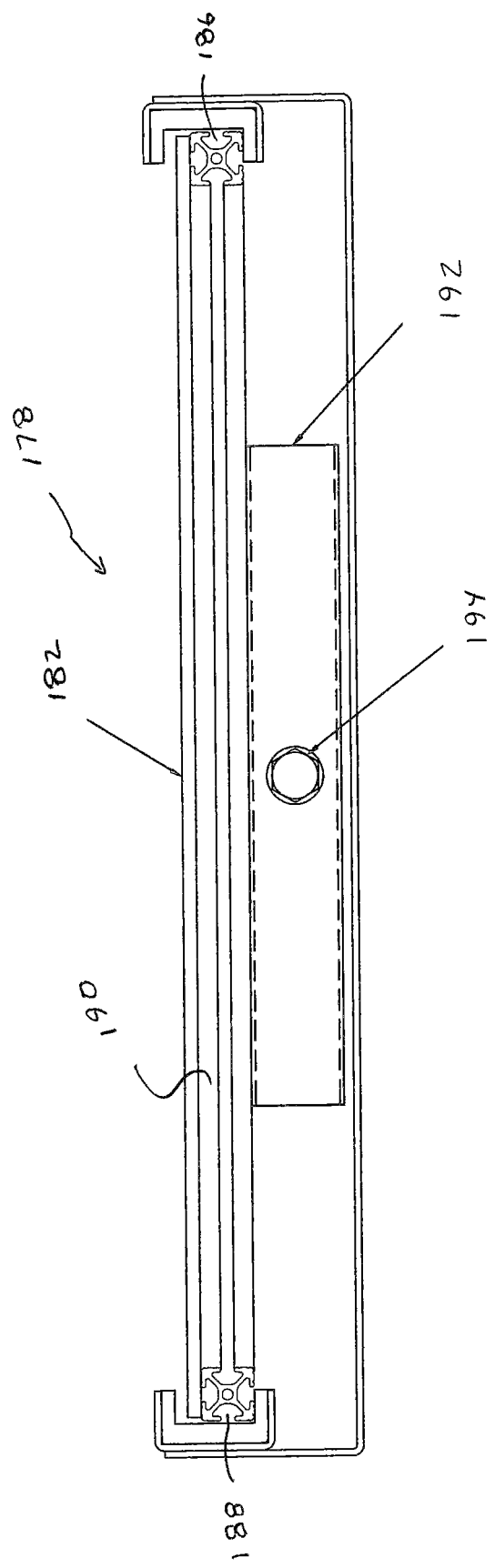
FIG. 23 is a front view of the alternative ramp and housing.

In the exemplary arrangement the ramp 178 further includes a plurality of transversely extending reinforcements 190. As shown in FIG. 21, in the exemplary arrangement the transverse reinforcements are positioned at the rear side and the front side of the ramp 178 as well as at the mid point thereof. The transverse reinforcements are held in engaged relation with the base portion and with the adjacent longitudinal reinforcing struts through welding or other fixed attaching methods. The transversely extending reinforcements 190 provide further rigidity and greater load carrying capability without deformation of the ramp 178. Of course it should be understood that this arrangement is exemplary and other configurations may be used.

The exemplary alternative ramp 178 is in operative connection with a ramp stop 192. The ramp stop 192 performs a function similar to the previously described ramp stop 70 in limiting the movement of the ramp outward from the housing to the extended position. The alternative stop 192 has a generally U-shaped cross section configuration that facilitates engagement with the shaft 142 and enables rotational movement of the ramp in engagement therewith. The stop 192 is also engageable with a compression spring 194. The compression spring 194 operates in a manner similar to spring 66 and biases the ramp from the retracted position toward the extended position.

In the exemplary arrangement the housing 180 is closed at its lower end by a panel 196. The exemplary panel 196 may comprise one or more planar panel segments that serve to limit the amount of dirt or other materials that may enter the interior area of the housing. The exemplary panel 196 in the exemplary arrangement helps to assure that dirt, debris, ice or other material will not accumulate within the housing in a manner that impedes the operation of the emergency egress system. In an exemplary arrangement, the panel 196 may be comprised of a lightweight material such as a plastic. However in other exemplary arrangements other arrangements and materials may be used. Further while in the exemplary arrangement the panel is configured to close the bottom of the housing, other arrangements may include closure panels at the front and/or top of the housing to further reduce the risk of infiltration of dirt or other debris. Further in exemplary arrangements sealing or gasketing material may be utilized for purposes of assuring that the panel or panels operate to maintain a liquid tight arrangement to prevent the infiltration of undesirable materials into the housing interior. Alternatively or in addition, suitable gasketing or other materials may also be utilized for purposes of sealing the abutting housing structures and the housing door 24 when the housing door is in the housing closing position. Of course these approaches are exemplary and other arrangements may be used.

FIGS. 25-28 show an alternative arrangement for mounting an exemplary ramp housing in fixed operative connection with the frame rails of a multi-passenger vehicle such as a school bus. FIGS. 25-28 show a frame attachment bracket 210. The exemplary frame attachment bracket includes a top piece 212 and a bottom piece 214. The exemplary top piece 212 in a vertical cross-section includes a vertically extending inner leg 216. The exemplary inner leg includes a vertically elongated opening 218. The top piece further includes a horizontally extending portion 220. The horizontally extending portion 220 extends transverse to the inner leg 216. Top piece 212 further includes a vertically extending outer leg 222. The outer leg 222 extends transverse to the horizontally extending portion 220 and downward generally parallel to the inner leg 216.

The exemplary bottom piece 214 includes a vertically extending inside leg 224. The inside leg 224 includes an opening 226. Horizontally extending portion 228 extends transverse to the inside leg 224. An outside leg 230 extends transverse to the horizontally extending portion 228 and upward generally parallel to the inside leg 224. As shown in FIG. 27 the top piece 212 and the bottom piece 214 are movably engageable with the openings 218 and 226 in overlapping relation. As shown in FIG. 27 with the top piece and the bottom piece in engagement, the pieces bound in vertical cross-section a frame rail accepting area 232. The frame rail accepting area 232 may be varied in its vertical dimension while maintaining openings 218 and 226 in overlapping relation.

Figure 28:
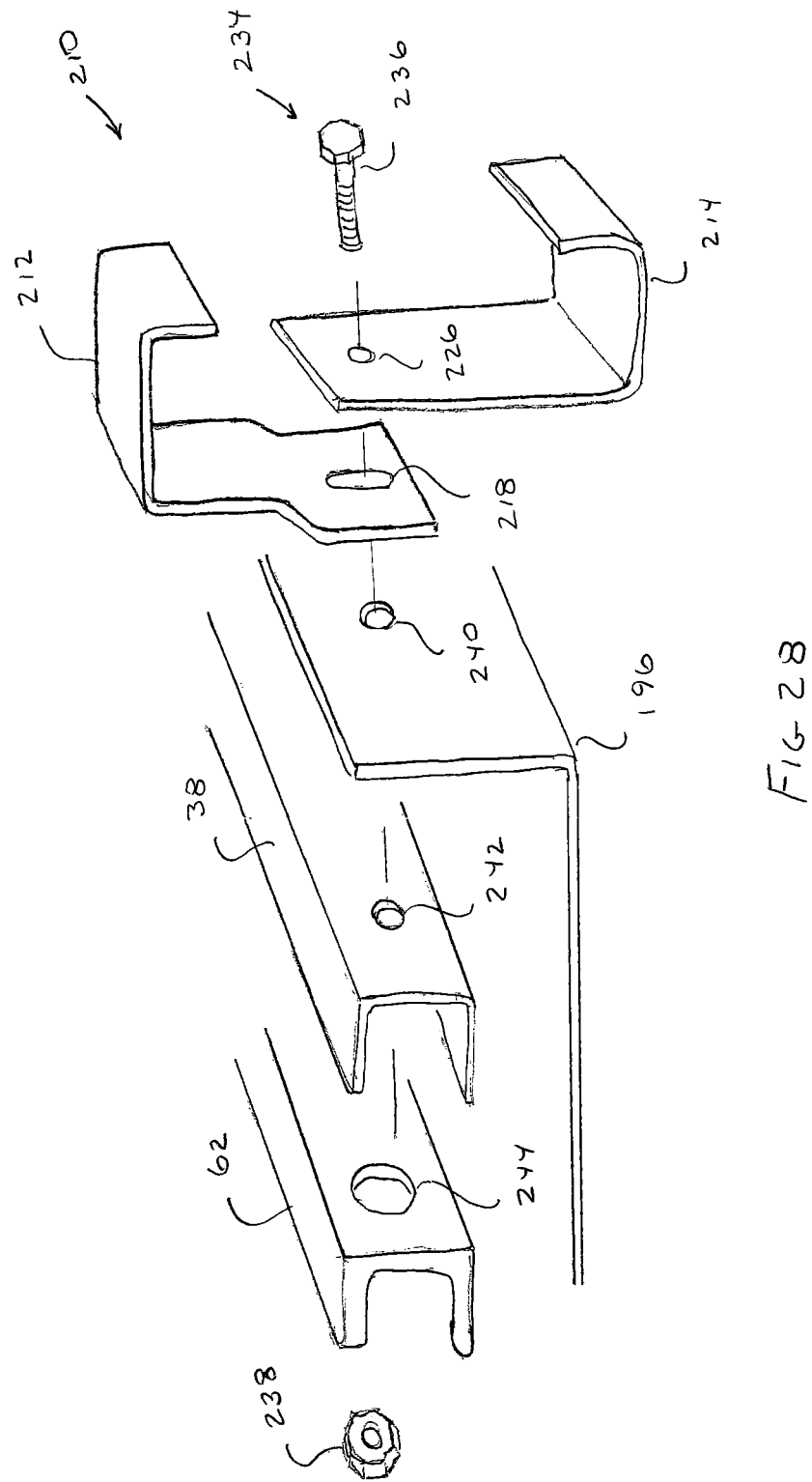
FIG. 28 is an exploded view of the exemplary frame attachment bracket and a portion of an exemplary ramp housing and side rail.

As shown in FIG. 28 the exemplary frame attachment bracket 210 further includes at least one fastener generally indicated 234. An exemplary arrangement the fastener includes a threaded bolt or stud 236 and a releasably engageable nut 238. In the exemplary arrangement the bolt extends through the opening 226 in the bottom piece 214 and the elongated opening 218 in the top piece 212. In an exemplary arrangement the fastener extends through an opening 240 in the cover panel 196. The fastener also extends through an opening 242 that extends through side rail 38 and into an aperture 244 in the plastic insert 62. In the exemplary arrangement the aperture 244 is sized so that the nut 238 of the fastener 234 may be selectively rotationally moved therein.

Figure 30:
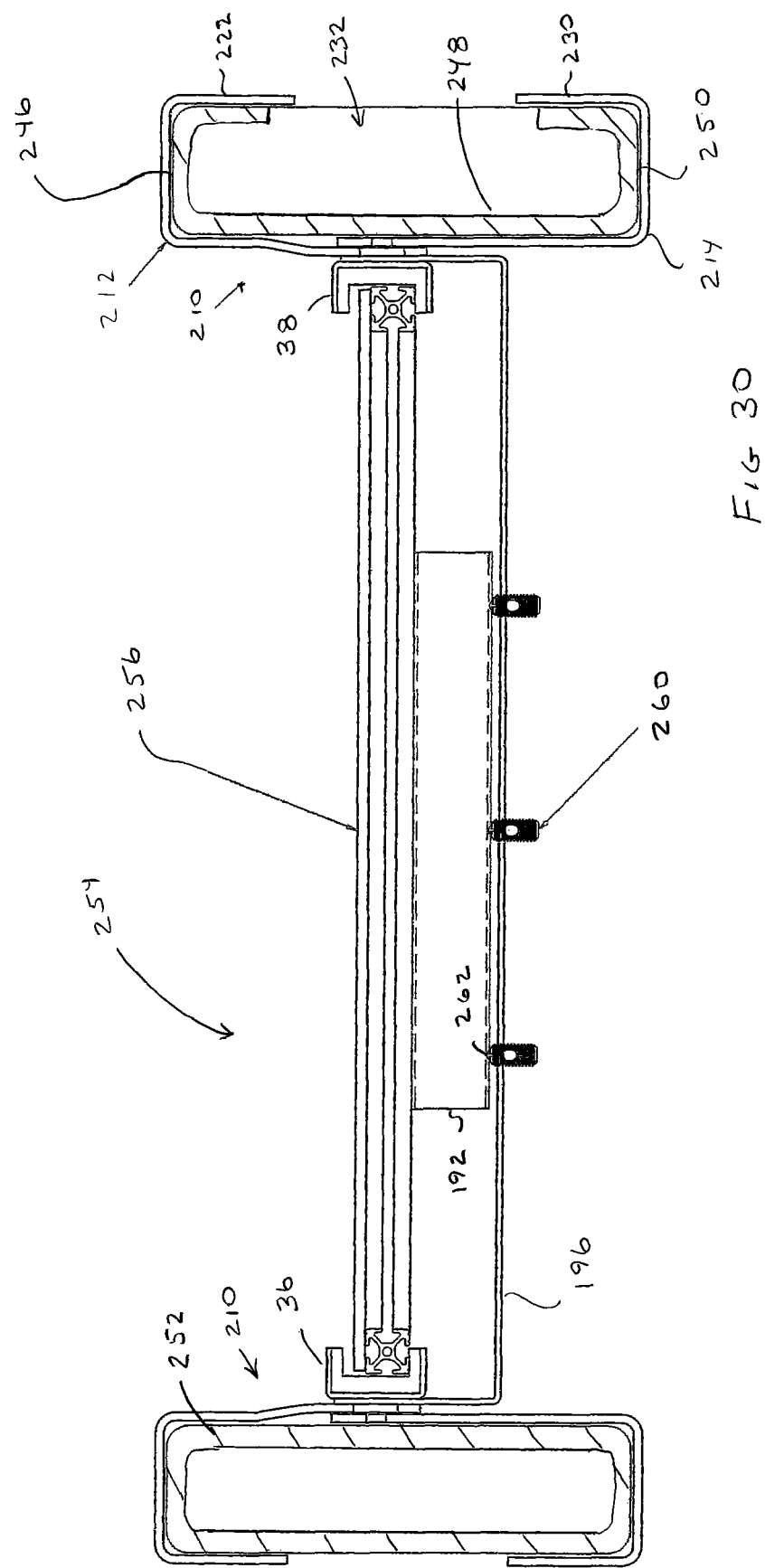
FIG. 30 is a front view of the alternative emergency egress system arrangement shown in FIG. 29.

In the exemplary arrangement of the frame attachment bracket 212 the nut of the fastener 234 can be rotationally positioned in a first position in which the top piece 212 and the bottom piece 214 are sufficiently loosely engaged so that the top piece and the bottom piece may be vertically movable relative to one another while being held in engagement. As represented in FIG. 30, in this first position of the fastener 234, the top piece 212 is selectively movable relative to the bottom piece and is engageable with a rail top 246 of an exemplary adjacent frame rail 248. Further in this first position of the fastener, the bottom piece 214 is engageable with a rail bottom 250 of the frame rail 248. As represented in FIG. 30 in the exemplary arrangement the top piece 212 is operative to engage the frame rail within the frame rail accepting area 232. Further in the exemplary arrangement the horizontally extending portion 220 of the top piece 212 and the horizontally extending portion 228 of the bottom piece 214 extend across the rail top and rail bottom of the frame rail 248, respectively. Further in the exemplary arrangement the outer leg 222 of the top piece and the outside leg 230 of the bottom piece are operative to hold the frame rail 248 in engagement with the bracket and in the frame rail accepting area 232.

As can be appreciated from FIG. 28, when the fastener 234 is moved to a second position by tightening the nut 238 in engaged relation with the threaded bolt or stud 236, the top piece 212 and the bottom piece 214 of the frame attachment bracket 212 are held in fixed engaged relation. As a result the frame rail 248 is held in fixed operatively engaged relation with the frame attachment bracket and the ramp housing components attached thereto.

In exemplary arrangements the frame attachment bracket 210 is configured to be engageable with a plurality of different sized frame rails. Such different frame rails may have different vertical dimensions. However such different sized frame rails may be engaged with an adjacent frame attachment bracket 210 by changing the vertical distance between the horizontally extending portions of the top piece 212 and the bottom piece 214. Further as can be appreciated, the exemplary frame attachment bracket is configured to engage different configurations of frame rails. For example bracket 210 may be attached in fixed engagement with a frame rail that includes a C shape cross-section like frame rail 248. Also as can be appreciated frame rails 28 discussed in connection with previous arrangements also include a C shape cross-section. Further as shown in FIG. 30, alternative frame rails such as a full box frame rail 252 nonetheless includes a C shape portion in vertical cross-section which can be engaged by the exemplary frame attachment bracket 210. Of course it should be understood that this bracket arrangement is exemplary and other arrangements that utilize the principles described herein may be utilized for engaging exemplary ramp housings in operatively fixed engagement with the frame rails of a vehicle.

In the exemplary arrangements a plurality of frame attachment brackets 210 may be longitudinally disposed on each lateral side of a ramp housing, such as housing 254 shown in FIG. 30, to hold the housing in operatively fixed engaged relation with the frame rails of the vehicle. In some arrangements the number and lateral spacing of the frame attachment brackets will depend on the length and weight of the housing structure and the ramp. Further as can be appreciated the exemplary frame attachment brackets may be further modified through the use of elongated openings in place of opening 226 and/or one or more elongated openings, to provide vertical adjustability of the housing for the ramp. As can be appreciated, through the inclusion of vertically elongated openings in each of the inner leg and inside leg of the top piece 212 and bottom piece 214 respectively, the vertical location of each of the side rails 36 and 38 of the ramp housing may be adjusted so as to be suitably aligned with a ramp opening in the body of the vehicle through which the ramp may extend. Thus such vertical adjustment enables positioning of the housing opening and the ramp access door so as to be in a suitable operative position to enable operation in conjunction with an emergency exit door of the particular vehicle configuration.

Further in exemplary arrangements the frame attachment bracket 210 may be attached to suitable lateral spacers so as to achieve mounting of the ramp housing 254 horizontally intermediate of frame rails that may be spaced horizontally at a distance greater than the horizontal width of the ramp housing. Such spacers may include suitable sized blocks, strips, bushings, washers, shims or similar structures. Of course numerous different approaches may be taken utilizing the features described to achieve suitable mounting of the ramp housing on the particular vehicle.

Figure 29:
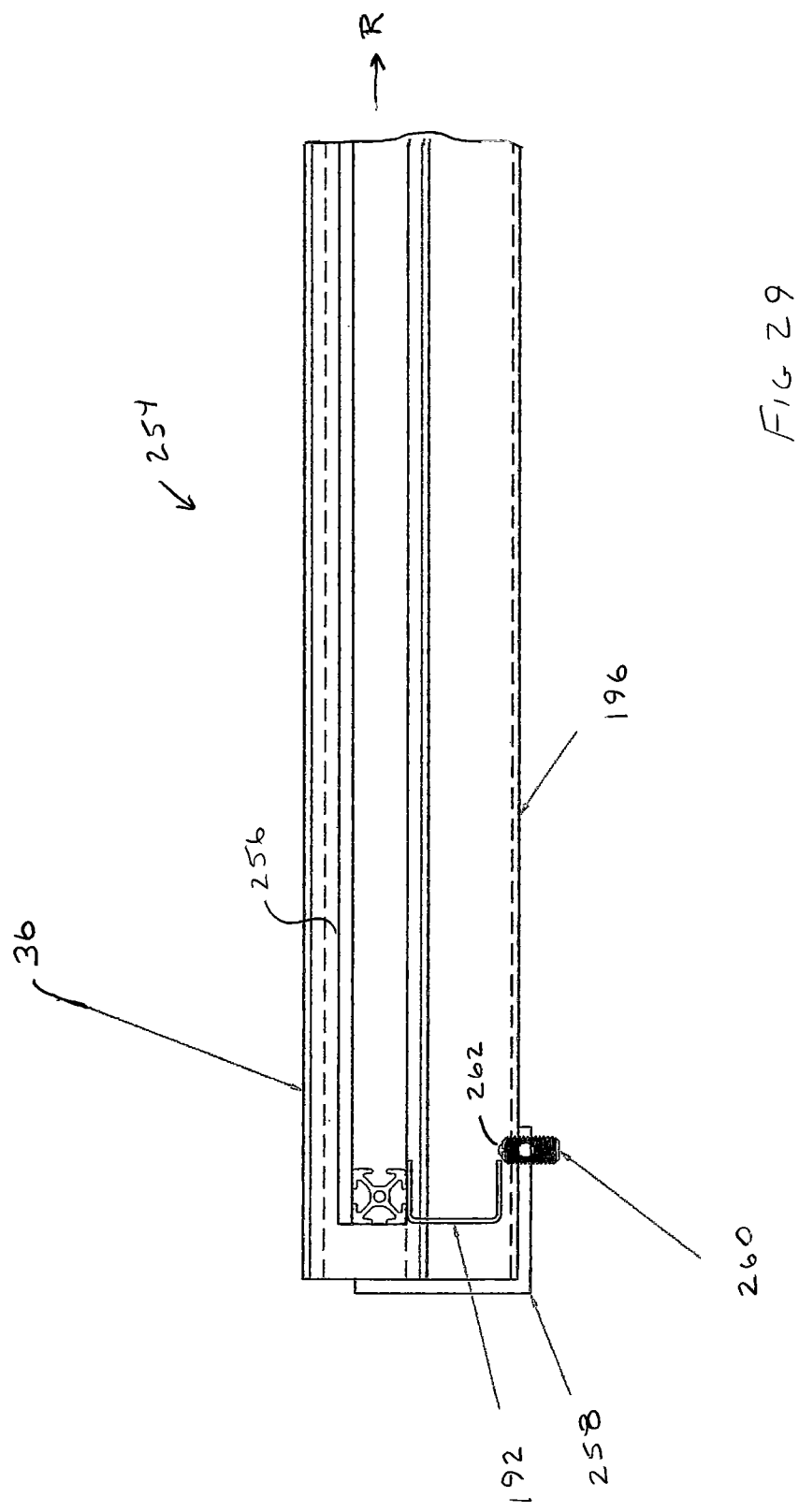
FIG. 29 is a side view of a housing and ramp of an alternative emergency egress system arrangement.

FIGS. 29 and 30 show a further alternative exemplary arrangement of an extendable ramp 256 that is housed within ramp housing 254. The exemplary ramp and ramp housing may be similar to those discussed previously in connection with ramp housing 180. However, ramp 256 is configured so that it is not automatically moved outward from the housing through the ramp opening when the ramp access door is opened. Such a configuration may be useful in situations where it is desired that the operator of the vehicle deliberately act to move the ramp from the retracted position toward the extended position so as to cause the ramp to be deployed. FIG. 29 is a view similar to FIG. 24 and showing the ramp housing 254 and ramp 256. Similar to ramp 178, ramp 256 includes a stop 192 attached thereto. In the exemplary arrangement the stop 192 limits the outward movement of the ramp 256. However in the exemplary arrangement housing member 258 includes a plurality of detents thereon. In the exemplary arrangement each of the detents 260 is in threadably engaged relation with the housing member 258 so as to be selectively vertically positionable to engage the lower rearward facing leading surface of the stop 192. In the exemplary arrangement each detent 260 includes an outwardly biased upward facing spring-loaded ball 262. Of course in other arrangements other types and configurations of detents may be used. Each detent 260 is operative to hold the ramp 256 through engagement with the stop 192, in the retracted position. However when a release force schematically indicated R in FIG. 29 is applied to the ramp 256, the force of the detents 260 holding the ramp in the retracted position is overcome, and the ramp is released to move toward the extended position.

In exemplary arrangements in which the ramp configuration shown in FIGS. 29 and 30 is utilized, the end of the ramp including the handles may be accessed in the retracted position when the ramp door is open, through the ramp opening and the open end at the back of the housing. The ramp and ramp handle such as handles 184 may become accessible as a result of the ramp access door automatically moving to the door open position responsive at least in part to the emergency exit door being in the openable position or being open. Alternatively in some arrangements which are later discussed, the ramp access door may be manually opened by a bus driver or other vehicle operator. With the ramp access door in the open position the operator is enabled to access the ramp handles through the ramp access opening and apply the release force to the ramp. Applying a force at least as great as the release force toward the extended position causes the ramp to move from the retracted position, overcoming the holding force of the detents, and moves the ramp towards the extended position. Also as can be appreciated, when the ramp is to be returned from the extended position to the retracted position the ramp may be moved sufficiently inward so that the stop 192 is again engaged with the detents. This may be accomplished in some exemplary configurations by having the ramp and the ramp access opening and door configured so that the door cannot be closed until the ramp is moved to the retracted position. Of course it should be understood that this approach is exemplary and in other arrangements other approaches may be used.

Figure 32:
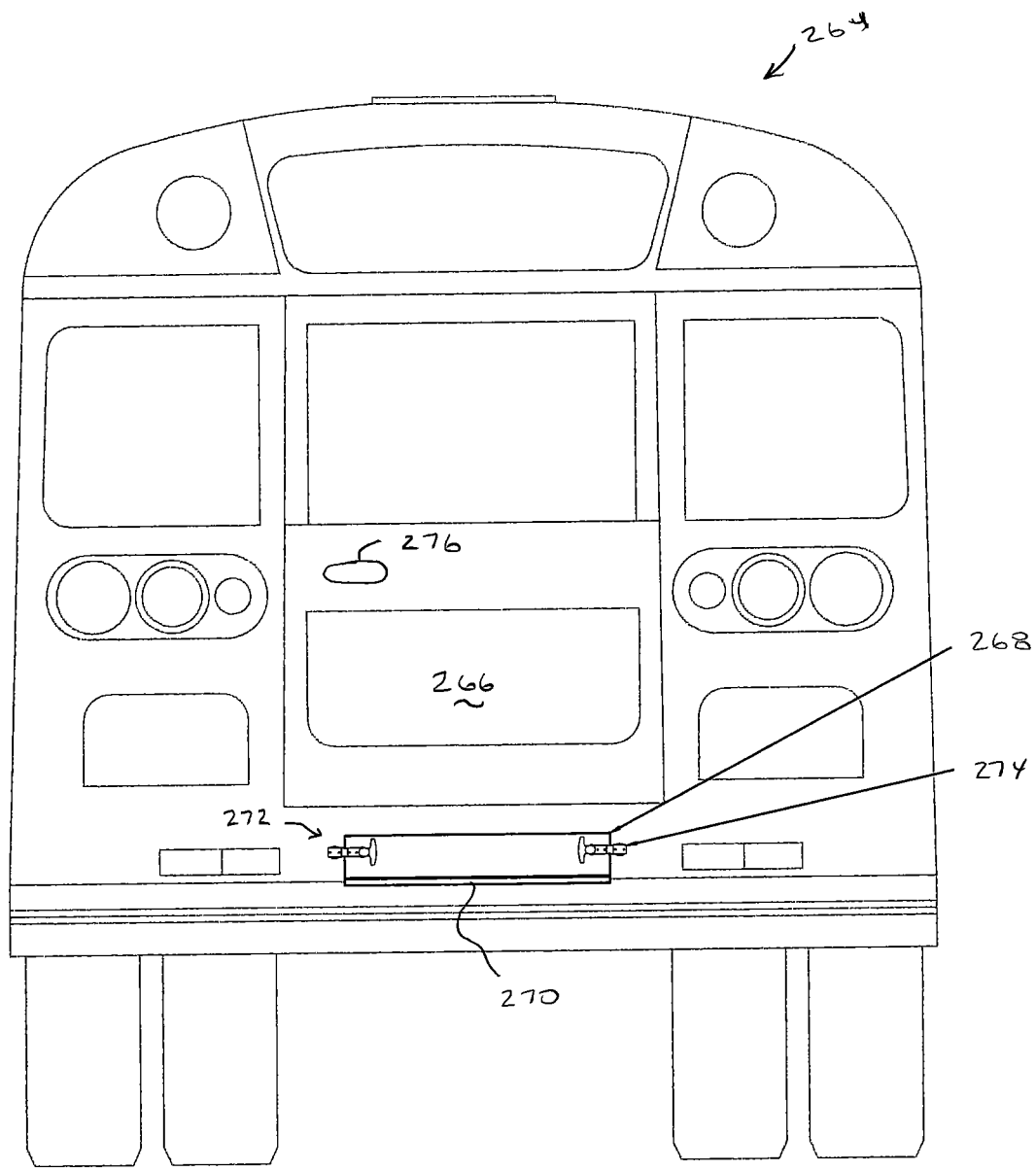
FIG. 32 is a rear view of an alternative multi-passenger vehicle such as a school bus including an alternative ramp access arrangement.

FIG. 32 shows an alternative multi-passenger vehicle such as a bus 264 which includes a further alternative arrangement of an emergency egress system. In this exemplary arrangement a ramp and ramp housing that may be similar to those previously described, are extendable below an emergency exit door 266. However in this exemplary arrangement, the ramp access door 268 is not in operative engagement with the emergency exit door 266. In this exemplary arrangement the ramp access door 268 is rotatable about a horizontally elongated hinge 270. Opening the ramp access door 268 enables access through a ramp opening through the body of the bus (behind the closed door 268 in FIG. 32) to access the ramp. In this exemplary arrangement the ramp access door is held in the closed position by a pair of manually releasable latches 274. In this exemplary arrangement the vehicle operator or other person is enabled to access the ramp by releasing the latches 274 and opening the ramp access door 268. The operator may then move the ramp to the extended position. In some such arrangements opening the ramp access door and/or extending the ramp may cause the bus suspension to be lowered in a manner like that previously discussed. This ramp access configuration may be used for example by an operator who uses the ramp in the deployed position to access a handle 276 or other actuator to open the emergency exit door 266 from the outside. Also as can be appreciated in this exemplary arrangement, the ramp access door 268 is positioned so that a ramp access door having a configuration that automatically opens in response to opening of the emergency exit door of the type previously described could be utilized. Of course it should be understood that this configuration is exemplary and in other arrangements other approaches may be used.

Figure 33:
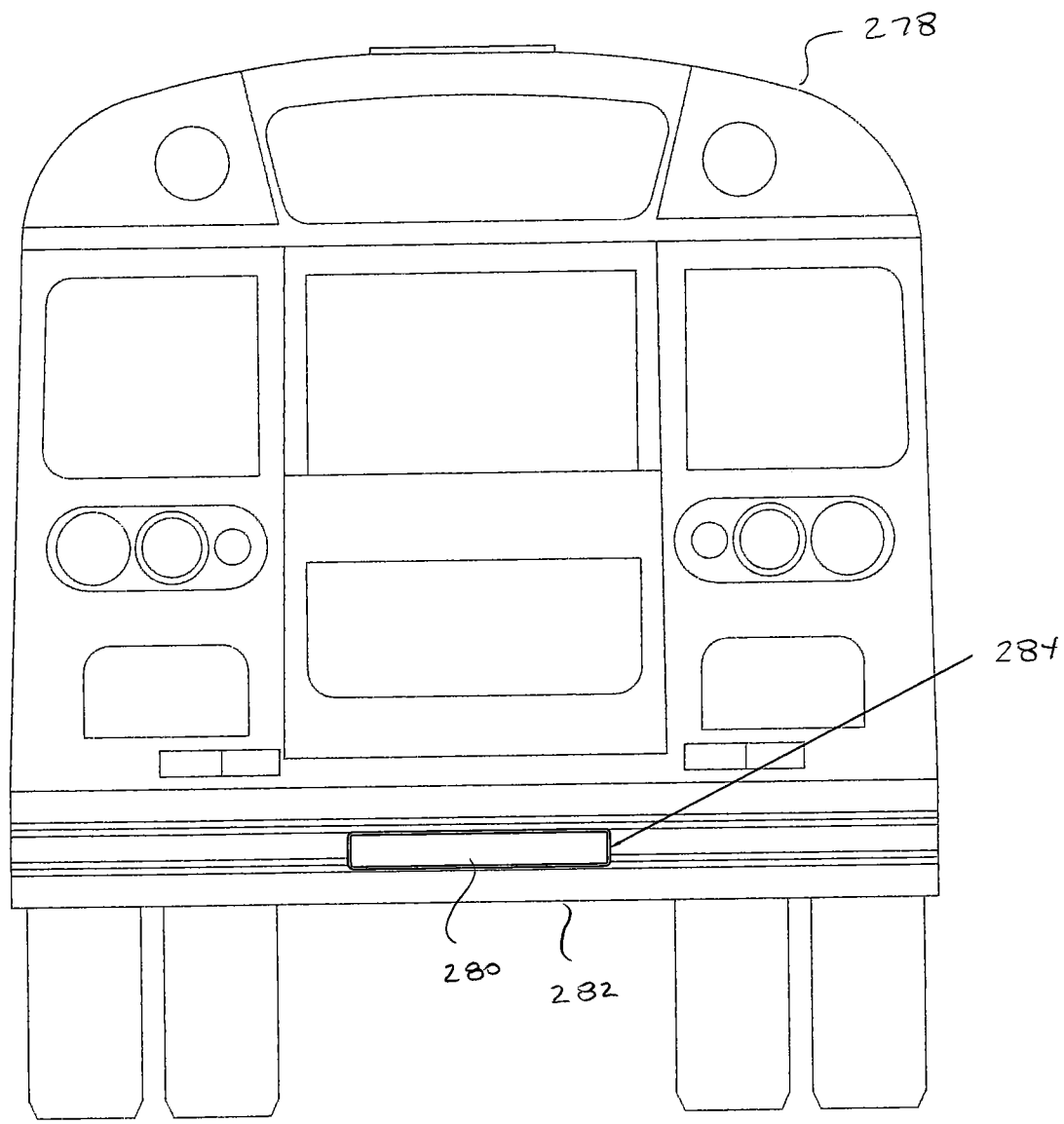
FIG. 33 is a rear view of an alternative multi-passenger vehicle such as a school bus including a ramp sleeve that includes a ramp opening that extends through a bumper of the vehicle.
Figure 34:
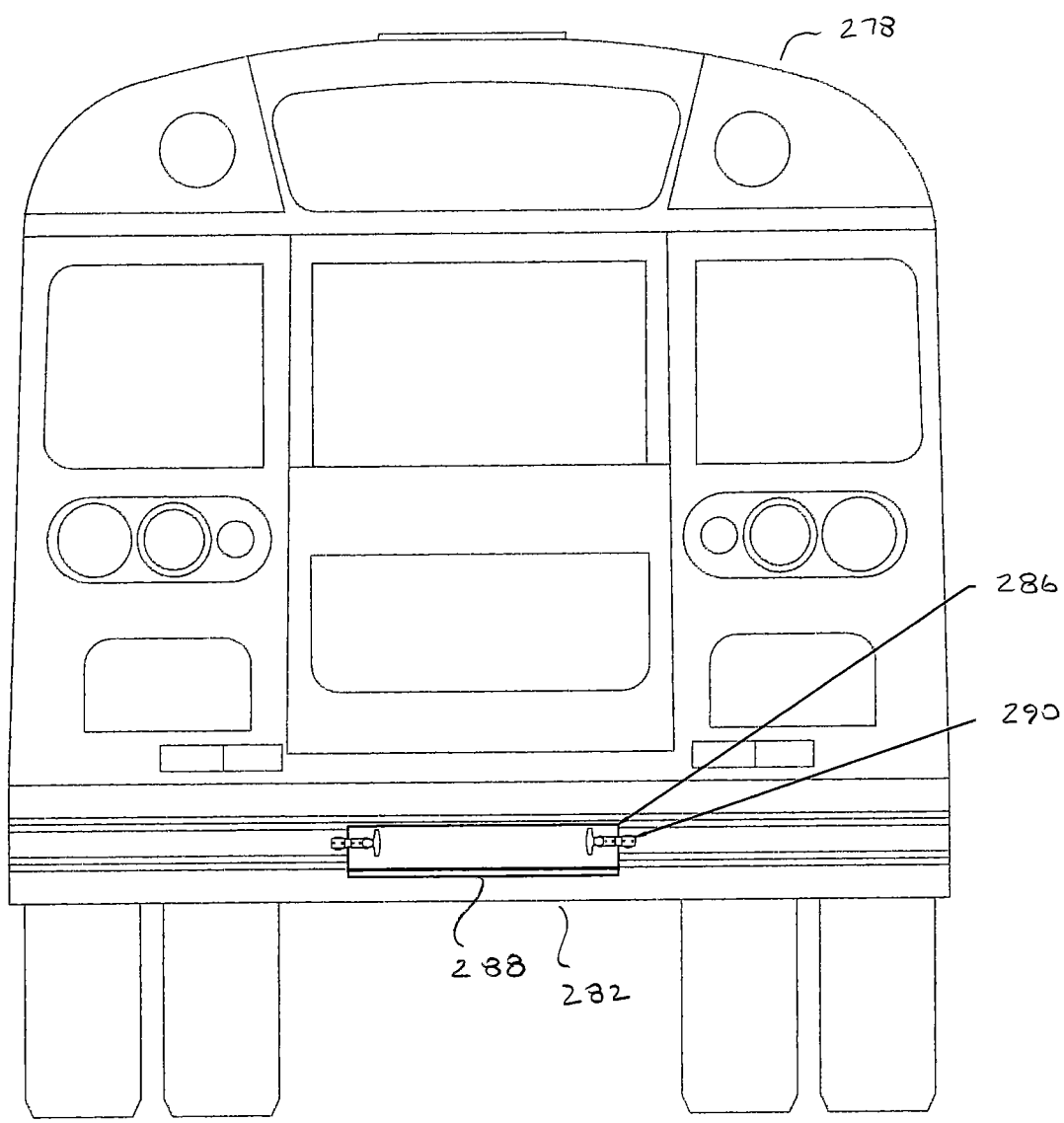
FIG. 34 is a rear view of the vehicle shown in FIG. 33 including an alternative ramp access door installed in overlying relation of the ramp opening.

FIGS. 33 and 34 show yet another multi-passenger vehicle such as a bus 278. Bus 278 includes a further alternative emergency egress system. In this alternative emergency egress system the ramp is deployable through a ramp access opening 280 that extends through a bumper 282 of the vehicle. In this exemplary arrangement a rectangular sleeve 284 is positioned in the ramp access opening. In the exemplary arrangement the sleeve 284 is comprised of a steel or other suitably rigid material construction that is welded or otherwise put in place so as to maintain the structural rigidity of the bumper 282. In this exemplary arrangement a ramp access door 286 is movably mounted about a hinge 288 to enable selectively opening and closing the ramp access opening 280. In this exemplary arrangement a pair of latches 290 are used to hold the ramp access door 286 in the closed position. Similar to the previously described arrangement, the latches are utilized to hold the ramp access door 286 in the closed position during normal bus operation. When it is desired to deploy the ramp (and also in some exemplary arrangements also automatically lower the bus suspension) the latches 290 may be released and the access door 286 moved to the door open position. This enables accessing the ramp and moving it from the retracted position to the extended position to provide suitable egress from the emergency exit. Of course as with the other described arrangement, suitable structures for automatically opening the ramp access door responsive to the emergency exit door being in the openable position may alternatively be provided in exemplary arrangements of this type where the ramp access opening extends through a portion of the vehicle bumper.

In some exemplary arrangements it may be desirable for the operator of the bus or other vehicle to be aware whenever the emergency exit door or ramp access door may be unsecured or in the open position. This may be particularly useful in situations where the ramp has been used or tested by being extended, and then must be returned to the retracted position. In some exemplary arrangements in which the ramp access door opens responsive to the emergency exit door becoming openable, the emergency exit door may be closed without closing the ramp access door. This may be undesirable in some circumstances as it may enable the ramp to be accessed or moved toward the extended position by unauthorized persons. However even in circumstances where the ramp is accessible and only movable manually, it may be desirable for the vehicle operator to know when the door that enables access to the ramp is in the open or unsecured position.

Figure 31:
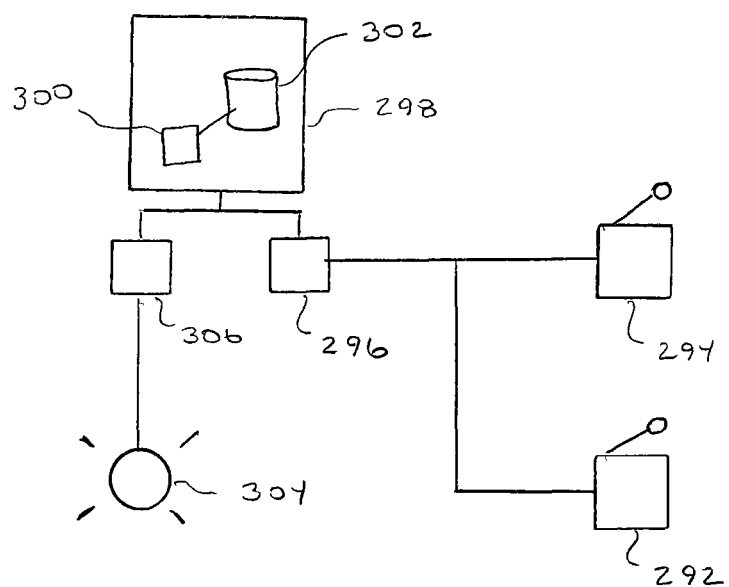
FIG. 31 is a schematic view of the exemplary circuitry for alerting a driver of the vehicle that the emergency exit door or ramp access door is in an unsecured position.

FIG. 31 is a schematic arrangement showing an arrangement for detecting and indicating to the vehicle operator when either the emergency exit door or the ramp access door is in an unsecured position. In the exemplary arrangement an electrical switch 292 is in operative connection with the ramp access door. In exemplary arrangements the switch 292 may be a plunger switch, rocker switch or other suitable switch for detecting the position of the ramp access door. The switch may be operative to detect that the ramp access door is not closed, and thereby in the unsecured position. Alternatively in other exemplary arrangements switch 292 may comprise a photosensor switch, magnetic switch or other contact or non-contact switch that is suitable for detecting the position of the ramp access door.

A switch 294 is in operative connection with the emergency exit door. Switch 294 may be of a switch type similar to switch 292. Switch 294 is operative to detect that the emergency exit door is in an openable condition. This may be done by the switch detecting a position of a surface of the door or by detecting a position of the latch or other engaging member that is operative to hold the door closed or to enable movement of the door to an open position. Numerous different types of switches may be utilized for this purpose.

In the exemplary arrangement switches 292 and 294 are in operative connection with at least one interface 296. At least one interface 296 comprises circuitry that enables the signals from the switches to be utilized to communicate with a controller 298. In exemplary arrangements the controller 298 comprises circuitry which is operative to receive signals indicative of the condition of the switches and to provide appropriate output signals in response thereto. In exemplary arrangements the controller 298 may include circuitry such as a processor 300 and one or more data stores 302. In exemplary arrangements circuitry associated with controller 298 may operate responsive to circuit executable instructions included in the at least one data store 302 to cause signals to be output responsive to input signals corresponding to certain programmed conditions.

The exemplary arrangement further includes at least one output device 304. The at least one output device may include a visual output device such as a flashing light or an audible output device such as a warning siren or beeper. The exemplary at least one output device is in operative communication with the controller 298 through one or more suitable interfaces schematically indicated 306.

In operation of the exemplary arrangement if either of the switches 292 or 294 are operative to detect that the emergency exit door is openable or the ramp access door is not closed or otherwise secured, the circuitry of controller 298 is operative to cause the at least one output device 304 to provide an indication thereof. In some exemplary arrangements the controller 298 may operate to provide the indication only at selected times during vehicle operation. This may include for example providing a warning output in the event that the operator places the transmission of the bus or other vehicle in drive when the emergency exit door or ramp access door is not secured. Of course it should be understood that the controller or other suitable circuitry may provide detectable outputs to the operator at other times or under other circumstances during vehicle operation. Thus in the exemplary arrangement the operator of the vehicle is alerted in the event that the driver commences certain operations of the vehicle without both the ramp access door and the emergency exit door being suitably secured. Of course it should be understood that this arrangement is exemplary and other arrangements other approaches may be used.

Figure 35:
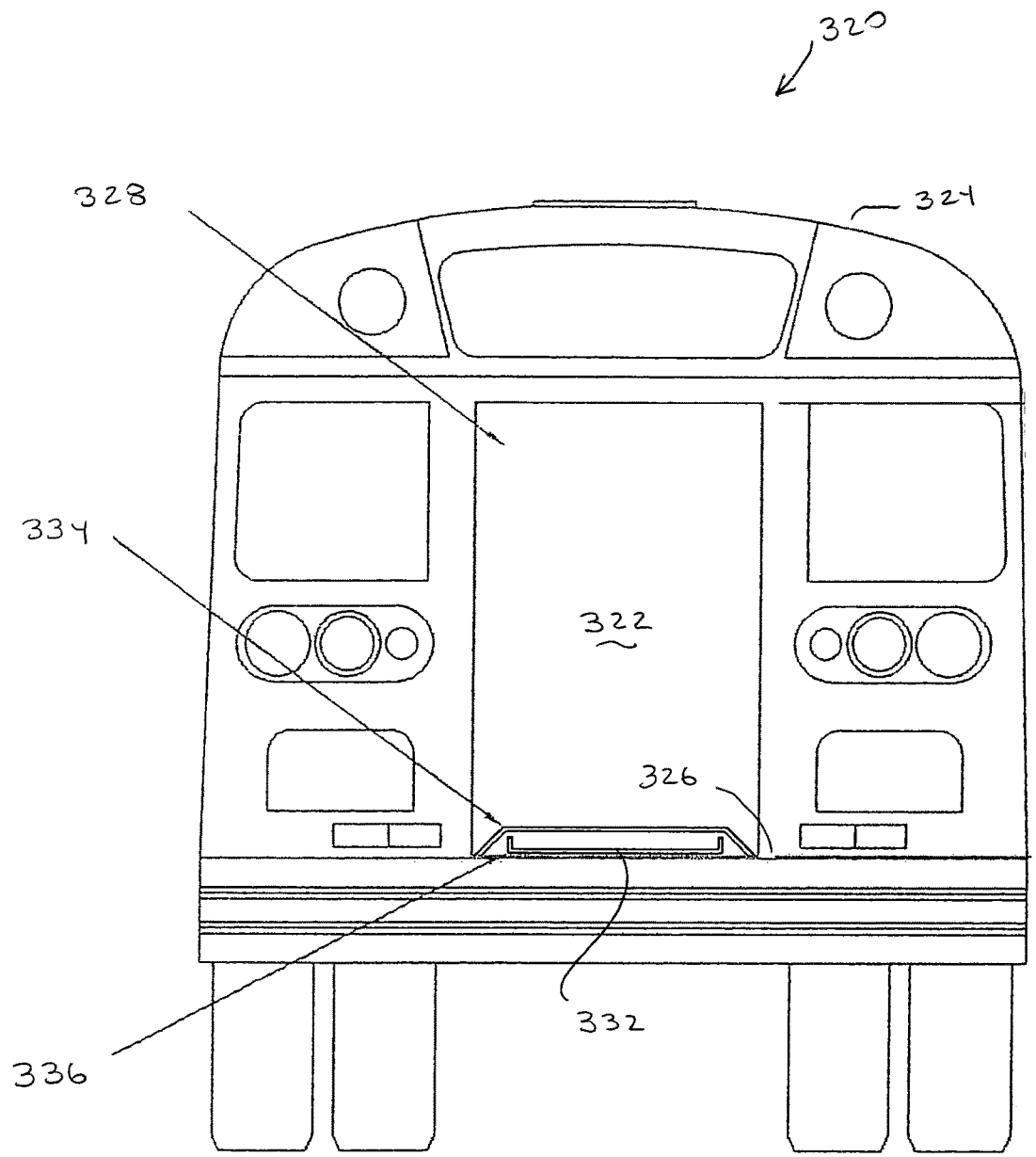
FIG. 35 is a rear view of a multi-passenger vehicle such as a school bus including a further alternative emergency egress arrangement, but without the emergency exit door being shown.

FIG. 35 shows a further alternative multi-passenger vehicle such as a school bus 320. Similar to the previous arrangements bus 320 includes an interior area 322 of the bus body 324 in which passengers are housed during operation. The bus interior area is bounded at a bottom side by a bus floor 326. The bus body includes an emergency exit opening 328. The emergency exit opening 328 is normally closed by an emergency exit door 330 during operation. FIGS. 35 and 37 do not show the emergency exit door to facilitate viewing other structures. The emergency exit door may be moved from a closed position closing the emergency exit opening to an open position such as shown in FIG. 36 in a manner like that previously discussed.

In the exemplary arrangement a ramp 332 is positioned within a housing 334. The ramp may have a configuration like the ramps previously discussed. The housing 334 includes a housing opening 336. In the exemplary arrangement when the emergency exit door is moved to the open position the ramp 332 is extendable through the housing opening 336 to the ground in a manner like that shown in FIG. 37.

Figure 36:
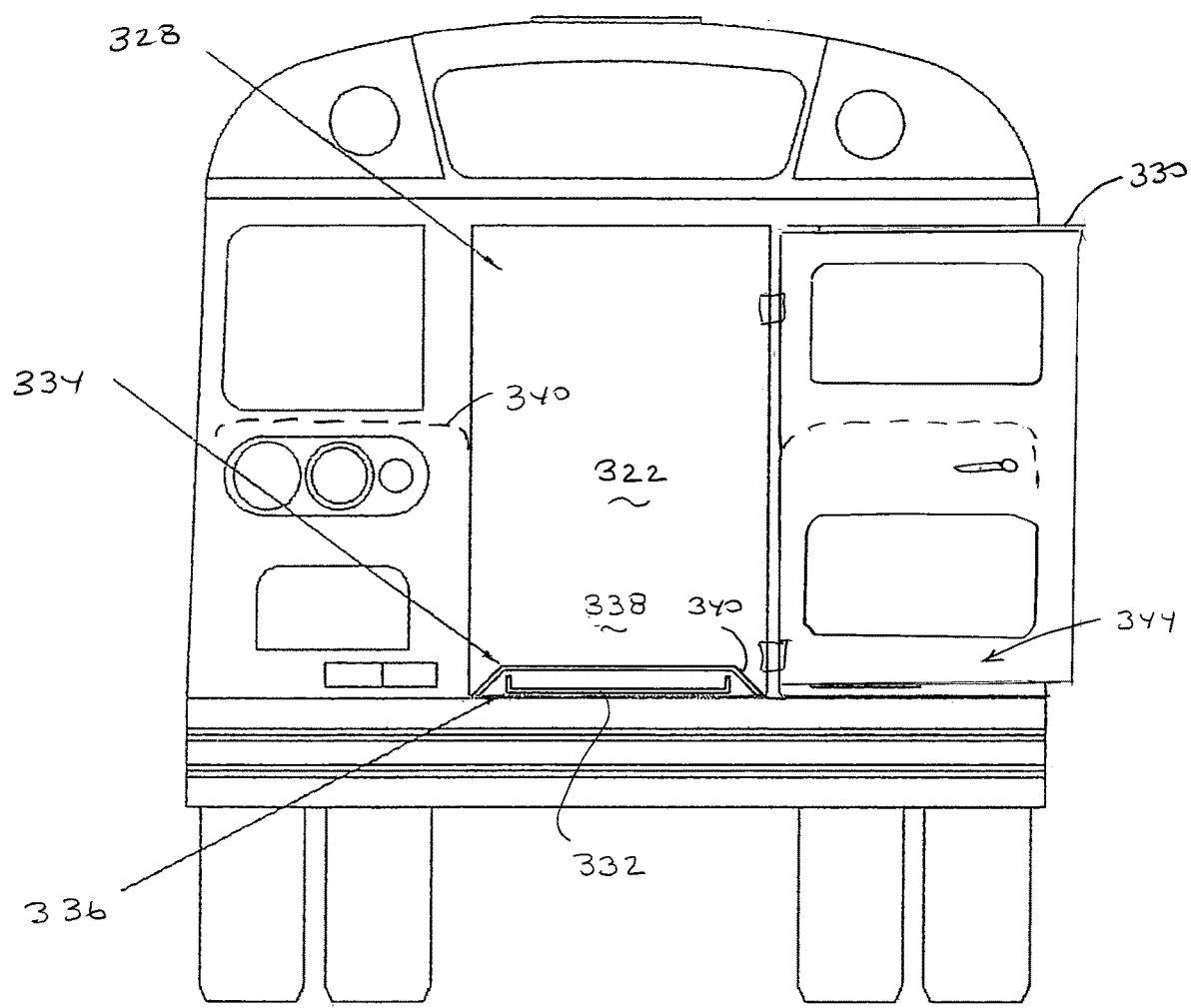
FIG. 36 is a rear view similar to FIG. 35 and including the emergency exit door shown in an open position.
Figure 37:
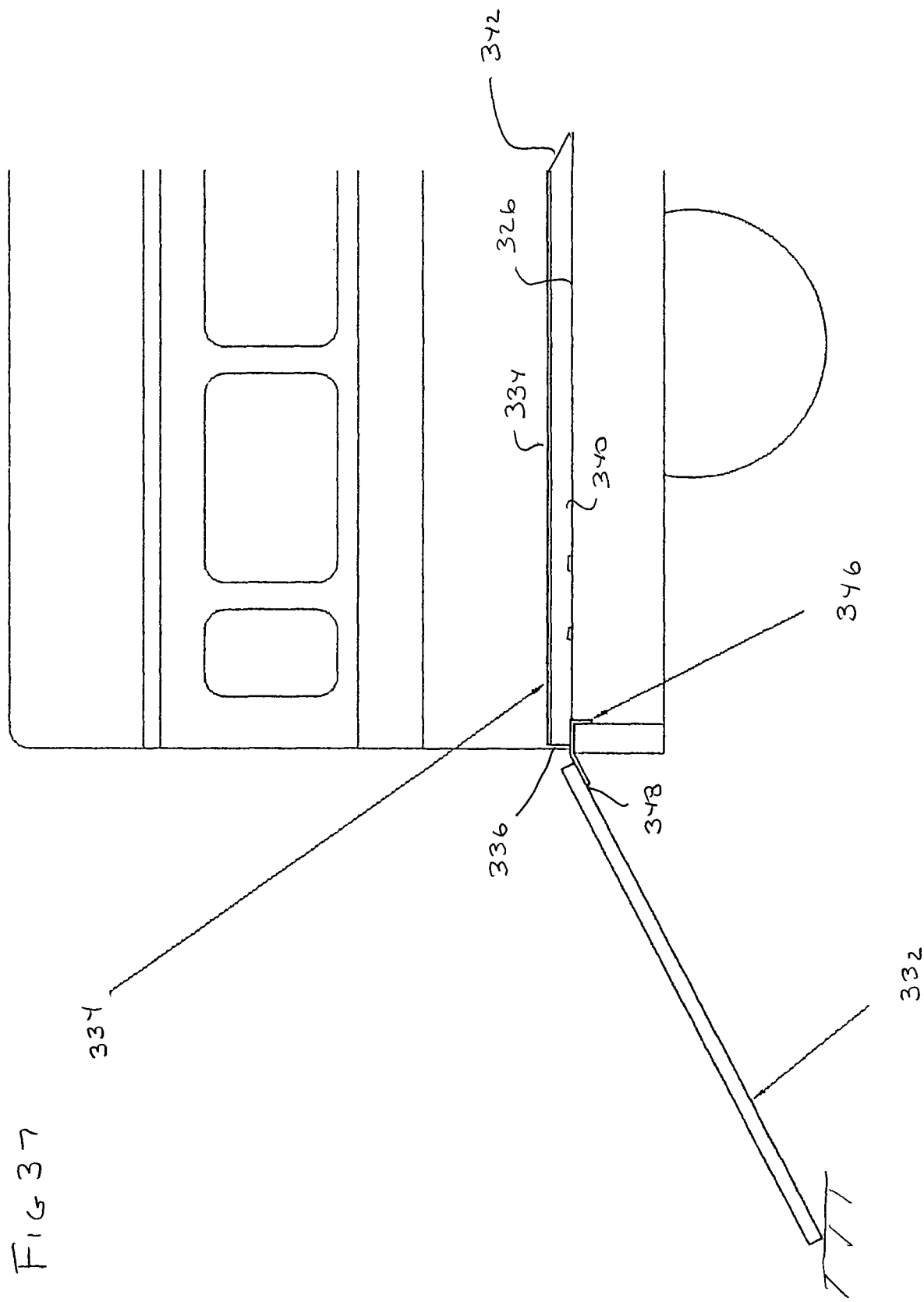
FIG. 37 is a side view of the multi-passenger vehicle shown in FIG. 35 and with the ramp extended.

In the exemplary arrangement shown in FIGS. 35 through 37 the housing 334 is within the interior area and in operatively attached connection with the bus floor 326. The exemplary housing is positioned in centered relation with an aisle 338 that extends between two rows of seats 340 that are located in the interior area 322 of the bus. In the exemplary arrangement the aisle 338 is in aligned relation with the emergency exit opening 328.

The exemplary housing 334 may include features of the ramp housings previously discussed. This may include features that enable accessing the ramp and moving the ramp between the retracted position in which the ramp is housed within the housing, and an extended position in which the ramp extends from the housing and is usable by passengers to leave the interior area of the bus. In the exemplary arrangement of housing 336 the housing sidewalls 340 are tapered outwardly and downwardly from a flat top wall surface of the housing. This helps to provide a smooth transition from the flat bus floor 326 to the top of the ramp housing. The exemplary housing further includes a tapered front wall 342. The tapered front wall 342 along with the tapered side walls 340 reduce the risk of persons tripping when they are walking inside the interior area of the bus on top of the ramp housing. In some exemplary arrangements the top and side wall surfaces of the ramp housing may be covered with a suitable nonslip material to lower the risk of persons slipping or tripping on the outer surface of the ramp housing. Of course these approaches are exemplary and other arrangements other approaches may be used.

In the exemplary arrangement the ramp housing 334 may be mounted in fixed operative connection with the bus floor 326 through suitable fasteners. This may include for example screws, bolts, rivets, adhesives or other suitable attaching devices that hold the ramp housing in a fixed position in operative engagement with the bus floor. Further in the exemplary arrangement the housing 334 is positioned so that the housing opening 336 is in close proximity to an inside face 344 of the emergency exit door 330 when the door is in the closed position. In exemplary arrangements the inside face 344 serves as a movable door portion which causes the ramp 332 when in the retracted position, to be inaccessible from outside the housing. When the emergency exit door 330 is moved to the open position, the door portion moves so it is disposed sufficiently away from the outer end of the ramp so that the ramp and the housing opening can be accessed through the housing opening and the ramp can be moved from the retracted position to the extended position.

It should be understood that in exemplary arrangements the ramp 332 may include suitable handle openings or other manually engageable portions that facilitate engaging the ramp when the movable door portion 344 is disposed away from the housing opening. Further the bus floor or other surface that bounds the lower side of the ramp housing interior area may include suitable low friction materials to facilitate movement of the ramp between the extended and retracted positions. Further exemplary arrangements may include a spring arrangement like that previously discussed that causes the ramp 332 to be moved outwardly from the retracted position when the movable door portion on the inside face 344 of the emergency exit door, moves away from the housing opening 336. Likewise sensors, switches and circuitry like those previously described may also be in operative connection with the housing and the ramp so as to lower the suspension of the bus, provide indications and warnings to an operator of the bus, and provide other capabilities like those previously described when the emergency exit door 330 is in the openable condition and/or the ramp is moved from the retracted position. Of course it should be understood that these arrangements are exemplary and in other arrangements other approaches may be used.

In an exemplary arrangement a guide 346 is positioned to facilitate movement of the ramp 332 from the retracted position to the extended position shown in FIG. 37. In the exemplary arrangement the guide is tapered so that the ramp in the extended position is in engagement with a portion of the guide that extends outside the emergency exit opening 328. In exemplary arrangements the inner end 348 of the ramp 322 may include suitable projections or recesses that engage corresponding interengaging projections or recesses on upper surface of the guide 346. In exemplary arrangements the interengaging projections and recesses serve to prevent the ramp from being pulled outward beyond the extended position and disengaging from the bus. In other exemplary arrangements other approaches may be utilized for purposes of assuring that the ramp 322 is not moved outwardly beyond the extended position that is appropriate for allowing passengers to walk down the ramp to the ground. For example in some arrangements the ramp may be in operative connection with one or more cables. The one or more cables may extend inside the housing 334 and be anchored to the bus body in a manner that limits the outward travel of the ramp to the extended position. In other arrangements suitable chains, stops or other devices for limiting outward movement of the ramp such as those previously discussed may be utilized.

Similar to the previously described arrangements, after the ramp 332 has been deployed, the ramp 322 may be returned to the retracted position within the housing 334. The movable door portion 344 which in this arrangement is an inside face of the emergency exit door, may be moved with the door to the closed position. This secures the ramp within the housing and in the exemplary arrangement renders the housing opening 336 inaccessible from both the interior area 322 of the bus as well as from the exterior of the bus. As can be appreciated in exemplary arrangements of this type in which the ramp and the ramp housing are within the interior area of the vehicle, may be useful in terms of facilitating the ability to install the arrangement within an existing vehicle without the need for significant internal or external modifications. Further in exemplary arrangements the positioning of the ramp and ramp housing within the vehicle interior area may help to minimize the exposure of the ramp and associated mechanisms to dirt and corrosion. Of course it should be appreciated that this arrangement is exemplary and in other arrangements other configurations and structures may be utilized.

As previously discussed in some arrangements the suspension of the bus may be automatically lowered in response to the emergency exit door being in an openable position (or being open) and/or the ramp being deployed. As previously discussed in some exemplary arrangements this is accomplished by an arrangement which exhausts air pressure from the air springs which extend operatively intermediate of a rear axle of the bus and the bus frame. An alternative arrangement in which the bus body is lowered relative to the rear axle of the bus responsive to an emergency exit door being in an openable condition is shown schematically in FIG. 38. In this exemplary arrangement the air that is exhausted from the air springs may be utilized to automatically deploy a ramp.

Figure 38:
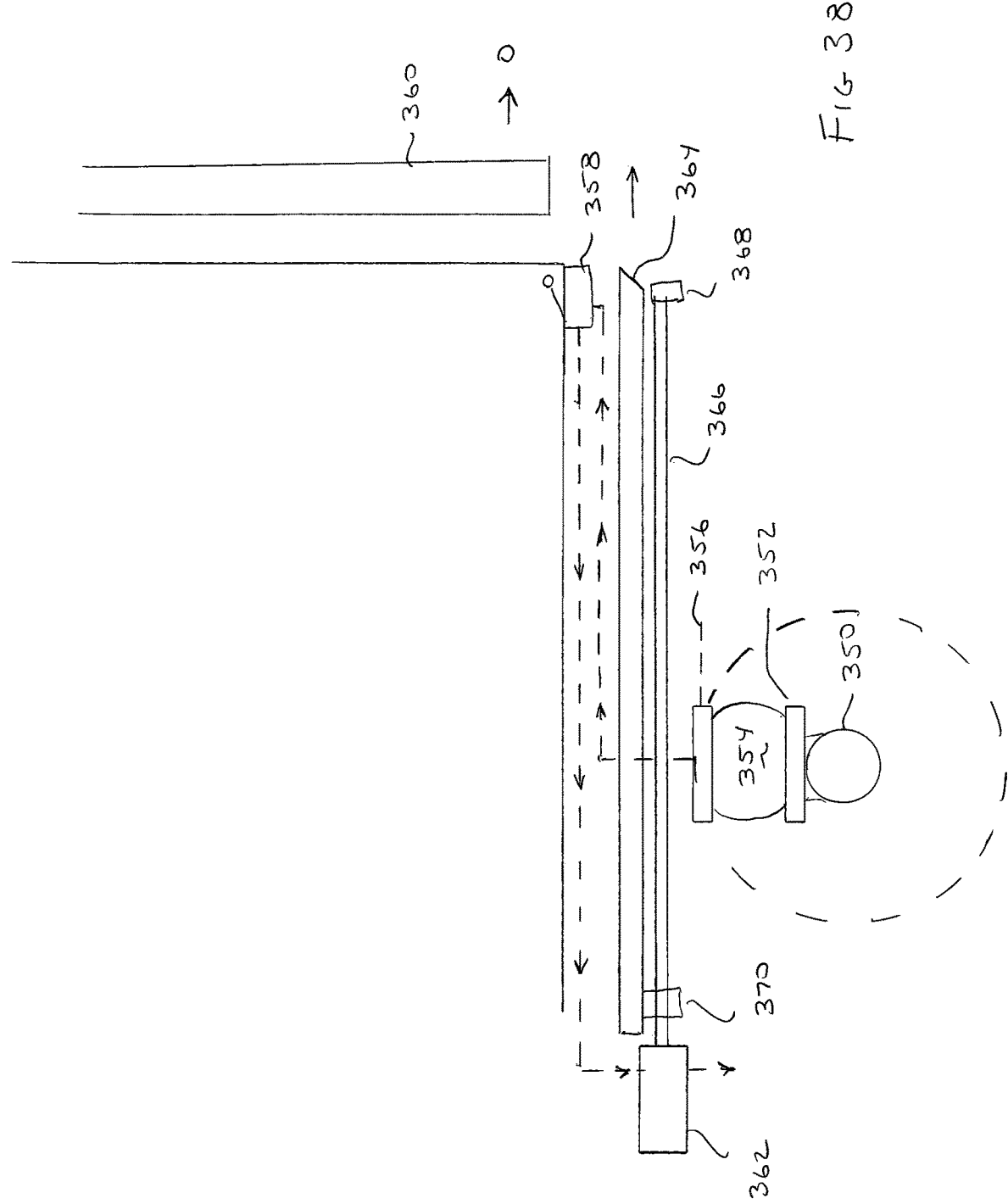
FIG. 38 is a schematic view of an alternative exemplary arrangement in which air pressure that is released from air springs is utilized to automatically deploy a ramp.

FIG. 38 schematically shows some of the features that were previously discussed in connection with FIGS. 13 and 14. It should be understood that in FIG. 38 some of the frame and suspension features of the bus are not shown to facilitate demonstrating the functions of other components. In the exemplary arrangement a rear axle 350 is shown. Axle 350 is supported by tires in a manner like that previously discussed. Air springs 352 extend operatively vertically intermediate of the bus frame and the axle 350. Similar to the air springs previously discussed, each air spring includes a bladder 354 which serves as a pressure vessel for housing the pressurized air. Air is supplied to the air springs through a suitable supply line 356 on the bus or other vehicle In the exemplary arrangement shown an air relief valve 358 is configured in operative connection with an emergency exit door 360. In the exemplary arrangement shown, a sensing arm of the air relief valve is operative to cause the valve to change from the closed condition to the open condition responsive to the emergency exit door being moved away from the closed position as represented in FIG. 38 by Arrow O. Of course it should be understood that in other arrangements the pressure relief valve may be electrically controlled in response to electrical signals such as those that are generated by an electrical switch positioned to detect the emergency exit door moving away from the closed position, or in response to a mechanism on the emergency exit door being actuated so that the emergency exit door is openable. Numerous different approaches may be taken for purposes of detecting a condition of the emergency exit door.

In the exemplary arrangement a motor 362 is in operative connection with a movable emergency egress ramp 364. In exemplary arrangements the motor that is in operative connection with the ramp is configured to cause the ramp to move automatically from the retracted position to the extended position when the emergency exit door is in an openable condition and/or is opened. In the exemplary arrangement shown the motor 362 comprises a rotating motor shaft. The motor shaft is operative to rotate a feed screw 366. The feed screw is in operative connection with a bearing support 368 at an opposed end from the motor 362. The threaded follower 370 is in operative connection with the feed screw 366. The follower 370 is in operative connection with the ramp 364.

In this exemplary arrangement the motor is an air motor. Responsive to the emergency exit door 360 being moved from the closed position the air relief valve 358 is operative to change from a closed condition to an open condition. In the open condition pressurized air from the air springs is exhausted from the bladders 354 and is caused to pass through the air motor 362. The air motor operates to rotate the feed screw. Rotation of the feed screw causes the follower 370 and the ramp 364 to move from the retracted position shown in FIG. 38 to an extended position. Further in exemplary arrangements additional air pressure if necessary may be applied to the motor from another air pressure source on the vehicle to move the ramp to the extended position. In some arrangements the force of the ramp may act against a movable door portion so as to open the door and enable the ramp to extend. Exemplary arrangements may further include suitable pneumatic components to enable the motor to operate the feed screw in a reverse direction so as to retract the ramp to the retracted position using pneumatic pressure from a suitable pressure vessel or other supply on the vehicle. In this manner the ramp may be selectively returned to the retracted position after deployment such as is ready to be deployed again the next time the emergency exit door is opened. Of course it should be understood that these approaches are exemplary and in other arrangements other types of motors such as electrical motors and other structures and approaches may be used.

Figure 39:
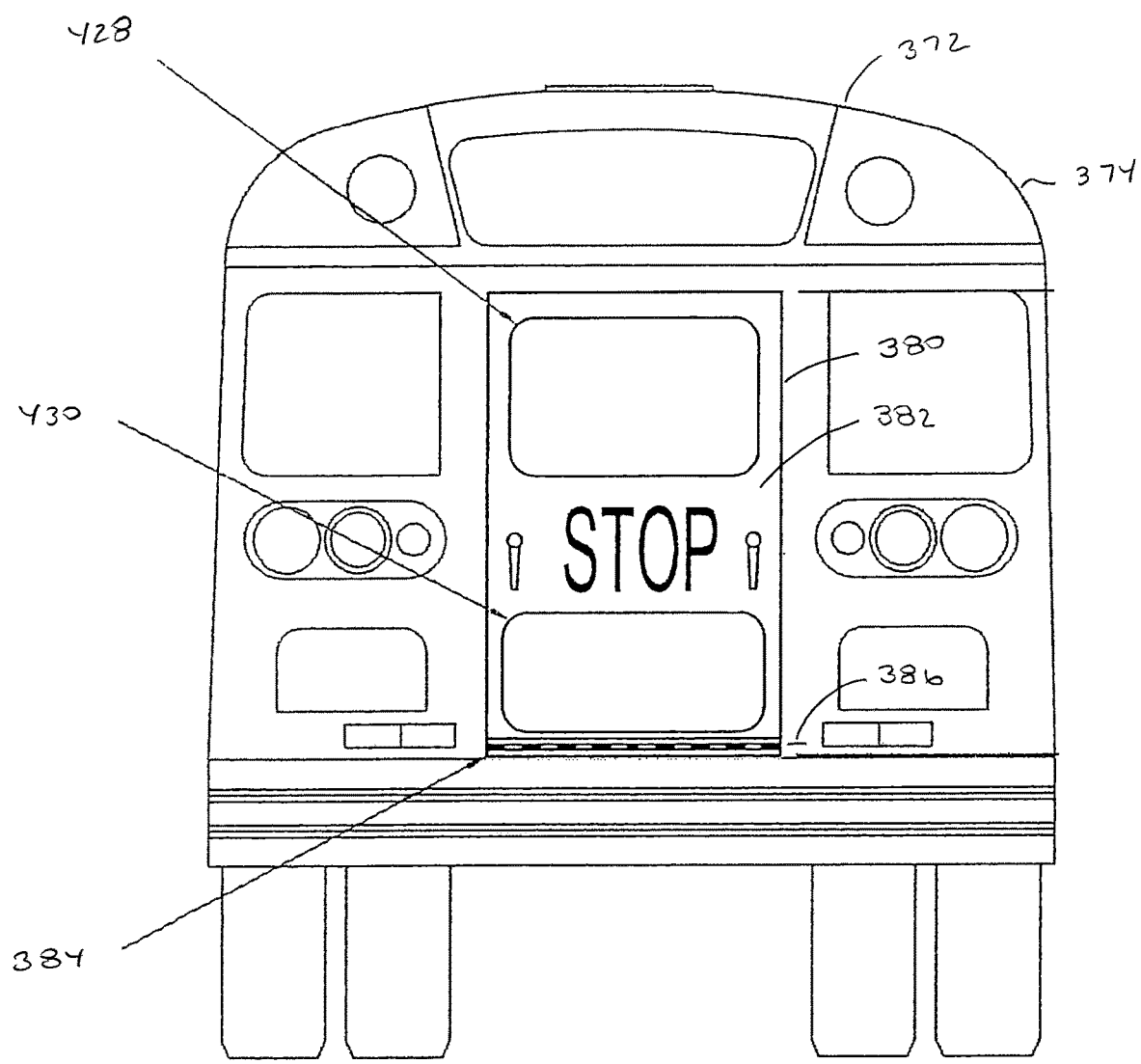
FIG. 39 is a rear view of a multi-passenger vehicle such as a school bus showing a further alternative emergency egress arrangement including an emergency exit door that is used as a portion of the emergency egress ramp.
Figure 40:
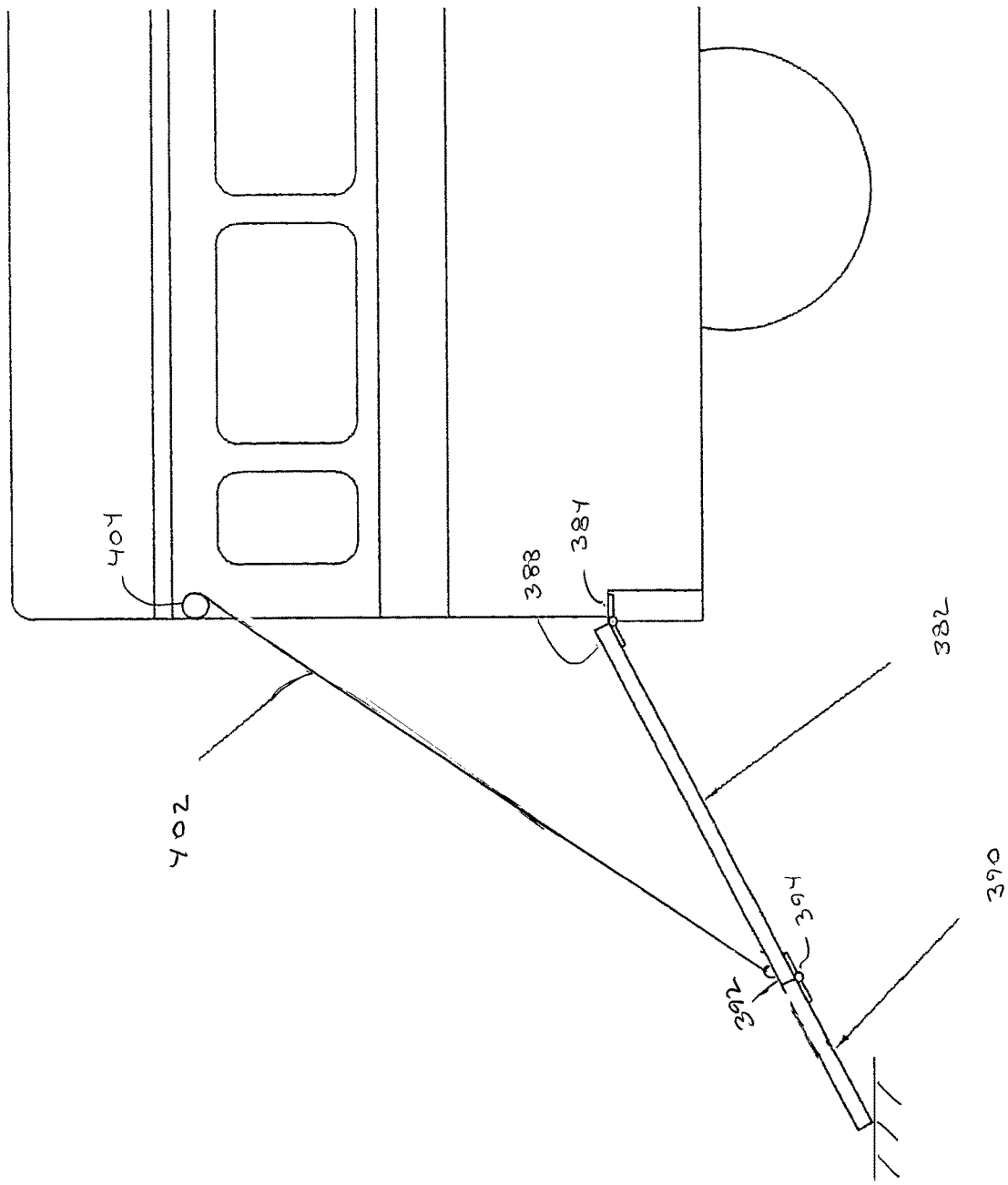
FIG. 40 is a side view of the multi-passenger vehicle shown in FIG. 39 with the emergency exit door extended rotationally outwardly and downwardly and with a ramp extension extending therefrom.
Figure 41:
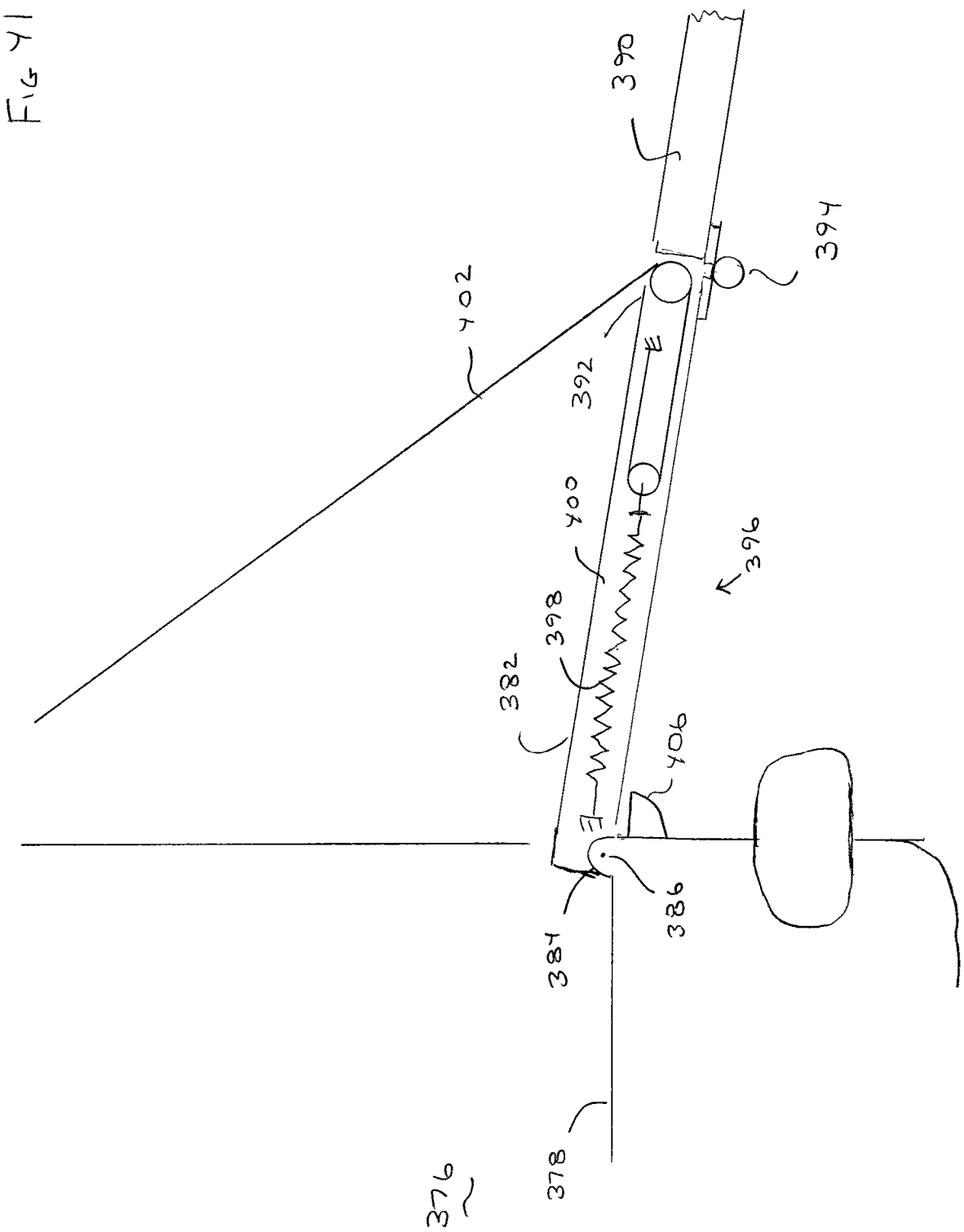
FIG. 41 is a schematic view showing an emergency egress arrangement similar to FIG. 40 and a counterbalance acting on the emergency exit door.
Figure 42:
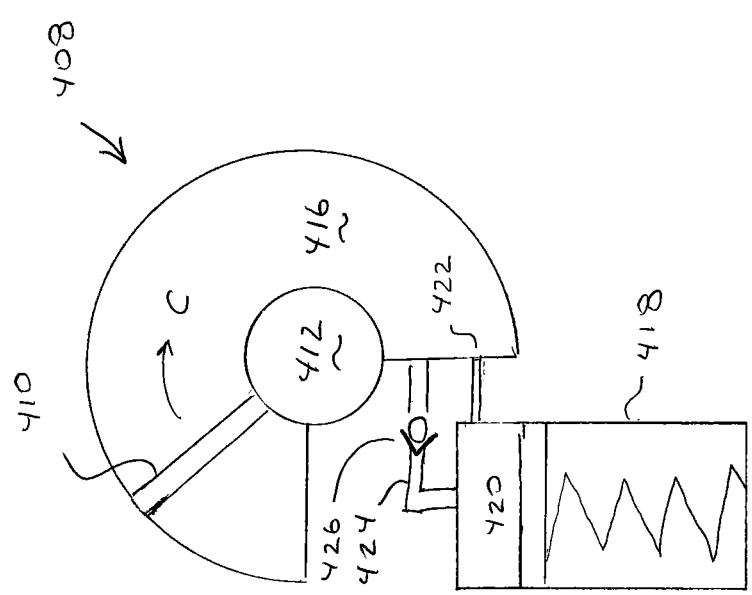
FIG. 42 is a schematic view showing a counterbalance that includes a rotational damper.

FIGS. 39 through 50 show a further alternative exemplary arrangement of an emergency egress system that enables passengers to exit from an interior area of a vehicle such as a bus through an emergency exit opening and to traverse a ramp that extends from the interior area to the ground. FIG. 39 shows a further multi-passenger vehicle such as a school bus 372. Similar to previously described vehicles, vehicle 372 includes a body 374 that bounds an interior area 376 which houses passengers. The lower side of the interior area 376 is bounded by a bus floor 378.

The bus body includes an emergency exit opening 380. The emergency exit opening is normally closed during operation of the vehicle by an emergency exit door 382. Emergency exit door 382 may include features like the emergency exit doors previously described herein except as otherwise specified. This may include for example suitable hand actuatable latching arrangements that enable the emergency exit door 382 to be changed from a latched closed position to an openable position either from inside the interior area or from outside the interior area.

In the exemplary arrangement shown, rather than having hinges that operatively attach the emergency exit door to the body on one of the vertically extending sides of the door, emergency exit door 382 is in operative connection with bus body 374 through at least one horizontal hinge 384. The at least one horizontal hinge enables movement of the emergency exit door 382 when in the openable condition, to move outwardly about a horizontal axis 386. In the exemplary arrangement the at least one horizontal hinge 384 is in operatively attached connection with a hinge side of the door 388 which corresponds to a lower side of the emergency exit door when the door is in the closed position.

In the exemplary arrangement the emergency exit door is in operatively attached connection with a ramp extension 390 which is alternatively referred to herein as a ramp. In the exemplary arrangement shown in FIGS. 40 and 41 the ramp 390 is movably mounted in operative connection with the emergency exit door 382 at a further side 392 of the door that is opposed of the hinge side 388. In this exemplary arrangement the ramp 390 is movably mounted in operative connection with the door through at least one ramp hinge 394. In the exemplary arrangement shown in FIGS. 40 and 41, the exemplary at least one ramp hinge enables movement of the ramp 390 from a retracted position when the emergency exit door 382 is in the closed position, to an extended position shown in FIG. 40. In some exemplary arrangements a suitable lever and/or spring arrangement may be utilized to cause the ramp 390 to be moved to the extended position automatically when the emergency exit door is moved away from the closed position. This may include for example torsion spring arrangements or other arrangements like those later discussed herein that cause the ramp 392 move from the ramp retracted position to the ramp extended position when the emergency exit door is opened. Also as can be appreciated, in the exemplary arrangement shown in FIG. 40, in the retracted position and with the emergency exit door in the closed position, the ramp 390 is positioned in abutting relation on the outside of the emergency exit door. Of course it should be understood that this approach is exemplary, and other mounting arrangements for the emergency exit door and ramp may be utilized including those that are later discussed herein. For example in some arrangements the ramp may extend in a recess on the outer surface of the emergency exit door so as to provide a flush outer surface of the door when the door is in the closed and latched position.

The exemplary emergency egress arrangement shown further includes a counterbalance generally referred to as 396. For purposes hereof a counterbalance is one or more devices that are operative to apply a force that counters gravitational force which acts on the emergency exit door to urge the door to move toward the fully open position after the emergency exit door is initially moved from the closed position. In an exemplary arrangement the counterbalance includes at least one spring 398 that is housed within the interior area or cavity 400 of the emergency exit door 382. In the exemplary arrangement at least one cable 402 extends between a cable mount 404 and the further side 392 which is a portion of the emergency exit door disposed away from the horizontal axis 386.

As can be appreciated in the exemplary arrangement when the emergency exit door 382 is moved from the closed latched position, the portion 392 of the door that is disposed away from the at least one horizontal hinge 384 moves vertically downward and horizontally outwardly away from the emergency exit opening. As the door moves outwardly the center of gravity of the door moves outwardly from the axis resulting in increased opening force. In the exemplary arrangement the springs 398 and the at least one cable 402 of the counterbalance 396 operate to provide a force that acts counter to the gravitational force that is urging the outward and downward movement of the door.

The exemplary counterbalance provides for a controlled outward and downward movement of the emergency exit door that occurs more slowly than would otherwise occur if the counterbalance were not present. In the exemplary arrangement the emergency exit door 382 moves outwardly and downwardly until the emergency exit door is in a position to permit emergency egress, which in the exemplary arrangement is a position in which a portion of the door disposed away from the at least one hinge 384 and the horizontal axis 386, and is at a vertical level that is at least as low as the bus floor 378 and the axis. In some exemplary arrangements the rotational outward movement of the emergency exit door may be limited by one or more doorstops 406. Of course it should be understood that this approach is exemplary and in other arrangements other approaches may be used.

Further in some exemplary arrangements the counterbalance may additionally or alternatively include a cable mount 404 that provides a force that counters the gravitational force acting to move the emergency exit door 382 outward and downward. In exemplary arrangements the cable mount 404 may include a rotatable pulley that rotates in operative engagement with a cable 402. The rotatable pulley may be in operative connection with a torsion spring. The torsion spring may operate to resist the rotational movement of the pulley caused by the extension of the cable as the emergency exit door moves outward and downward. In such arrangements the cable mount 404 comprises part of the counterbalance to cause the emergency exit door to move in the desired manner. Further it should be understood that in some arrangements the counterbalance 396 may not include the spring arrangement within the emergency exit door when the cable mount alone is capable of providing sufficient force.

In other exemplary arrangements the counterbalance 396 may further include a rotational damper 408. In exemplary arrangements the rotational damper may be in operative connection with the hinge and the emergency exit door, and may provide a force counter to the gravitational force acting on emergency exit door urging to move to the fully open position. In the exemplary arrangement the rotational damper 408 includes a rotational piston 410 is attached to a rotatable piston rod 412. In the exemplary arrangement the rotatable piston rod 412 is in operative connection with the hinge and the emergency exit door, and rotates coaxially with the axis 386.

The exemplary damper includes a variable volume fluid chamber 416. The variable volume fluid chamber is in fluid connection with an accumulator 418. The variable volume fluid chamber 416 is in fluid connection with a pressurized area 420 of the accumulator 418 through an orifice 422. In the exemplary arrangement the rotatable piston rod 412 moves the piston 410 in the direction of Arrow C as the emergency exit door moves toward the open position. A working fluid such as an incompressible liquid in the variable volume chamber 416 passes through the orifice 422 to the pressurized area 420 of the accumulator 418. The fluid resistance presented by the orifice 422 and the accumulator provides a force that acts counter to the rotational force acting through the piston rod 412 on the piston. As a result a resistance damping force is provided that opposes the gravitational force acting on the door and controls the speed at which the emergency exit door moves outward and downward. Thus the damper 408 serves as a part of the counterbalance in controlling the emergency exit door movement.

It should be noted that in the exemplary arrangement the damper includes a return 424 between the pressurized chamber 420 of the accumulator and the variable volume fluid chamber 416. A check valve 426 is positioned in the return 424 so that fluid can return to the fluid chamber 416 at a more rapid rate that would be possible through the orifice 422. This enables the emergency exit door to be moved from the open position to the closed position more rapidly and with less force than would otherwise be required.

In other exemplary arrangements the counterbalance may include other structures such as a torque hinge. Such a torque hinge may include a one way torque hinge that applies a resistance to rotation of the door toward the open position. In exemplary arrangements the one way torque hinge may not present resistance to rotation of the door from the open position toward the closed position. Alternatively or in addition the counterbalance may include other structures that resist rotation of the door toward the open position and provide a force that reduces the force that is required to move the door from the open position toward the closed position.

Of course it should be understood that these counterbalance arrangements are exemplary and in other arrangements other approaches may be used.

In exemplary arrangements in which the emergency exit door serves as part of the ramp arrangement across which persons traverse from the interior area to the ground when the emergency exit door is open, the emergency exit door 482 is configured to facilitate the ability of passengers to walk thereon. This may include for example, not including window openings in the emergency exit door. Rather in some arrangements the face of the emergency exit door that is in facing relation with the interior area of the bus in the door closed position, may include nonslip materials or other suitable structures that facilitate walking thereon. Similarly handle mechanisms which are utilized for purposes of changing the door to the unlatched condition may be positioned away from the central area of the door, and/or adjacent to the door on the bus body so as to avoid the need to have the handle mechanisms on the door. Of course it should be understood that these configurations are exemplary.

Further in some exemplary arrangements in which an emergency exit door that is normally mounted to rotate through side hinges about a vertical axis is used in a configuration in which the door rotates about a horizontal axis, window openings such as openings 428 and 430 shown in FIG. 39 may be filled by suitable panel materials that provide sufficient support for passengers to walk thereon. In other exemplary arrangements window openings may be filled with a pane of suitable transparent or translucent material such as a polycarbonate with one or more strips of friction material thereon to provide adequate traction while still providing visibility through the door. In other exemplary arrangements the window openings may have glass or other transparent panes that have the inner faces thereof etched or otherwise having thereon anti-slip patterns. This may be done for example, by acid etching the face of the glass panes on which users step when exiting the bus. Alternatively glass or other transparent panes may be coated with a transparent anti-slip coating. This may include for example a sprayable SWISSGRIP™ coating. Numerous different approaches may be utilized depending on requirements of the particular vehicle and emergency egress system.

Figure 43:
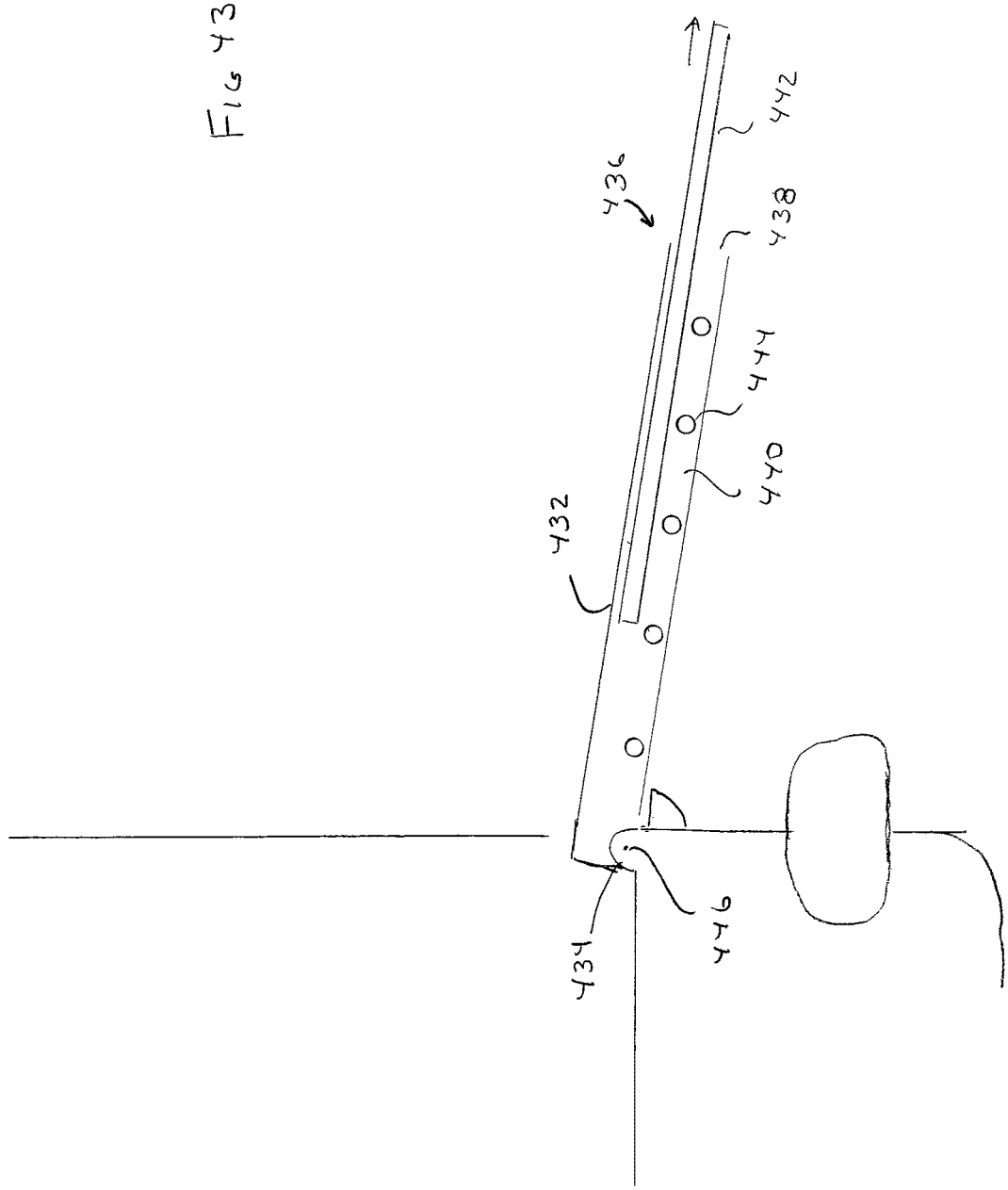
FIG. 43 is a schematic view of an alternative arrangement in which a ramp extension is housed in the cavity of an emergency exit door.

Other approaches may be utilized in connection with an emergency egress system in which an emergency exit door rotates about a horizontal axis between the door closed and door open positions, and which in the door open position the door serves as a portion of a ramp that can be traversed by passengers exiting the vehicle. For example FIG. 43 shows an alternative exemplary arrangement of an emergency exit door 432 that is rotatable about at least one horizontal hinge 434. In this exemplary arrangement a further side of the door 436 that is opposed of the hinge side includes a cavity opening 438. The cavity opening extends to a cavity 440 within an interior area of the emergency exit door 432.

A ramp extension 442 is movably positioned in the interior area 440 of the emergency exit door. In the exemplary arrangement a series of movable supports 444 such as rollers enables the ramp 442 to move between a retracted position in which the ramp is housed within the interior area 440 of the emergency exit door, and an extended position in which the ramp 442 extends outward from the cavity. Further in some exemplary arrangements the emergency exit door cavity may be suitable for housing multiple telescopic ramp sections that can extend outward from the cavity opening 438 so as to provide a longer ramp length when the ramp is moved to the extended position.

In the exemplary arrangement shown the further side 436 moves to a position in the open position of the emergency exit door 432 that causes the cavity opening 438 to be below the axis 446 of the at least one horizontal hinge 434. In the exemplary arrangement gravitational force acting on the ramp 442 is operative to cause the ramp to move in supported connection with the supports 444 from the retracted position to the extended position. This enables the ramp 442 to be deployed and become usable to be traversed by passengers responsive to gravitational force. Of course it should be understood that in other arrangements additional devices may be provided to facilitate movement of the ramp to the extended position. These may include suitable spring mechanisms, release mechanisms, actuators, motors or other items that will cause the ramp 442 to extend from the interior cavity of the emergency exit door when the exit door is open. Numerous different approaches may be utilized in such arrangements.

Figure 44:
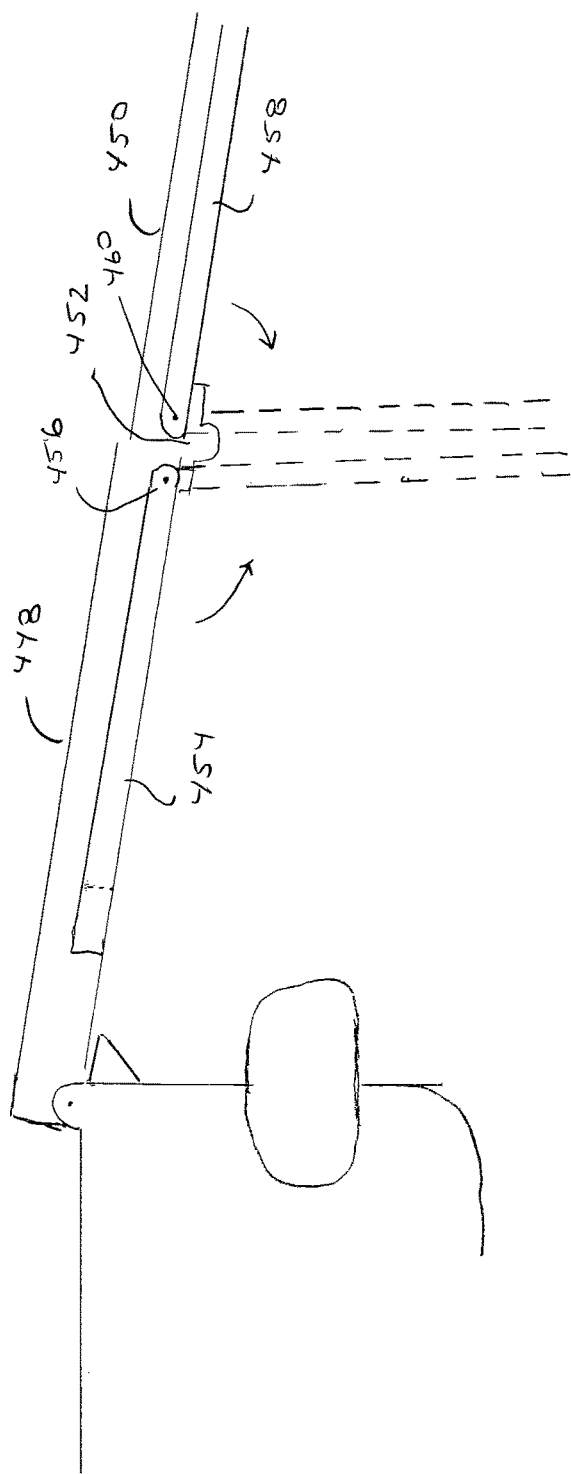
FIG. 44 is a schematic view of an alternative arrangement which includes at least one movable leg that is operative to provide support for the emergency exit door and ramp extension when positioned to provide emergency egress from the vehicle.

FIG. 44 shows a further arrangement of an emergency egress system in which an emergency exit door 448 of a bus or other multi-passenger vehicle moves from a closed position to an open position about at least one horizontal hinge and a horizontal axis. The exemplary arrangement in FIG. 44 is similar to that shown in FIG. 40. The exemplary arrangement includes a ramp 450 that is moved from a retracted position to an extended position when the emergency exit door is opened through rotation about at least one ramp hinge 452. In this exemplary arrangement at least one leg 454 is movably mounted in operative connection with at least one of the emergency exit door 448 and the ramp 450. The at least one leg 454 is rotatably movable about a leg pivot 456 that operatively connects the leg 454 and the emergency exit door.

In the exemplary arrangement the at least one leg 454 is movable from a retracted position shown in FIG. 44 in which the leg is positioned in adjacent relation with the emergency exit door 448. In some exemplary arrangements the leg 454 in the retracted position may be recessed within the emergency exit door such that the leg extends in the interior area of the bus when the emergency exit door is in the closed position. Alternatively the leg may be outside the interior area when the emergency exit door is in the closed position. In the exemplary arrangement when the emergency exit door is moved to the open position shown in FIG. 44, the leg 454 is enabled to rotate about the leg pivot 456 to a deployed position shown in phantom. In the deployed position the leg 454 is enabled to operatively extend between the emergency exit door and ground so as to support the emergency exit door and the ramp. In some exemplary arrangements the leg 454 may include a telescoping portion in operative connection with a ratchet and spring or similar arrangement. In such an arrangement when the leg rotates to the extent that it reaches a vertical position, the telescoping portion extends downward to engage with the ground. Once the telescoping portion has extended the ratchet arrangement prevents the leg from telescoping inward until a suitable release is manually actuated to enable the leg to telescope and retract so it is returned to its original length. Of course this approach is exemplary and other arrangements other approaches may be used.

Further as represented in FIG. 44 a further leg 458 is in movably mounted connection with the ramp 452 through a pivot 460. In exemplary arrangements leg 458 may operate in a manner like leg 454 to rotatably move to a deployed position when the ramp 450 is in the extended position. For example as shown in phantom in FIG. 44, leg 458 may rotate about pivot 460 to extend vertically to the ground. In this exemplary arrangement leg 458 rotates from the retracted position to the deployed position in a rotational direction opposite to that in which leg 454 rotates. Further it should be understood that in some exemplary arrangements the pivot connections 460, 456 may include latches that hold the legs against further rotation after the legs have moved to a deployed position. Such an approach may further facilitate the legs being operative to support the emergency exit door and the ramp when they are in the open and extended positions. Of course it should be understood that this approach is exemplary and in other arrangements other approaches may be used.

Figure 45:
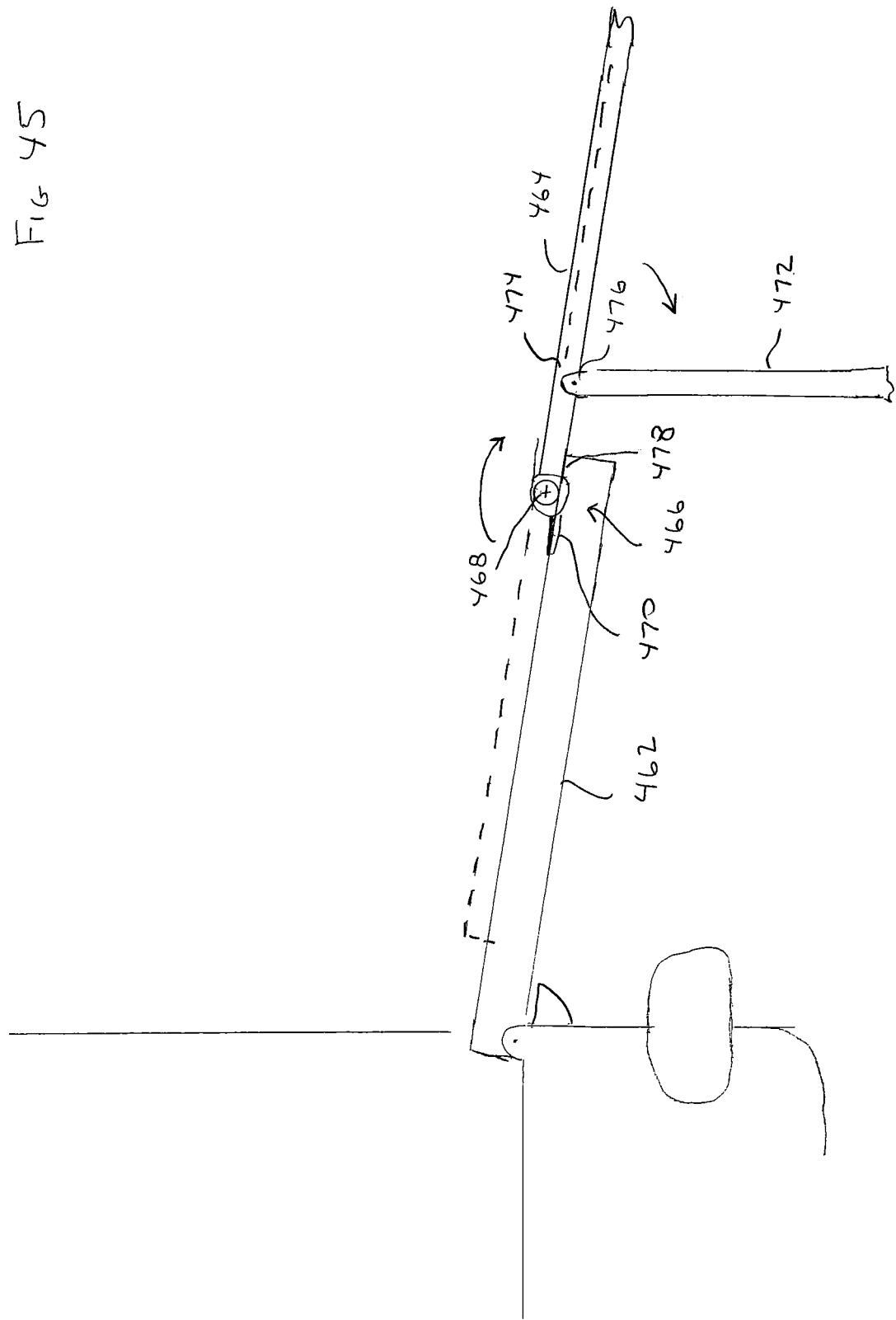
FIG. 45 is a schematic view of an alternative arrangement in which a ramp extension and support leg automatically deploy responsive to spring force.

FIG. 45 shows an alternative arrangement of an emergency exit door 462 for a multi-passenger vehicle that rotates through at least one horizontal hinge about a horizontal axis between the open and closed positions. In this alternative arrangement a ramp extension 464 is rotationally movably mounted in operative connection with the emergency exit door through at least one ramp hinge 466. The ramp hinge enables the ramp 464 to rotate about a ramp hinge axis 468 between a retracted ramp position shown in phantom and extended ramp position as shown in FIG. 45.

At least one ramp spring 470 is operative to urge the ramp to rotate about the axis 468 from the retracted position to the ramp extended position. In the exemplary arrangement the ramp spring 470 comprises at least one torsion spring that is in operative connection between the emergency exit door 462 and the ramp 464. In the exemplary arrangement the exemplary ramp spring enables the ramp 464 to be in the retracted position when the emergency exit door is in the closed position. This enables the exemplary ramp to be housed within the interior area of the bus when the emergency exit door is in the closed position. In some exemplary arrangements the ramp 464 may be held in the retracted position by a suitable latch arrangement such as that later discussed. Such a latch may operate to automatically release the ramp to move to the extended position responsive to outward movement of the emergency exit door. Of course it should be understood that this arrangement is exemplary and in other arrangements other approaches may be utilized for purposes of causing the ramp to be in the retracted position when the emergency exit door is closed and to move to the extended position when the emergency exit door is opened.

In the exemplary arrangement the ramp 464 includes at least one leg 472. The at least one leg 472 may be similar to the legs previously discussed and may be operative in a deployed position to engage with the ground and operatively support at least one of the ramp and emergency exit door. The exemplary leg is movably mounted in operative connection with the ramp 464 through a pivot 474 which enables leg rotation about a leg axis 476. Of course it should be understood that this arrangement is exemplary and in other arrangements other approaches used.

In the exemplary configuration shown in FIG. 45 movement of the ramp 464 about the ramp hinge axis 468 is limited to the extended position of the ramp. This is accomplished by the body of the ramp adjacent to the ramp hinge 466 engaging a stop surface 478 that serves as a stop. In the exemplary arrangement during movement of the emergency exit door to the open position and movement of the ramp 464 from the retracted position to the extended position, relatively rapid angular movement of the ramp responsive to the at least one ramp spring 470 is relatively abruptly stopped responsive to engagement of the ramp with the stop surface 478. In the exemplary arrangement the ramp and the at least one leg 472 that is attached thereto have angular momentum as a result of the rotational movement of the ramp responsive to the ramp spring. When the ramp engages the stop surface 478 angular momentum is operative to cause the at least one leg 472 to continue to rotate about the leg axis 476. This causes the at least one leg 472 to move to the deployed position in which the leg extends vertically to assist in supporting the ramp and the emergency exit door. Of course it should be understood that this approach is exemplary and in other arrangements other approaches may be used.

Figure 46:
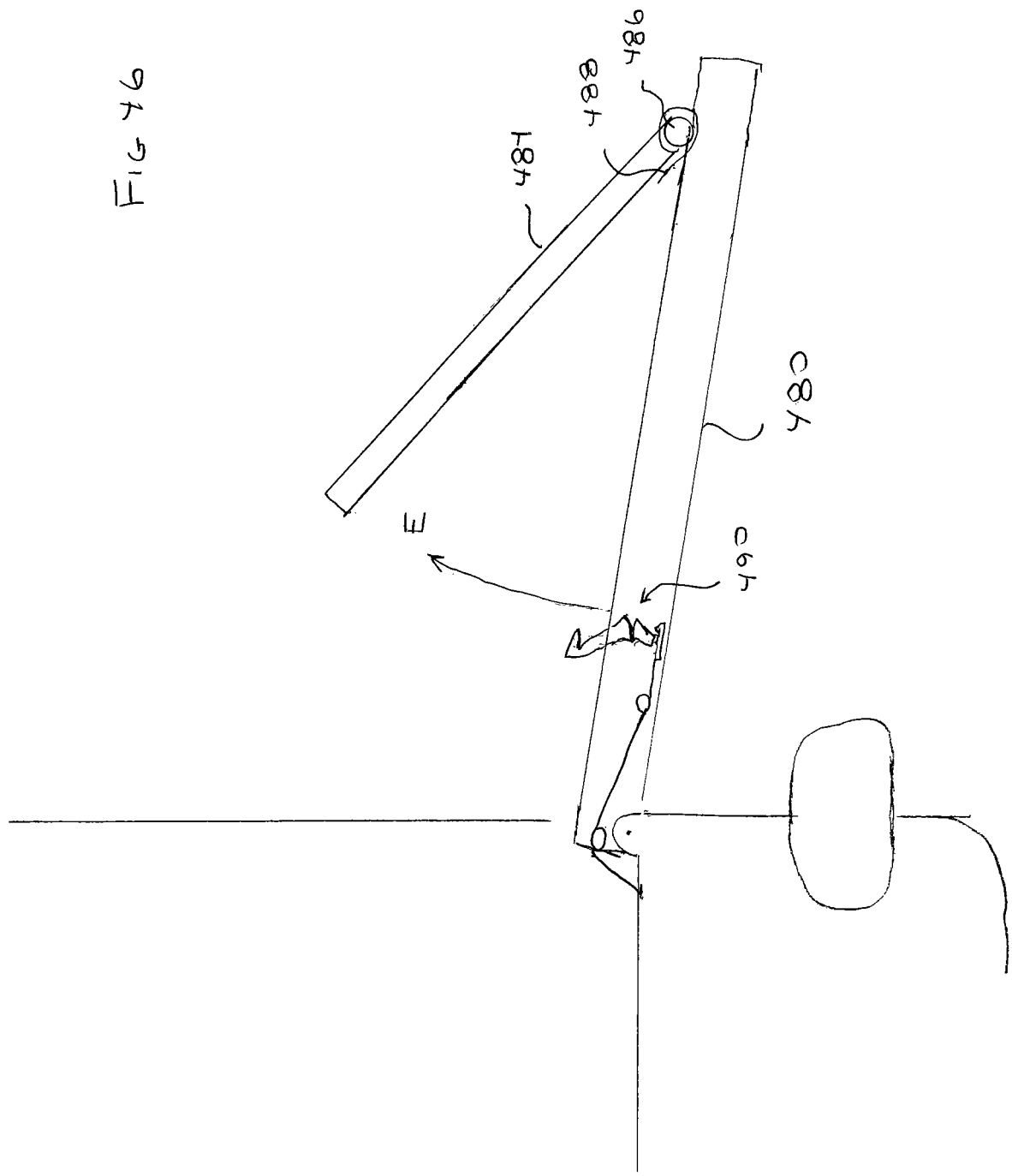
FIG. 46 is a schematic view similar to FIG. 45 that further shows a latch that holds a ramp extension retracted in the closed position of the emergency exit door, and that automatically releases a ramp extension to deploy responsive to opening the emergency exit door.

As previously discussed, in some exemplary arrangements a latch may be utilized to hold the ramp extension in a retracted position until the emergency exit door has reached an open condition in which the ramp may be moved from the retracted position to the extended position. FIG. 46 shows schematically such an arrangement. As shown in FIG. 46 an emergency exit door 480 rotates between the open and closed positions through at least one horizontal hinge that operatively connects the door and the bus body. Similar to the arrangement shown in FIG. 45 a ramp extension 484 is movably mounted in operative connection with the emergency exit door through at least one ramp hinge 486. At least one ramp spring 488 is operative to bias the ramp 484 to move from the retracted position in which the ramp is in adjacent abutting relation with the face of the emergency exit door that faces the interior area of the bus when the doors in the closed position, to a ramp deployed position in which the ramp extends outwardly and in generally aligned relation with the emergency exit door.

In the arrangement shown in FIG. 46 a latch 490 is in operative connection with the emergency exit door 408. The exemplary latch 490 is changeable between a latched condition and an unlatched condition. In the latched condition the latch 490 is operable to hold the ramp 484 in the retracted position. In this exemplary arrangement movement of the emergency exit door from the closed position is operative to cause the latch to change from the latched condition to the unlatched condition. In the unlatched condition the ramp is enabled to move from the retracted position to the extended position in a manner like that previously discussed. Movement of the ramp toward the extended position as represented by Arrow E in FIG. 46.

Figure 47:
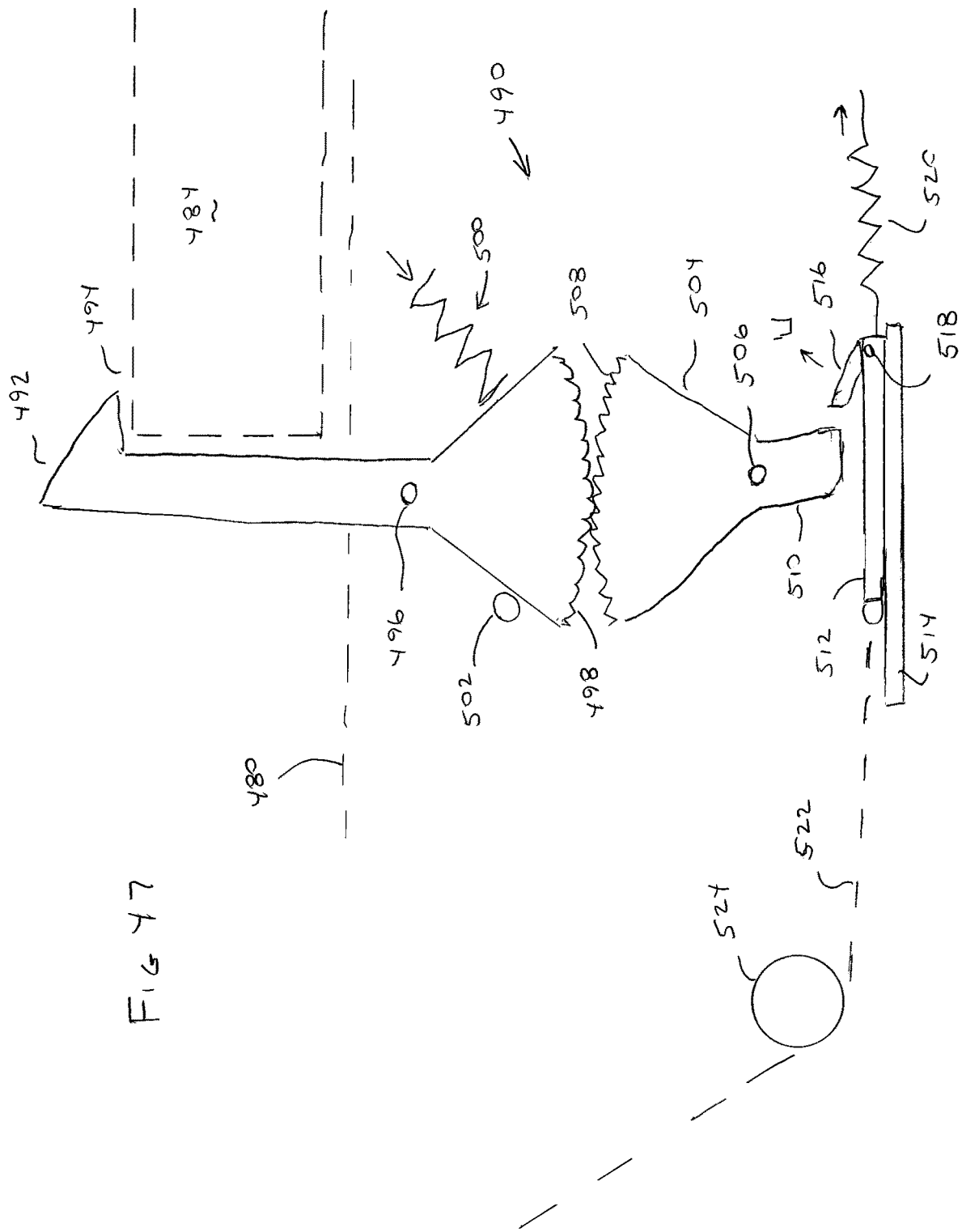
FIG. 47 is a schematic view showing the latch operating to hold a ramp extension in a retracted position.
Figure 48:
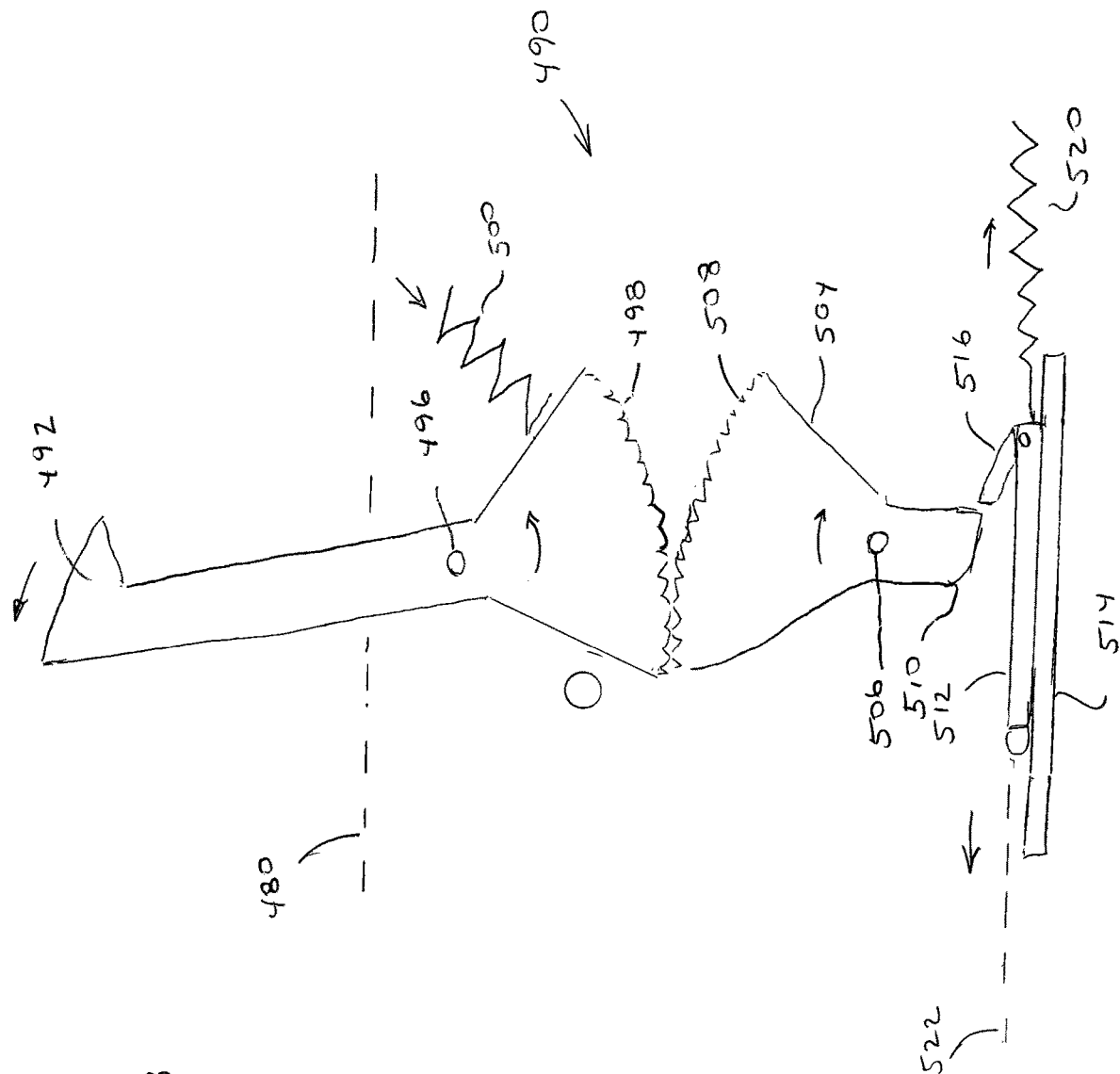
FIG. 48 is a schematic view showing the latch of FIG. 47 changed to an unlatched condition in which the ramp extension is released and enabled to move to an extended position.

An exemplary latch 490 is shown schematically in FIGS. 47 and 48. In the exemplary arrangement the latch 490 includes a hook 492. The hook 492 is configured to engage an end portion 494 of the ramp 484 that is disposed at the opposed end from the ramp hinge 486. As shown in FIG. 47 the hook 492 is operable to hold the ramp 484 in the retracted position.

The exemplary hook is rotatable about a pivot 496. A hook gear portion 498 extends on an opposed side of the pivot from the portion of the hook that is engageable with the ramp 484. At least one spring 500 is operative to bias the hook about the pivot in a clockwise direction as shown. A stop 502 is operative to limit rotation of the hook in the clockwise direction.

The exemplary latch further includes a rotating lever 504. Rotating lever 504 is rotatable about a pivot 506. Rotating lever 504 includes a lever gear portion 508. Lever gear portion 508 is in meshing connection with hook gear portion 498. Rotating lever 504 further includes a projecting portion 510. The projecting portion 510 extends on an opposed side of the pivot 506 from the lever gear portion 508.

The exemplary latch 490 further includes a slide 512. Slide 512 is configured to linearly move along a track 514. The exemplary slide 512 is in operative connection with a spring-loaded finger 516. Finger 516 is mounted to the slide 512 through a pivot 518. At least one spring (not shown) is operative to bias the finger 516 upward as shown in the direction of Arrow U. At least one spring 520 is in operative connection with the slide 512. The spring 520 is operative to bias the slide 512 to the right as shown in FIG. 47. A flexible cable 522 is in operative connection with the slide 512 at an end of the slide opposite the finger 516 and the spring 520. The flexible cable 522 is guided by the at least one pulley 524. The at least one pulley is operative to cause the cable engaged with the slide to apply a force to the slide that is generally along the direction of the track 514.

As shown in FIG. 48 movement of the flexible cable 522 to the left as shown, is operative to cause the slide 512 to similarly move along the track 514 against the force of spring 520. The finger 516 moves to engage the projecting portion 510 of the rotating lever 504. This causes the rotating lever to move in a clockwise direction as shown about the pivot 506. Rotation of the lever gear portion 508 in engagement with the hook gear portion 498 causes the hook 492 to rotate. Hook 492 rotates in a counterclockwise direction about the pivot 496 against the spring force applied by spring 500. As represented in FIG. 48 such rotation of the hook is operative to cause the hook to be disengaged from the ramp 484. As a result the latch is changed to the unlatched condition and the ramp is enabled to move from the retracted position to the extended position in response to the biasing force of the at least one ramp spring.

In exemplary arrangements the spring-loaded finger 516 after causing rotation of the rotating lever 504 is enabled to move in the track 514 past the projecting portion. As a result the spring 500 operates to cause the hook 492 to return to the position shown in FIG. 47. In this position the hook 492 is again movable to engage the ramp 484 when it is desired to return the ramp to the retracted position. Further in the exemplary arrangement when the flexible cable 522 enables the slide 512 to move responsive to the spring 520 to the initial position, the spring-loaded finger is enabled to retract downward as shown. This enables the finger 516 to move past the projecting portion 510 to the position shown in FIG. 47. As a result in the exemplary arrangement the latch 490 is enabled to return to the latched condition regardless of the position of the slide relative to the rotating lever 504. Of course it should be understood that this approach is exemplary and in other arrangements other approaches may be used.

FIGS. 49 and 50 show an exemplary arrangement for changing the condition of the exemplary latch. In this exemplary arrangement the flexible cable 522 extends outside the emergency exit door 480 and is engaged through an anchor 526 to the bus body. The flexible cable 522 is guided on a further pulley 527 as well as pulley 524 previously discussed. As shown in FIG. 49 emergency exit door 480 is in the closed position. In this position the length of the flexible cable 522 between the pulley 527 and the anchor 526 is a relatively short distance.

When the emergency exit door 480 is moved from the closed position to the open position by rotation about at least one horizontal hinge 528, the length of the flexible cable 522 between the pulley 527 and the anchor 526 increases as shown in FIG. 50. This change in configuration causes the flexible cable 522 to pull the slide 512 to change the condition of the latch from the latched condition to the unlatched condition in the manner previously discussed. Returning the emergency exit door 482 the closed position likewise returns the flexible cable 522 to the position shown in FIG. 49 and the exemplary latch is again enabled to be changed from the latched condition to the unlatched condition.

Of course it should be understood that this arrangement which operates to automatically cause the latch to change to the unlatched condition, and enable the ramp extension to move from the retracted position to the extended position, is exemplary. Other exemplary arrangements may use other types of devices to enable movement of the ramp so that it can be deployed as the emergency exit door moves from the closed position to the open position. Such other mechanisms may include weights attached to movable levers that change orientation in response to the orientation of the movable exit door for example. Such weight biased levers may operate to provide movement which changes the condition of the latch. Alternatively electrical arrangements including switches and circuitry which are operative to determine the position or orientation of the emergency exit door or other components may be utilized to actuate a latch or other device that enables movement of the ramp extension to the deployed position. Numerous other approaches may be utilized.

Thus the exemplary arrangements achieve improved operation, eliminate difficulties encountered in the use of prior devices and systems, and obtain the useful results described herein.

In the foregoing description certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the inventive features are not limited to the exact features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

Having described the features, discoveries and principles of the exemplary arrangements, the manner in which they are constructed and operated, and the advantages and useful results attained; the new and useful structures, devices, elements, arrangements, parts, combinations, systems, equipment, operations, methods, processes and relationships are set forth in the appended claims.

I claim:

1. Apparatus operative to provide emergency egress from an interior area of a bus, wherein the interior area of the bus is bounded on a lower side by a bus floor,
   wherein the bus includes a bus body having an emergency exit opening that is closable by an emergency exit door, wherein the emergency exit door is openable from at least one of the interior area or an exterior area of the bus, wherein the emergency exit door is changeable between a latched closed condition in which the emergency exit door is held in a closed position closing the emergency exit opening, and an openable condition in which the emergency exit door is changeable between the closed position and an open position in which at least a portion of the door is movable away from the emergency exit opening, the apparatus comprising:
at least one horizontal hinge, wherein the hinge is in operative connection with each of the bus body and the emergency exit door,
wherein the at least one horizontal hinge is operative to enable the emergency exit door when in the openable condition to movably rotate in operatively engaged connection with the bus body through the at least one hinge about an axis such that at least a portion of the emergency exit door moves vertically down and outwardly away from the emergency exit opening to a vertical level that is at least as low as the bus floor,
a ramp, wherein the ramp is movably mounted in operative connection with the emergency exit door,
wherein in the open position of the emergency exit door the ramp is extendable between the emergency exit door and ground,
whereby with the emergency exit door in the open position and in an extended position of the ramp, persons in the interior area are enabled to traverse the emergency exit door and the ramp to reach the ground.

2. The apparatus according to claim 1 and further comprising:
at least one ramp hinge, wherein the ramp is in movably mounted connection with the emergency exit door through the at least one ramp hinge,
wherein in the open position of the emergency exit door the ramp is enabled to rotate in operatively engaged relation with the emergency exit door between the extended position and a retracted position.

3. The apparatus according to claim 1
wherein in the open position of the emergency exit door, the ramp is extendable in a direction away from the emergency exit opening.

4. The apparatus according to claim 1
wherein the emergency exit door includes a cavity,
wherein in the open position of the emergency exit door and in the extended position of the ramp, the ramp extends outwardly from the cavity.

5. The apparatus according to claim 1
and further comprising:
at least one leg, wherein the at least one leg is movably mounted in operative connection with at least one of the emergency exit door and the ramp,
wherein in the closed position of the emergency exit door, the at least one leg is in a retracted position within the bus interior area,
and wherein in the open position of the emergency exit door the at least one leg is extendable to the ground and is operative to support at least one of the emergency exit door and the ramp.

6. The apparatus according to claim 1
and further comprising:
at least one leg, wherein the at least one leg is rotatably movably mounted in operative connection with at least one of the emergency exit door and the ramp,
wherein in the closed position of the emergency exit door, the at least one leg is in a retracted position within the bus interior area,
and wherein movement of the emergency exit door from the closed position to the open position is operative to cause movement of the at least one leg to extend in operatively engaged relation with the ground, whereby at least one of the ramp and the emergency exit door is operatively supported by the at least one leg.

7. The apparatus according to claim 1
and further comprising:
at least one counterbalance, wherein the at least one counterbalance is in operative connection with the emergency exit door,
wherein the at least one counterbalance is operative to applying a force counter to gravitational force that urges movement of the emergency exit door toward the open position,
whereby movement the emergency exit door toward the open position is slowed by the counterbalance.

8. The apparatus according to claim 1
and further comprising:
at least one counterbalance, wherein the at least one counterbalance is in operative connection with the emergency exit door,
wherein the at least one counterbalance is operative to apply a force counter to gravitational force that urges movement of the exit door toward the open position,
wherein the at least one counterbalance includes at least one spring housed within the emergency exit door,
whereby movement of the emergency exit door toward the open position is slowed by the counterbalance.

9. The apparatus according to claim 1
and further comprising:
at least one counterbalance, wherein the at least one counterbalance is in operative connection with the emergency exit door,
wherein the at least one counterbalance is operative to apply a force counter to gravitational force that urges movement of the emergency exit door toward the open position,
wherein the at least one counterbalance includes a rotational damper in operative connection with the at least one hinge,
whereby movement of the emergency exit door toward the open position is slowed by the counterbalance.

10. The apparatus according to claim 1 and further comprising:
a latch, wherein the latch is changeable between a latched condition and unlatched condition,
wherein the latch is in operative connection with the ramp,
wherein in the closed position of the emergency exit door the latch is configured to be in the latched condition and is operative to hold the ramp in a retracted position,
wherein movement of the emergency exit door away from the closed position is operative to automatically cause the latch to change to the unlatched condition, wherein in the unlatched condition the ramp is extendable between the emergency exit door and ground.

11. The apparatus according to claim 1 and further comprising:
at least one ramp spring, wherein the at least one ramp spring is in operative connection with the ramp,
wherein in the open position of the emergency exit door the at least one ramp spring is operative to automatically cause the ramp to move from a retracted position toward the extended position, wherein in the extended position the ramp extends between the emergency exit door and ground.

12. The apparatus according to claim 1 and further comprising:
at least one ramp spring, wherein the at least one ramp spring is in operative connection with the ramp,
wherein in the open position of the emergency exit door the at least one ramp spring is operative to automatically cause the ramp to move from a retracted position toward the extended position, wherein in the extended position the ramp extends between the emergency exit door and ground, wherein in the closed position of the emergency exit door and in the retracted position of the ramp, the ramp is positioned within the bus interior area.

13. The apparatus according to claim 1 and further comprising:

at least one ramp spring, wherein the at least one ramp spring is in operative connection with the ramp, wherein in the open position of the emergency exit door the at least one ramp spring is operative to automatically cause the ramp to move from a retracted position toward the extended position, wherein in the extended position the ramp extends between the emergency exit door and ground, wherein in the closed position of the emergency exit door and in the retracted position of the ramp, the ramp is positioned externally of the bus interior area.

14. The apparatus according to claim 1 wherein the emergency exit door includes a cavity, wherein the cavity includes a cavity opening, wherein the ramp is extendable outward from the cavity when the emergency exit door is moved away from the closed position, wherein the emergency exit door in the openable condition is enabled to movably rotate such that cavity opening is disposed vertically below the axis, wherein the ramp is extendable outward from the cavity through the cavity opening responsive to gravity.

15. The apparatus according to claim 1 and further comprising:

a ramp hinge, wherein the ramp is rotatably movably mounted in operative connection with the emergency exit door through the ramp hinge, wherein in the open position of the emergency exit door the ramp is enabled to rotate in operatively engaged connection with the emergency exit door between the extended position and the retracted position about a ramp hinge axis, at least one ramp spring, wherein the at least one ramp spring is in operative connection with the ramp, wherein in the open position of the emergency exit door the at least one ramp spring is operative to automatically cause the ramp to rotatably move about the ramp hinge axis from a retracted position to the extended position, wherein in the extended position the ramp extends between the emergency exit door and ground.

16. The apparatus according to claim 1 and further comprising:

a ramp hinge, wherein the ramp is rotatably movably mounted in operative connection with the emergency exit door through the ramp hinge, wherein in the open position of the emergency exit door the ramp is enabled to rotate in operatively engaged relation with the emergency exit door between the extended position and a retracted position about a ramp hinge axis, at least one ramp spring, wherein the at least one ramp spring is in operative connection with the ramp, wherein in the open position of the emergency exit door the at least one ramp spring is operative to automatically cause the ramp to rotatably move about the ramp hinge axis in a first rotational direction from a retracted position to the extended position, wherein in the extended position the ramp is extendable between the emergency exit door and ground, and further including at least one leg, wherein the at least one leg is movably mounted in operative connection with the ramp, wherein the at least one leg is rotationally movable relative to the ramp about a leg axis, wherein in the extended position of the ramp the at least one leg is rotatable in the first rotational direction about the leg axis to a leg deployed position in which the at least one leg operatively extends between the ramp and ground.

17. The apparatus according to claim 1 and further comprising:

a ramp hinge, wherein the ramp is rotatably movably mounted in operative connection with the emergency exit door through the ramp hinge, wherein in the open position of the emergency exit door the ramp is enabled to rotate in operatively engaged relation with the emergency exit door between the extended position and a retracted position about a ramp hinge axis, at least one ramp spring, wherein the at least one ramp spring is in operative connection with the ramp, wherein in the open position of the emergency exit door the at least one ramp spring is operative to automatically cause the ramp to rotatably move about the ramp hinge axis in a first rotational direction from a retracted position to the extended position, wherein in the extended position the ramp is extendable between the emergency exit door and ground, wherein rotational movement of the ramp in the first rotational direction is stopped through operative engagement with a ramp stop, and further including at least one leg, wherein the at least one leg is movably mounted in operative connection with the ramp, wherein the at least one leg is rotationally movable relative to the ramp about a leg axis, wherein in the extended position of the ramp the at least one leg is rotatable in the first rotational direction about the leg axis to a leg deployed position in which the at least one leg operatively extends between the ramp and ground, wherein rotational momentum is operative to cause the at least one leg to rotate to the leg deployed position after rotational movement of the ramp is stopped by engagement with the ramp stop.

18. Apparatus operative to provide emergency egress from an interior area of a bus, wherein the interior area the bus is bounded on a lower side by a bus floor, wherein the bus includes a bus body having an emergency exit opening that is closable by an emergency exit door, wherein the emergency exit door is immediately openable from at least one of the interior area or an exterior area of the bus, wherein the emergency exit door is changeable between a latched closed condition in which the emergency exit door is held in a closed position closing the emergency exit opening, and an openable condition in which the emergency exit door is immediately changeable between the closed position and an open position in which a at least a portion of the door is disposed away from the emergency exit opening, the apparatus comprising:

at least one hinge, wherein the emergency exit door is rotationally movably mounted in operative connection with the bus body through the at least one hinge, wherein the at least one hinge enables the emergency exit door to be rotatably movable relative to the bus body about a horizontally extending axis, wherein a hinge side of the emergency exit door is in operative engagement with the at least one hinge, wherein the hinge side of the emergency exit door is positioned at a lower end of the emergency exit door when the door is in the door closed position, wherein in the openable condition of the emergency exit door, the emergency exit door is movable about the axis such that a further door side that is disposed at an opposed end of the door from the hinge side is rotationally and vertically movable away from the exit opening to the door open position, wherein in the door open position the further door side is at a vertical level that is lower than a vertical level of the further door side in the door closed position, a ramp, wherein the ramp is movably mounted in operative connection with the emergency exit door, wherein in door movement toward the door open position the ramp is automatically caused to move relative to the emergency exit door to extend between the emergency exit door and ground, whereby with the emergency exit door in the door open position and in an extended position of the ramp persons in the interior area of the bus are enabled to traverse the emergency exit door and the ramp to reach the ground.

19. Apparatus operative to provide emergency egress from an interior area of a bus, wherein the interior area of the bus is bounded on a lower side by a bus floor, wherein the bus includes a bus body having an emergency exit opening that is closable by an emergency exit door, wherein the emergency exit door is openable from at least one of the interior area and an exterior area of the bus, wherein the emergency exit door is changeable between a latched closed condition in which the emergency exit door is held in a closed position closing the emergency exit opening, and an openable condition in which the emergency exit door is changeable between the closed position and an open position in which at least a portion of the door is movable away from the emergency exit opening, the apparatus comprising:

at least one horizontal hinge, wherein the hinge is in operative connection with each of the bus body and the emergency exit door, wherein the at least one horizontal hinge is operative to enable the emergency exit door when in the openable condition to movably rotate in operatively engaged connection with the bus body through the at least one hinge about an axis such that at least a portion of the emergency exit door moves vertically down and outwardly away from the emergency exit opening to a vertical level that is at least as low as the bus floor, at least one counterbalance, wherein the at least one counterbalance is in operative connection with the emergency exit door and is operative to apply a force counter to gravitational force that urges movement of the emergency exit door toward the open position, wherein the at least one counterbalance includes at least one cable, wherein the at least one cable operatively extends between a portion of the door disposed away from the axis and the bus body, whereby movement of the emergency exit door toward the open position is slowed by the counterbalance, a ramp, wherein the ramp is movably mounted in operative connection with the emergency exit door, wherein in the open position of the emergency exit door the ramp is extendable between the emergency exit door and ground, whereby with the emergency exit door in the open position and in an extended position of the ramp, persons in the interior area are enabled to traverse the emergency exit door and the ramp to reach the ground.

20. Apparatus operative to provide emergency egress from an interior area of a bus, wherein the interior area of the bus is bounded on a lower side by a bus floor, wherein the bus includes a bus body having an emergency exit opening that is closable by an emergency exit door, wherein the emergency exit door is openable from at least one of the interior area and an exterior area of the bus, wherein the emergency exit door is changeable between a latched closed condition in which the emergency exit door is held in a closed position closing the emergency exit opening, and an openable condition in which the emergency exit door is changeable between the closed position and an open position in which at least a portion of the door is movable away from the emergency exit opening, and a pair of disposed frame rails and a tire supported axle, wherein at least one pneumatic spring extends vertically operatively between the frame rails and axle, the apparatus comprising:

at least one horizontal hinge, wherein the hinge is in operative connection with each of the bus body and the emergency exit door, wherein the at least one horizontal hinge is operative to enable the emergency exit door when in the openable condition to movably rotate in operatively engaged connection with the bus body through the at least one hinge about an axis such that at least a portion of the emergency exit door moves vertically down and outwardly away from the emergency exit opening to a vertical level that is at least as low as the bus floor, a ramp, wherein the ramp is movably mounted in operative connection with the emergency exit door, wherein in the open position of the emergency exit door the ramp is extendable between the emergency exit door and ground, an air valve, wherein the air valve is in operative fluid connection with the at least one pneumatic spring, wherein the air valve is changeable between open and closed conditions, wherein the air valve is operative to change from the closed condition to the open condition, responsive at least in part to the emergency exit door being in the operable condition, wherein in the open condition of the air valve, air is released from the at least one pneumatic spring and the emergency exit opening is moved closer to ground, whereby with the emergency exit door in the open position and in an extended position of the ramp, persons in the interior area are enabled to traverse the emergency exit door and the ramp to reach the ground.

21. The apparatus according to claim 18 wherein the door is manually movable from the closed position to the open position, and further comprising:

at least one leg, wherein the at least one leg is rotationally movable in operatively engaged relation with at least one of the door and the ramp, wherein movement of the door from the closed position to the open position is operative to cause
- the leg to automatically rotationally move relative to at least one of the door and the ramp, and
- the leg to extend vertically to be in engagement with the ground and provide support for each of the door and the ramp.

22. The apparatus according to claim 18 and further comprising:
a latch, wherein the latch is in releasable engagement with the ramp,
wherein in a latched condition the latch is operative to prevent the ramp from extending away from the door toward the ground,
wherein movement of the door from the closed position toward the open position is operative to cause the latch to automatically change from the latched condition to an unlatched condition, wherein during movement of the door toward the open position the ramp is caused to automatically extend toward the ground.

* * * * *